US012755700B2

(12) United States Patent
Ishii et al.

(10) Patent No.: US 12,755,700 B2
(45) Date of Patent: Oct. 6, 2026

(54) DISPLAY DEVICE

(71) Applicant: Japan Display Inc., Tokyo (JP)

(72) Inventors: Tatsuya Ishii, Tokyo (JP); Masanobu Ikeda, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 19/314,938

(22) Filed: Aug. 29, 2025

(65) Prior Publication Data

US 2026/0087989 A1 Mar. 26, 2026

(30) Foreign Application Priority Data

Sep. 25, 2024 (JP) ................................ 2024-166619

(51) Int. Cl.
*G09G 5/00* (2006.01)
*G09G 3/3233* (2016.01)

(52) U.S. Cl.
CPC ..... *G09G 3/3233* (2013.01); *G09G 2300/043* (2013.01); *G09G 2300/0819* (2013.01); *G09G 2310/08* (2013.01); *G09G 2330/021* (2013.01)

(58) Field of Classification Search
CPC ........... G09G 3/3233; G09G 2300/043; G09G 2300/0819; G09G 2310/08; G09G 2330/021
USPC .......................................................... 345/204
See application file for complete search history.

(56) References Cited

U.S. PATENT DOCUMENTS 11,972,726 B2 4/2024 Yu et al.
2022/0122534 A1* 4/2022 Kim ..................... G09G 3/3233
2025/0061833 A1* 2/2025 Kawashima ......... G09G 3/2081
2026/0024501 A1* 1/2026 Kim ..................... G09G 3/3266

* cited by examiner

*Primary Examiner* — Jennifer T Nguyen
(74) *Attorney, Agent, or Firm* — K&L Gates LLP

(57) ABSTRACT

The display device includes a first transistor connected between an image data signal line and a second capacitive element, a second transistor connected between a first capacitive element and a fifth transistor, a third transistor connected between a reset potential line and the second capacitive element, the fifth transistor connected between a light-emitting element and the second transistor, a sixth transistor connected between a reference potential line and the second capacitive element, a seventh transistor connected between a standard potential line and the first capacitive element, an eighth transistor connected between a constant potential line and the fifth transistor, the first capacitive element connected between the second capacitive element and the second transistor, the second capacitive element electrically connected between the first capacitive element and the second transistor, and the light-emitting element connected between the constant potential line and the fifth transistor.

7 Claims, 30 Drawing Sheets

DISPLAY DEVICE

CROSS-REFERENCE TO RELATED APPLICATIONS

This application claims the benefit of priority to Japanese Patent Application No. 2024-166619 filed on Sep. 25, 2024, the entire contents of which are incorporated herein by reference.

FIELD

An embodiment of the present invention relates to a display device.

BACKGROUND

In recent years, a display device including a light-emitting element has been mounted on a television, a smartphone, or the like, and is becoming popular. For example, the display device includes a plurality of pixels and a control circuit for driving the plurality of pixels. Each of the plurality of pixels includes a plurality of transistors, a capacitive element, and a light-emitting element. The light-emitting element is an element that emits light in a self-luminous manner, and is, for example, a light-emitting diode (Light Emitting Diode: LED), a minute light-emitting diode (micro LED), or an organic electroluminescence (Electro Luminescence: EL) element. The control circuit in the display device can supply a potential to each of the plurality of pixels and allows a current corresponding to the supplied potential to flow to the light-emitting elements included in each of the plurality of pixels. Each of the light-emitting elements emits light with a luminance corresponding to a current flowing through the light-emitting element, and a pixel including the light-emitting element can display an image with a gradation corresponding to the luminance.

For example, a display device including a light-emitting element is well-known. The pixel of the display device includes nine transistors (T1 to T9), two capacitive elements (Chold, Cst) connected in series, and one light-emitting element (LED). In addition, a method for driving the display device includes electrically connecting a gate electrode (Gate) of the transistor T1 and a node (D-node) of one electrode of the capacitive element Chold by the transistor T3 in an initialization period (Initialization period) and a light emission period (Light emitting period).

SUMMARY

A display device includes a plurality of pixels arranged in a matrix in a first direction and a second direction intersecting the first direction, an image data signal line to which a data potential is supplied, a reset potential line to which a reset potential is supplied, a reference potential line to which a reference potential is supplied, a standard potential line to which a standard potential is supplied, and a constant potential line to which a constant potential is supplied. Each of the plurality of pixels includes a first transistor, a second transistor, a third transistor, a fifth transistor, a sixth transistor, a seventh transistor, an eighth transistor, a first capacitive element, a second capacitive element, and a light-emitting element. The first transistor is controlled by a first control signal and is electrically connected between the image data signal line and a second electrode of the second capacitive element, the second transistor includes a gate electrode electrically connected to the second electrode of the second capacitive element and is electrically connected between a first electrode of the first capacitive element and a first electrode of the fifth transistor, the third transistor is controlled by a second control signal and electrically connected between the reset potential line and the second electrode of the second capacitive element, the fifth transistor is controlled by a third control signal and is electrically connected between a first electrode of the light-emitting element and a second electrode of the second transistor, the sixth transistor is controlled by a fourth control signal and is electrically connected between the reference potential line and a first electrode of the second capacitive element, the seventh transistor is controlled by a fifth control signal and is electrically connected between the standard potential line and a first electrode of the second transistor, the eighth transistor is controlled by the fourth control signal and is electrically connected between the constant potential line and the first electrode of the fifth transistor, the first capacitive element is electrically connected between the first electrode of the second capacitive element and the first electrode of the second transistor, the second capacitive element is electrically connected between a second electrode of the first capacitive element and the gate electrode, and the light-emitting element is electrically connected between the constant potential line and the first electrode of the fifth transistor.

DESCRIPTION OF EMBODIMENTS

Hereinafter, embodiments of the present invention will be described with reference to the drawings and the like. However, the present invention can be implemented in many different aspects, and should not be construed as being limited to the description of the embodiments exemplified below. Further, in order to make the description clearer, the drawings may be schematically represented with respect to the width, thickness, shape, configuration, and the like of each part as compared with the actual embodiment, but the drawings are merely examples, and do not limit the interpretation of the present invention. In addition, the terms "first" and "second" for each element are convenient labels used to distinguish each element, and do not have any further meaning unless otherwise described.

Also, in the present specification, the expression "α includes A, B, or C," "α includes any of A, B, or C," "α includes one selected from the group consisting of A, B, and C," and the like does not exclude cases where α includes a plurality of combinations of A to C unless otherwise specified. Furthermore, these expressions do not exclude the case where α includes other elements.

In one embodiment, a first direction D1 intersects a second direction D2 and a third direction D3 intersects the first direction D1 and the second direction D2 (a plane D1D2).

In the case where the terms "same (identical)" and "match" are used in the specification of this application, "same" and "match" may include errors within the scope of the design. In addition, in one embodiment of the present invention, when an error in a range of design is included, the expressions "substantially the same" and "substantially match" may be used in some cases.

For example, a display device according to one embodiment of the present disclosure is a display device using an EL element as a self-luminous light-emitting device. For example, the display device using the EL element may be referred to as a self-luminous display device, an EL display device, or the like.

1. First Embodiment

[1-1. Overview of Display Device 10]

Figure 1:
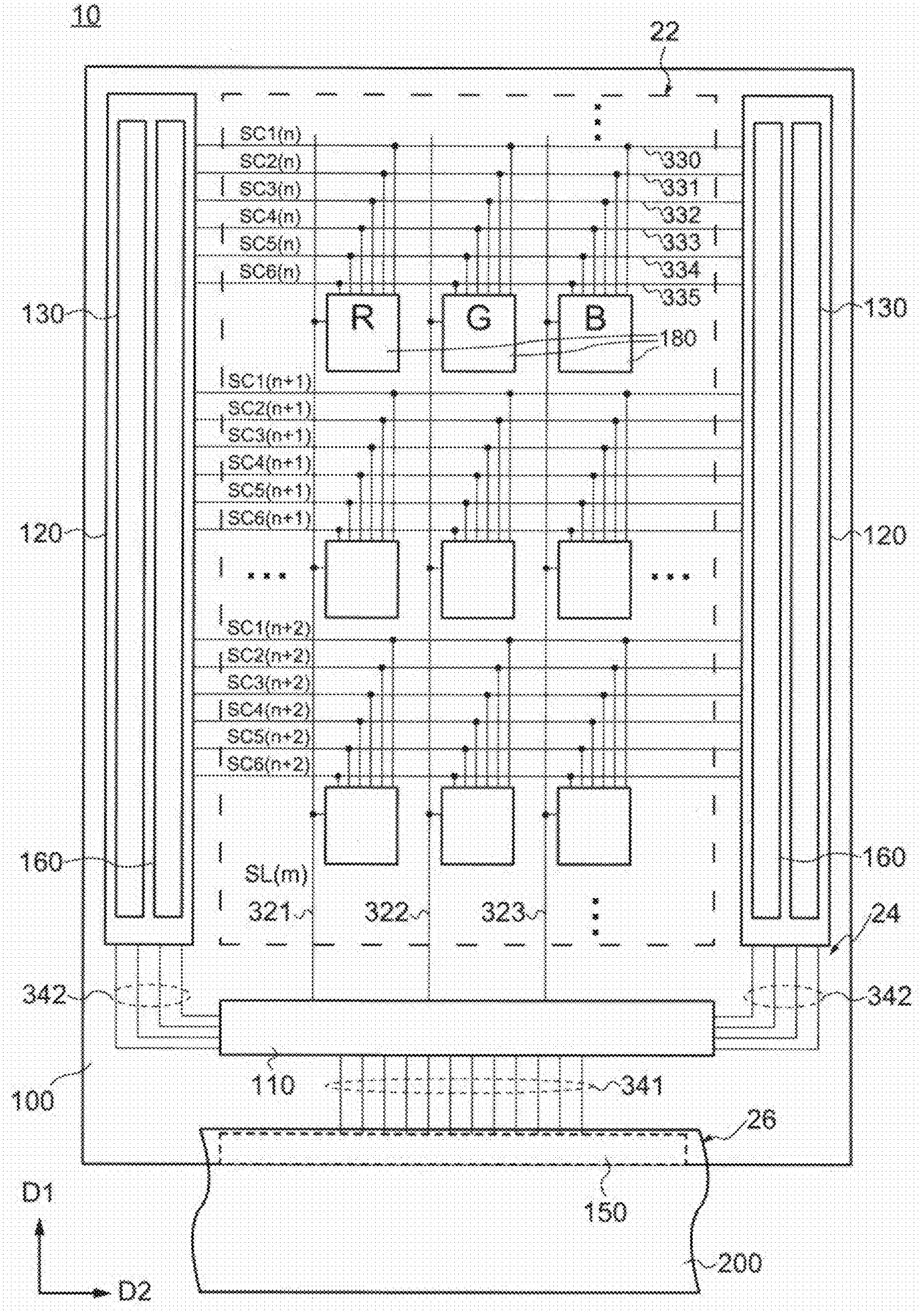
FIG. 1 is a schematic diagram showing a configuration of a display device according to a first embodiment of the present invention.

An overview of a display device 10 according to a first embodiment will be described with reference to FIG. 1. FIG. 1 is a schematic diagram showing a configuration of the display device 10. The configuration of the display device 10 shown in FIG. 1 is an example, and the configuration of the display device 10 is not limited to the configuration shown in FIG. 1.

The display device 10 includes an array substrate 100, a flexible printed circuit board 200 (FPC 200), and an IC chip 110. The display device 10 includes a display area 22 provided on the array substrate 100, a peripheral area 24 surrounding the display area 22, and a terminal area 26.

In the display area 22, a plurality of pixels 180 is arranged in a matrix along the first direction D1 (column direction) and the second direction D2 (row direction) intersecting the first direction D1. The pixel 180 is the smallest unit constituting a part of the image to be displayed in the display area 22. Each of the plurality of pixels 180 may correspond to, for example, a sub-pixel R, a sub-pixel G, or a sub-pixel B. One pixel may be formed by three sub-pixels. Arrangement of the pixels 180 is not limited, and the arrangement of the plurality of pixels 180 is, for example, a stripe arrangement. The arrangement of the display device 10 may also be a delta arrangement, a pentile arrangement, or the like.

The sub-pixel R, the sub-pixel G, and the sub-pixel B are configured to display images of different colors. For example, each of the sub-pixel R, the sub-pixel G, and the sub-pixel B includes a light-emitting element including a light-emitting layer that emits red, green, and blue. An arbitrary potential or current is supplied to each of the three sub-pixels, and the display device 10 can display an image.

The peripheral area 24 is provided with the IC chip 110 and two control circuits 120. The two control circuits 120 are provided on the left and right sides of the display area 22. The IC chip 110 is connected to a terminal portion 150 using a connection wiring 341. Each of the two control circuits 120 is connected to the IC chip 110 using a connection wiring 342. The peripheral area 24 may be referred to as a frame area. The connection wiring 341 may be referred to as the connection wiring 341 alone, and a bundle of a plurality of connection wirings 341 may be referred to as the connection wiring 341. Similar to the connection wiring 341, the connection wiring 342 may be referred to as the connection wiring 342 alone, and a bundle of a plurality of connection wirings 342 may be referred to as the connection wiring 342.

The terminal area 26 is provided with the terminal portion 150 and the FPC 200 electrically connected to the terminal portion 150. The terminal area 26 is an area opposed to an area where the display area 22 is provided with respect to the peripheral area 24 along the first direction D1.

The FPC 200 is connected to an external device (not shown) outside the display device 10. The display device 10 is connected to an external device via the FPC 200 and the terminal portion 150 connected to the FPC. A control signal and a potential are transmitted from the external device to the display device 10 via the FPC 200 and the terminal portion 150 connected to the FPC. The display device 10 drives each pixel 180 provided in the display device 10 using the received control signal and potential from the external device. As a result, the display device 10 can display an image in the display area 22.

The IC chip 110 supplies signals, potentials, and the like for driving the respective pixels 180 to the two control circuits 120 and the respective pixels 180 (pixel circuits 181) via the FPC 200, the terminal portion 150, and the connection wiring 341.

Each of the IC chip 110 and the two control circuits 120 may be referred to as the control circuit alone, and a circuit group including a part or all of each of the IC chip 110 and the two control circuits 120 may be referred to as the control circuit.

[1-2. Configuration of IC Chip 110]

Referring to FIG. 1, an overview of the IC chip 110 will be described. The IC chip 110 is provided at a position adjoining the display area 22 along the first direction D1. Image data signal lines 321, 322, and 323 extend from the IC chip 110 in the first direction D1 and are connected to the plurality of pixels 180 arranged in the first direction D1.

For example, the IC chip 110 includes a plurality of selection circuits (not shown). For example, each of the plurality of selection circuits is a switch controlled based on an on signal and an off signal supplied to a selection signal. The selection circuit is selected by the on signal supplied to the selection signal and supplies an image data signal SL(m) including a data signal VDATA to the image data signal line 321 and the pixel 180 electrically connected to the image data signal line 321. The selection signal and the image data signal SL(m) are transmitted from the external device to the IC chip 110 via the FPC 200 and the terminal portion 150 connected to the FPC. For example, the data signal VDATA (image data signal SL(m)) includes a data potential equal to or higher than a potential VSIGL (see FIG. 5) and equal to or lower than a potential VSIGH (see FIG. 5). The potential VSIGH is greater than the potential VSIGL.

For example, the on signal is a signal including a potential that conducts the selection circuit (switch), and the off signal is a signal including a potential that blocks the selection circuit (switch). In the present disclosure, the on signal may be a high level potential (high, High, HI), the off signal may be a low level potential (low, Low, LO), the on signal may be a low level potential (low, Low, LO), and the off signal may be a high level potential (high, High, HI). The high level potential is greater (higher) than the low level potential. In addition, in the display device according to one embodiment of the present specification, as an example, the on signal is a high-level potential and the off signal is a low-level potential.

[1-3. Configuration of Control Circuit 120]

An overview of the control circuit 120 will be described with reference to FIG. 1. The two control circuits 120 are provided at positions adjoining both sides of the display area 22 along the second direction D2. A scan signal line 330, a scan signal line 331, a scan signal line 332, a scan signal line 333, a scan signal line 334, and a scan signal line 335 extend from the control circuit 120 in the second direction D2 and are connected to the plurality of pixels 180 arranged in the second direction D2. As an example, each scan signal line of the display device 10 shown in FIG. 1 is connected to both of the two control circuits 120. Each scan signal line may be connected to one control circuit 120 of the two control circuits 120. For example, an n-th scan signal line may be electrically connected to the control circuit 120 on the right side of the display area 22 along the second direction D2, and an n+1-th scan signal line may be electrically connected to the control circuit 120 on the left side of the display area 22 along the second direction D2. The number n is a positive integer.

The control circuit 120 includes a shift register circuit 130 and a scan driver circuit 160. For example, the control circuit 120 is a gate driver, and receives a control signal including a clock signal, a start pulse, a plurality of enable signals, and the like, and potentials such as a driving potential VDDEL (see FIG. 2) and a standard potential VSSEL (see FIG. 2). The control circuit 120 can sequentially select scanning lines according to inputs of the control signal and the power supply.

The shift register circuit 130 is electrically connected to the scan driver circuit 160. The shift register circuit 130 includes a plurality of shift registers (not shown). Further, the plurality of control signals described above are supplied to the shift register circuit 130 via the plurality of connection wirings 342, the driving potential VDDEL is supplied via a driving potential line PVDD (see FIG. 2), and the standard potential VSSEL is supplied via a standard potential line PVSS (see FIG. 2). The shift register circuit 130 has a role of generating a plurality of output signals (not shown) shifted at different timings based on the plurality of control signals described above, and sequentially outputting the output signals to the scan driver circuit 160.

The scan driver circuit 160 includes a plurality of scan drivers. For example, the plurality of scan drivers is supplied with a plurality of output signals from the shift register circuit 130, the plurality of enable signals described above are supplied from the IC chip 110 via the plurality of connection wirings 342, the driving potential VDDEL is supplied via the driving potential line PVDD, and the standard potential VSSEL is supplied via the standard potential line PVSS. The plurality of scan drivers, based on a plurality of output signals and a plurality of enable signals (not shown), are configured to sequentially supply scan signals having different timings (for example, a first scan signal SC1(*n*), a second scan signal SC2(*n*), a third scan signal SC3(*n*), a fourth scan signal SC4(*n*), a fifth scan signal SC5(*n*), and a sixth scan signal SC6(*n*)) to the respective scan signal lines, and to drive the pixels 180 (pixel circuits 181) electrically connected to the respective scan signal lines. For example, the fourth scan signal SC4(*n*) and the scan signal line 333 to which the fourth scan signal SC4(*n*) is supplied are a so-called scan signal and scan signal line.

[1-4. Configuration of Pixel 180]

Figure 2:
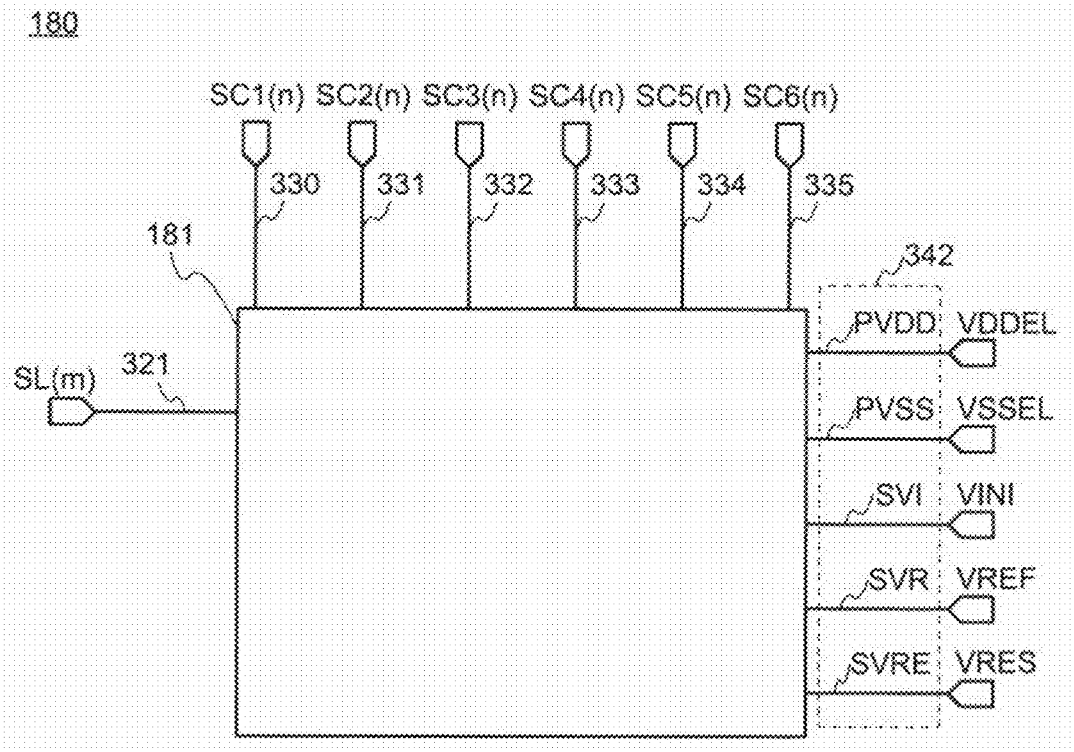
FIG. 2 is a schematic diagram showing an input signal to a pixel circuit according to the first embodiment of the present invention.
Figure 3:
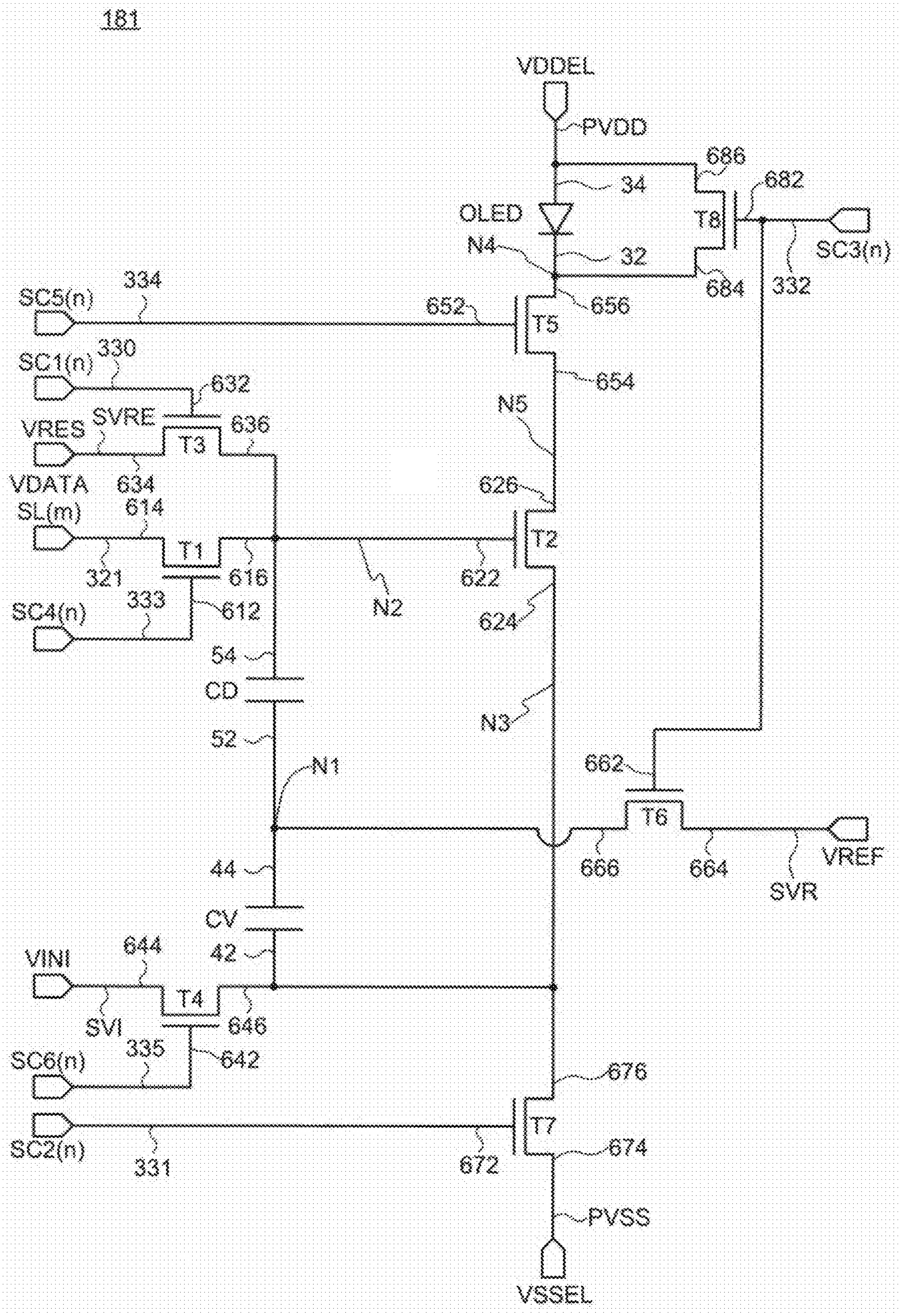
FIG. 3 is a circuit diagram showing a configuration of the pixel circuit according to the first embodiment of the present invention.

Referring to FIG. 1 to FIG. 3, an overview of the pixel 180 and the pixel circuit 181 will be described. FIG. 2 is a schematic diagram showing an input signal to the pixel circuit 181 included in the pixel 180. FIG. 3 is a circuit diagram showing a configuration of the pixel circuit 181. As an example, FIG. 2 and FIG. 3 show the configuration of the pixel circuit 181 of the pixel 180 shown in FIG. 1. The configuration of the pixel 180 and the pixel circuit 181 is not limited to the configuration shown in FIG. 1 to FIG. 3. Configurations that are the same as or similar to those in FIG. 1 are described as necessary, and descriptions of the same or similar configurations as those in FIG. 1 may be omitted.

The pixel circuit 181 is a circuit for driving the pixel 180. The pixel circuits of the sub-pixel R, the sub-pixel G, and the sub-pixel B included in the pixel 180 are the same as those of the pixel circuit 181, and differ in the colors emitted by the light-emitting devices OLED. In the following explanation, a light-emitting device OLED that emits red light will be described as an example.

As shown in FIG. 2, the pixel circuit 181 is supplied with the image data signal SL(m), the first scan signal SC1(*n*), the second scan signal SC2(*n*), the third scan signal SC3(*n*), the fourth scan signal SC4(*n*), the fifth scan signal SC5(*n*), the sixth scan signal SC6(*n*), a reset potential VRES, a reference potential VREF, and an initialization potential VINI. Further, as a power source for driving the pixel 180, the driving potential VDDEL and the standard potential VSSEL are supplied to the pixel circuit 181. For example, the reset potential VRES, the reference potential VREF, the initialization potential VINI, the driving potential VDDEL, and the standard potential VSSEL may be constant potentials, and may be variable potentials that vary depending on the timings of the respective signals.

The first scan signal SC1(*n*) is supplied to the scan signal line 330, the second scan signal SC2(*n*) is supplied to the scan signal line 331, the third scan signal SC3(*n*) is supplied to the scan signal line 332, the fourth scan signal SC4(*n*) is supplied to the scan signal line 333, the fifth scan signal SC5(*n*) is supplied to the scan signal line 334, and the sixth scan signal SC6(*n*) is supplied to the scan signal line 335. The first scan signal SC1(*n*) may be referred to as a second control signal, the second scan signal SC2(*n*) may be referred to as a fifth control signal, the third scan signal SC3(*n*) may be referred to as a fourth control signal, the fourth scan signal SC4(*n*) may be referred to as a first control signal, the fifth scan signal SC5(*n*) may be referred to as a third control signal, and the sixth scan signal SC6(*n*) may be referred to as a sixth control signal.

Further, the reset potential VRES is supplied to a reset potential line SVRE, the reference potential VREF is supplied to the reference potential line SVR, the initialization potential VINI is supplied to an initialization potential line SVI, the driving potential VDDEL is supplied to the driving potential line PVDD, and the standard potential VSSEL is supplied to the reference potential line PVSS. For example, the reset potential line SVRE, the reference potential line SVR, the initialization potential line SVI, the driving potential line PVDD, and the standard potential line PVSS are electrically connected to the connection wirings 342. Further, for example, each of the reset potential line SVRE, the reference potential line SVR, the initialization potential line SVI, the driving potential line PVDD, and the standard potential line PVSS may be connected to a different connecting line 342.

For example, the reset potential VRES, the reference potential VREF, the initialization potential VINI, the driving potential VDDEL, and the standard potential VSSEL are supplied from the external device to the IC chip 110 via the FPC 200, the terminal portion 150, and the connection wiring 341. Further, for example, the reset potential VRES, the reference potential VREF, the initialization potential VINI, the driving potential VDDEL, and the standard potential VSSEL are supplied to the plurality of pixels 180 (pixel circuits 181) from the IC chip 110 via the connection wiring 342, the reset potential line SVRE, the reference potential line SVR, the initialization potential line SVI, the driving potential line PVDD, and the standard potential line PVSS. In addition, although not shown, the reset potential VRES, the reference potential VREF, the initialization potential VINI, the driving potential VDDEL and the standard potential VSSEL may be supplied to the reset potential line SVRE, the reference potential line SVR, the initialization potential line SVI, the driving potential line PVDD, and the standard potential line PVSS via the FPC 200, the terminal portion 150 and the connection wiring 341, without passing through the IC chip 110 and the connection wiring 342 from the external device, and may be supplied to a plurality of pixels 180 (pixel circuits 181). For example, the reset potential VRES, the reference potential VREF, the initialization potential VINI, and the standard potential VSSEL are smaller than the driving potential VDDEL.

As shown in FIG. 3, the semiconductor device includes a first transistor T1, a second transistor T2, a third transistor T3, a fourth transistor T4, a fifth transistor T5, a sixth transistor T6, a seventh transistor T7, an eighth transistor T8, a capacitive element CV, a capacitive element CD, and the light-emitting device OLED. Each of these transistors includes a gate electrode and a pair of electrodes including a first electrode and a second electrode (a source electrode and a drain electrode). Each of the capacitive element CV, the capacitive element CD, and the light-emitting device OLED has a pair of electrodes including a first electrode and a second electrode. In addition, the capacitive element CV may be referred to as a first capacitive element, and the capacitive element CD may be referred to as a second capacitive element.

For example, the first transistor T1 is a selection transistor. The first transistor T1 has a function of supplying the image data signal SL(m) to a second node N2.

For example, the second transistor T2 is a driving transistor. As will be described later, a threshold voltage (a potential difference Vgs that becomes a threshold value) VTH is acquired between a gate electrode 622 and a first electrode (source) 624 of the second transistor T2 based on the reset potential VRES, and the acquired threshold voltage VTH is applied to the capacitive element CV, whereby the threshold voltage VTH is acquired and held (stored). Further, the second transistor T2 controls an amount of current flowing from the driving potential line PVDD to the light-emitting device OLED based on a gate potential (a potential between the gate electrode 622 and the first electrode 624) and the input image data signal SL(m) in which a variation in the threshold voltage VTH is corrected. That is, the second transistor T2 has a function of causing the light-emitting device OLED to emit light by causing a current corresponding to a display gradation (luminance) of the light-emitting device OLED to flow from the driving potential VDDEL to the light-emitting device OLED.

For example, the third transistor T3 has a function of conducting the second node N2 and the reset potential line SVRE, supplying the reset potential VRES to the second node N2, and fixing the potential supplied to the second node N2 to the reset potential VRES. As will be described later, if the potential supplied to the second node N2 is fixed to the reset potential VRES, a current flows from the driving potential line PVDD to a fifth node N5, a fourth node N4, and a third node N3 via the fifth transistor T5, and the capacitive element CV (a first electrode 42 of the capacitive element CV) starts to be charged, and if the potential difference Vgs (the potential difference Vgs between a potential supplied to the gate electrode 622 (the second node N2) and a potential supplied to the first electrode 624 (the third node N3)) reaches the threshold voltage VTH, the charging is stopped.

The fourth transistor T4 has a function of conducting the third node N3 and the initialization potential line SVI, supplying the initialization potential VINI to the third node N3, and initializing the third node N3.

The fifth transistor T5 has a function of conducting the fifth node N5 and the fourth node N4.

The sixth transistor T6 has a function of conducting a first node N1 and the reference potential line SVR, supplying the reference potential line SVR to the first node N1, and fixing the potential supplied to the first node N1 to the reference potential VREF at the time of initialization of the first node N1, at the time of acquiring and holding the threshold voltage VTH, and at the time of writing the image data signal SL(m).

The seventh transistor T7 has a function of conducting the third node N3 and the standard potential line PVSS and supplying the standard potential VSSEL to the third node N3.

The eighth transistor T8 has a function of electrically connecting a first electrode 32 and a second electrode 34 of the light-emitting device OLED, setting a potential difference between the first electrode 32 and the second electrode 34 of the light-emitting device OLED to zero, and suppressing light emission of the light-emitting device OLED in a period other than the light-emitting period. In addition, the eighth transistor T8 has a function of charging the fifth node N5 and the third node N3 by supplying a current from the driving potential line PVDD to the second electrode 626 and the first electrode 624 of the second transistor T2 (that is, the fifth node N5 and the third node N3) at the time of acquiring and holding the threshold voltage VTH.

The capacitive element CV has a function of holding (storing) charges corresponding to the threshold voltage VTH of the second transistor T2. That is, the capacitive element CV has a function of holding (storing) a potential difference between the potential supplied to the first node N1 and the potential supplied to the second node N2, including information of the threshold voltage VTH of the second transistor T2. A method for driving the display device 10 includes acquiring the threshold voltage VTH from the first electrode 624 (source electrode) of the second transistor T2.

The capacitive element CD has a function of holding (storing) charges corresponding to data potentials (potentials equal to or higher than the potential VSIGL (see FIG. 5) and equal to or lower than the potential VSIGH (see FIG. 5)) included in the image data signal SL(m) supplied to the second node N2. That is, the capacitive element CD has a function of holding (storing) a potential difference between the potential supplied to the second node N2 and the potential supplied to the first node N1, including data potential information of the image data signal SL(m).

The light-emitting device OLED has a diode characteristic and has a function of emitting light based on a current flowing through the light-emitting device OLED. The current flowing through the light-emitting device OLED is a drain current (a current Ion) of the second transistor T2.

The first transistor T1 includes a gate electrode 612, a first electrode 614, and a second electrode 616. The gate electrode 612 is electrically connected to the scan signal line 333. The first electrode 614 is electrically connected to the image data signal line 321. The second electrode 616 is electrically connected to the second node N2, the gate electrode 622 of the second transistor T2, a second electrode 636 of the third transistor T3, and the second electrode 54 of the capacitive element CD. Switching of the first transistor T1 is controlled using the fourth scan signal SC4(*n*). In other words, in the first transistor T1, a conduction state (on state) and a non-conduction state (off state) are controlled by the fourth scan signal SC4(*n*). If the signal supplied to the fourth scan signal SC4(*n*) is LO, the first transistor T1 becomes non-conductive. If the signal supplied to the fourth scan signal SC4(*n*) is HI, the first transistor T1 becomes conductive.

The second transistor T2 includes the gate electrode 622, the first electrode 624, and a second electrode 626. The first electrode 624 is electrically connected to the third node N3, the first electrode 42 of the capacitive element CV, and a second electrode 676 of the seventh transistor T7. The second electrode 626 is electrically connected to the fifth node N5 and a first electrode 654 of the fifth transistor T5. The threshold voltage of the second transistor T2 is the threshold voltage VTH. The second transistor T2 controls the current flowing through the light-emitting device OLED in accordance with the potential difference Vgs and a potential difference Vds between a potential supplied to the second electrode 626 (the fifth node N5) and a potential supplied to the first electrode 624 (the third node N3). For example, if the potential difference Vgs is smaller than the threshold-voltage VTH, the second transistor T2 becomes non-conductive. In this case, since no current flows through the light-emitting device OLED, the pixel 180 displays black. For example, if the potential difference Vgs is equal to or higher than the threshold voltage VTH and the potential difference Vds is larger than 0 V, the second transistor T2 becomes conductive, and the current flowing through the light-emitting device OLED is controlled according to a magnitude based on the gradation of the display of the potential difference Vgs, and the light-emitting device OLED emits light with the luminance based on the gradation of the display.

The third transistor T3 includes a gate electrode 632, a first electrode 634, and the second electrode 636. The gate electrode 632 is electrically connected to the scan signal line 330. The first electrode 634 is electrically connected to the reset potential line SVRE. The third transistor T3 is switched using the first scan signal SC1(*n*). In other words, the third transistor T3 is controlled to be in a conductive state (on-state) or a non-conductive state (off-state) by the first scanning signal SC1(*n*). If the signal supplied to the first scan signal SC1(*n*) is LO, the third transistor T3 becomes non-conductive, and if the signal supplied to the first scan signal SC1(*n*) is HI, the third transistor T3 becomes conductive.

The fourth transistor T4 includes a gate electrode 642, a first electrode 644, and a second electrode 646. The gate electrode 642 is electrically connected to the scan signal line 335. The first electrode 644 is electrically connected to the initialization potential line SVI. The fourth transistor T4 is switched using the sixth scan signal SC6(*n*). In other words, in the fourth transistor T4, a conduction state (on state) and a non-conduction state (off state) are controlled by the sixth scan signal SC6(*n*). If the signal supplied to the sixth scan signal SC6(*n*) is LO, the fourth transistor T4 becomes non-conductive, and if the signal supplied to the sixth scan signal SC6(*n*) is HI, the fourth transistor T4 becomes conductive.

The fifth transistor T5 includes a gate electrode 652, the first electrode 654, and a second electrode 656. The gate electrode 652 is electrically connected to the scan signal line 331. The second electrode 656 is electrically connected to the fifth node N5, the first electrode 32 of the light-emitting device OLED, and a first electrode 684 of the eighth transistor T8. The fifth transistor T5 is switched using the second scan signal SC2(*n*). In other words, in the fifth transistor T5, a conduction state (on state) and a non-conduction state (off state) are controlled by the second scan signal SC2(*n*). If the signal supplied to the second scan signal SC2(*n*) is LO, the fifth transistor T5 becomes non-conductive, and if the signal supplied to the second scan signal SC2(*n*) is HI, the fifth transistor T5 becomes conductive.

The sixth transistor T6 includes a gate electrode 662, a first electrode 664, and a second electrode 666. The gate electrode 662 is electrically connected to the scan signal line 332. The first electrode 664 is electrically connected to the reference potential line SVR. The second electrode 666 is electrically connected to the first node N1, a second electrode 44 of the capacitive element CV, and a first electrode 52 of the capacitive element CD. The sixth transistor T6 is switched using the third scan signal SC3(*n*). In other words, in the sixth transistor T6, a conduction state (on state) and a non-conduction state (off state) are controlled by the third scan signal SC3(*n*). If the signal supplied to the third scan signal SC3(*n*) is LO, the sixth transistor T6 becomes non-conductive, and if the signal supplied to the third scan signal SC3(*n*) is HI, the sixth transistor T6 becomes conductive.

The seventh transistor T7 includes a gate electrode 672, a first electrode 674, and the second electrode 676. The gate electrode 672 is electrically connected to the scan signal line 331. The first electrode 674 is electrically connected to the standard potential line PVSS. The seventh transistor T7 is switched using the second scan signal SC2(*n*). In other words, in the seventh transistor T7, a conduction state (on state) and a non-conduction state (off state) are controlled by the second scan signal SC2(*n*). If the signal supplied to the second scan signal SC2(*n*) is LO, the seventh transistor T7 becomes non-conductive, and if the signal supplied to the second scan signal SC2(*n*) is HI, the seventh transistor T7 becomes conductive.

The eighth transistor T8 includes a gate electrode 682, the first electrode 684, and a second electrode 686. The gate electrode 682 is electrically connected to the scan signal line 332 and the gate electrode 662 of the sixth transistor T6. The second electrode 686 is electrically connected to the second electrode 34 of the light-emitting device OLED and the driving potential line PVDD. The eighth transistor T8 is switched using the third scan signal SC3(*n*). In other words, in the eighth transistor T8, a conduction state (on state) and a non-conduction state (off state) are controlled by the third scan signal SC3(*n*). If the signal supplied to the third scan signal SC3(*n*) is LO, the eighth transistor T8 becomes non-conductive, and if the signal supplied to the third scan signal SC3(*n*) is HI, the eighth transistor T8 becomes conductive.

The capacitive element CV includes the first electrode 42 and the second electrode 44.

The capacitive element CD includes the first electrode 52 and the second electrode 54.

The first electrode 32 of the light-emitting device OLED is a cathode electrode, and the second electrode 34 of the light-emitting device OLED is an anode electrode.

For example, it is assumed that the conductive state of the transistor in the display device 10 indicates a state in which the source electrode and the drain electrode of the transistor are conductive and the transistor is on (ON), and the non-conductive state of the transistor in the display device 10 indicates a state in which the source electrode and the drain electrode of the transistor are non-conductive and the transistor is off (OFF). In addition, in each transistor, the source electrode and the drain electrode may be replaced depending on the potential supplied to each electrode or voltage. In addition, even if the transistor is in the off state, it can be easily understood by a person skilled in the art that a slight current flows, such as a leakage current.

Each of the transistors shown in FIG. 3 is an n-channel field-effect transistor, and includes a Group 14 element such as silicon or germanium, or an oxide exhibiting semiconductor characteristics in a channel area. For example, crystalline silicon can be used as a channel area having a Group 14 element. The crystalline silicon may be low-temperature polysilicon (LTPS) or single-crystal silicon. Further, for example, a metal oxide having semiconductor characteristics can be used as an oxide exhibiting semiconductor characteristics. As an exemplary metal oxide having semiconductor properties, an oxide semiconductor containing two or more metals including indium (In) is used. As the metal oxide having semiconducting properties, in addition to indium, gallium (Ga), zinc (Zn), aluminum (Al), hafnium (Hf), yttrium (Y), zirconia (Zr), and lanthanoids may be used. Further, the metal oxide having semiconductor properties may be amorphous, may be crystalline, or may be a mixed phase of amorphous and crystalline.

For example, the transistors in the display device 10 are formed using a thin film transistor (TFT). The channel areas of the transistors may be formed using single-crystal silicon, such as silicon wafers or SOI substrates. In addition, in the case where the display device 10 includes both a transistor including a Group 14 element in the channel area and a transistor including an oxide including a semiconductor characteristic in the channel area, the method for manufacturing the display device 10 includes forming a semiconductor layer including the Group 14 element and forming a semiconductor layer including the oxide having the semiconductor characteristic (for example, an oxide semiconductor layer). The display device 10 may appropriately adapt a configuration of the transistor, connection of a storage capacitive element, a power supply potential, and the like according to the application and specifications.

For example, a leakage current of a transistor including a metal oxide having semiconductor characteristics is extremely small. Therefore, by using a transistor having a metal oxide having semiconductor characteristics, a charge corresponding to the potential written in the capacitive element is less likely to escape from the capacitive element. As a result, by using a transistor having a metal oxide having semiconductor characteristics, it is possible to hold the charge written in the capacitive element for a long time. In addition, under the same conditions of a gate-source potential difference (potential difference between the gate electrode and the source electrode) and a source-drain potential difference, a drain current of the transistor having the metal oxide having the semiconductor property may be larger than a drain current of the transistor having the crystalline silicon (for example, low-temperature polysilicon (LTPS)). As a result, under the same condition of the drain current, the gate-source potential difference and the source-drain potential difference of the transistor having the metal oxide having the semiconductor characteristics can be made smaller than those of the transistor having the crystalline silicon. Therefore, by using a transistor having a metal oxide having semiconductor characteristics, power consumption of the display device 10 can be suppressed.

[1-5. Driving Method of Display Device 10]

A method for driving the display device 10 will be described with reference to FIG. 4 to FIG. 8. FIG. 4 to FIG. 8 are schematic diagrams showing timing charts of the display device 10. Configurations that are the same as or similar to those in FIG. 1 to FIG. 3 are described as necessary, and descriptions of configurations that are the same as or similar to those in FIG. 1 to FIG. 3 may be omitted.

In addition, the horizontal axis of the timing charts in the respective embodiments represents time (TIME). Further, in the image data signal SL(m) including the data signal VDATA in the respective embodiments, for example, the data signal VDATA supplied to the selected pixel (pixel circuit) is indicated by a hatched line as a data potential equal to or higher than the potential VSIGL and equal to or lower than the potential VSIGH, and the data signal VDATA supplied to pixels (pixel circuits) other than the selected pixel (pixel circuit) is omitted and indicated by a solid line. In practice, the potential of the data signal VDATA supplied to the pixels (pixel circuits) other than the selected pixel (pixel circuit) is also continuously or intermittently supplied to the image data signal SL(m) including the data signal VDATA in the respective embodiments.

Figure 4:
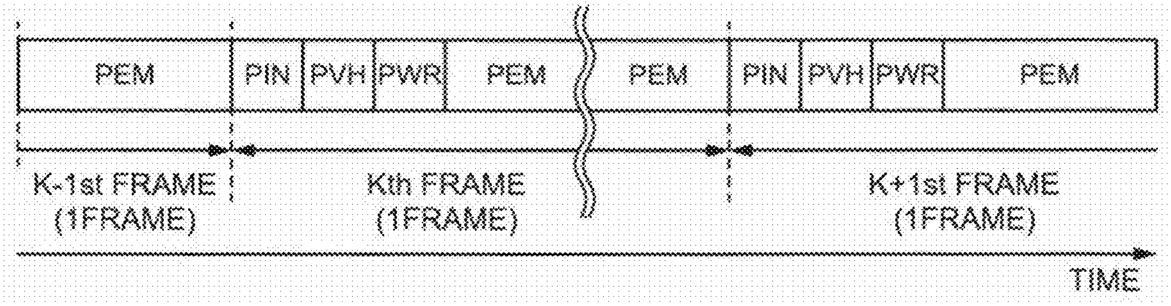
FIG. 4 is a timing chart of the display device according to the first embodiment of the present invention.

For example, the frequency at which the display device 10 is driven is 60 Hz, and one frame (1 FRAME) is driven at 60 Hz. For example, FIG. 4 shows a current frame (Kth FRAME), a part of a previous frame of the current frame (K−1st FRAME), and a part of a subsequent frame of the current frame (K+1st FRAME). Also, FIG. 5 to FIG. 8 show an emission period PEM of the previous frame of the current frame (K−1st FRAME), a period PIN, a period PVH, a period PWR, and a period PEM of the current frame (Kth FRAME), and a period PIN, a period PVH, a period PWR and a period PEM of the subsequent frame of the current frame. Further, FIG. 5 to FIG. 8 show one horizontal period (horizontal period HRP) for one pixel 180 (pixel circuit 181).

First, an overview of the method for driving the display device 10 will be described with reference to FIG. 4. As shown in FIG. 4, the driving method of the display device 10 includes at least an initialization period PIN (period PIN), a threshold voltage acquiring and holding period PVH (period PVH), and a write period PWR (period PWR) in one frame. In the pixel 180 (pixel circuit 181) included in the display device 10, the period PWR is executed after the period PVH. Further, after the light emission period PEM of the previous frame of the current frame, the period PIN, the period PVH, and the period PWR of the current frame are executed, and after the light emission period PEM of the current frame, the period PIN, the period PVH, and the period PWR of the subsequent frame of the current frame are executed.

The period PIN is a period in which the first node N1, the second node N2, and the third node N3 are initialized. The period PVH is a period in which the threshold voltage of the second transistor T2 is acquired by performing an operation in which the potential difference Vgs of the second transistor T2 becomes equal to the threshold voltage, and charges corresponding to the threshold voltage are held in the capacitive element CV. The period PWR is a period in which the data signal VDATA is written to the pixel 180 (the pixel circuit 181). That is, the period PWR is a period in which the data potential is supplied to the second node N2 and charges corresponding to the data potential are held in the capacitive element CD. Further, the light emission period PEM is a period in which the pixel 180 emits light based on the written data potential and the acquired threshold voltage of the second transistor T2 (threshold voltage correction).

Next, a specific method for driving the pixel 180 (pixel circuit 181) of the display device 10 will be described with reference to FIG. 4 to FIG. 8.

The pixel 180 (pixel circuit 181) receives the first scan signal SC1(*n*), the second scan signal SC2(*n*), the third scan signal SC3(*n*), the fourth scan signal SC4(*n*), the fifth scan signal SC5(*n*), the sixth scan signal SC6(*n*), the image data signal SL(m) including the data signal VDATA, the reset potential VRES, the initialization potential VINI, and the reference potential VREF. For example, the pixel 180 (the pixel circuit 181) is selected according to timings of the first scan signal SC1(*n*), the second scan signal SC2(*n*), the third scan signal SC3(*n*), the fourth scan signal SC4(*n*), the fifth scan signal SC5(*n*), and the sixth scan signal SC6(*n*). The image data signal SL(m), the reset potential VRES, the initialization potential VINI, and the reference potential VREF are input to the selected pixel 180 (pixel circuit 181) in accordance with the timings of the respective signals. A similar operation is performed on all the pixels 180 (pixel circuits 181), and an image of the frame corresponding to 1 FRAME is displayed in the display area 22 of the display device 10 on the basis of the image data signal SL(m) input to all the pixels 180 (pixel circuits 181).

For example, the potentials supplied to each signal and each node in each period of each frame of the timing charts shown in FIG. 4 to FIG. 8 are shown in Table 1.

TABLE 1

| | Setting value [V] |
|---|---|
| VTH | 1 |
| VSIGL(black) | 0 |
| VSIGH(white) | 4 |
| HI | 10 |
| LO | −2 |
| VINI | −1 |
| VREF | 2.2 |
| VRES | 1 |
| VDDEL | 8 |
| VSSEL | 0 |

For example, as shown in Table 1, the potential VSIGH is 4 V, and the pixel 180 to which the potential VSIGH is supplied emits light and emits white color. Further, for example, the potential VSIGL is 0 V, and the pixel 180 to which the potential VSIGL is supplied does not emit light and becomes black. For example, the threshold voltage VTH of the second transistor T2 is 1 V, a potential VH (HI) is 10 V, a potential VL (LO) is −2 V, the initialization potential VINI is −1 V, the reference potential VREF is 2.2 V, the reset potential VRES is 1 V, the driving potential VDDEL is 8 V, the standard potential VSSEL is 0 V, and a potential VM is 5 V. That is, the reference potential VREF is different from the reset potential VRES, and the reference potential VREF and the reset potential VRES are higher than the standard potential VSSEL and lower than the driving potential VDDEL. The initialization potential VINI is lower than the standard potential VSSEL. Each potential shown in Table 1 is an example, and each potential of the display device 10 is not limited to each potential shown in Table 1. Each potential of the display device 10 can be appropriately selected according to the application and specifications of the display device 10.

[1-5-1. First Example of Method for Driving Display Device 10]

Figure 5:
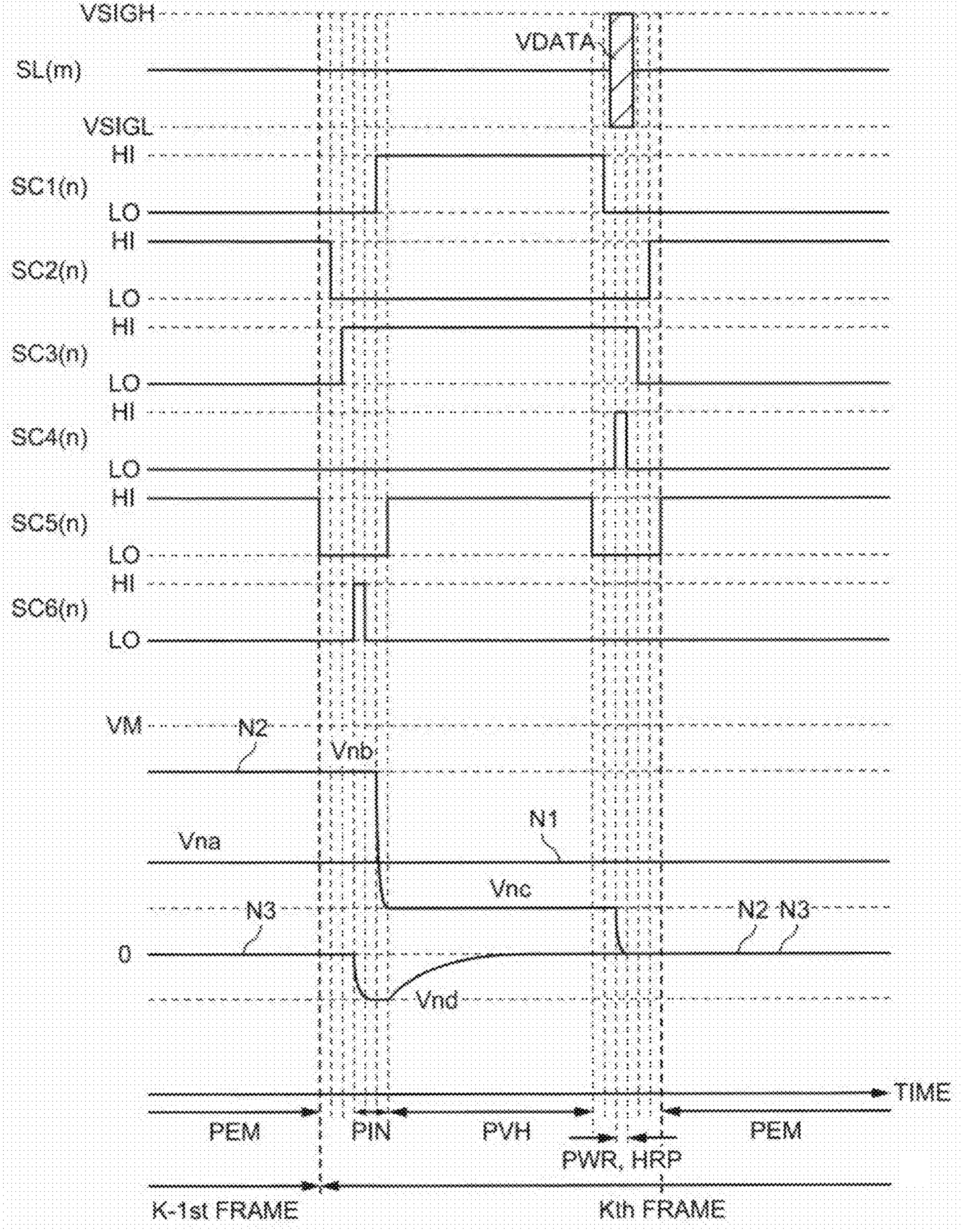
FIG. 5 is a timing chart of the display device according to the first embodiment of the present invention.

A first example of the method for driving the display device 10 will be described with reference to FIG. 5 and Table 1. The driving method shown in the first embodiment include displaying a black image based on the potential VSIGL of the data signal VDATA in the Kth FRAME after the pixel 180 (pixel circuit 181) displays a white image based on the potential VSIGH of the data signal VDATA in the previous frame (K−1st FRAME) of the current frame (Kth FRAME), and then displaying a black image based on the potential VSIGL of the data signal 180 (pixel circuit 181). In other words, the driving method shown in the first example includes displaying images of different colors in successive frames.

The image data signal SL(m) including the data signal VDATA is input to each pixel 180 (pixel circuit 181) in accordance with each period. The data signal VDATA is analog data (analog potential) including a potential that is greater than or equal to the potential VSIGL and less than or equal to the potential VSIGH. For example, in the period PWR, a potential equal to or higher than the potential VSIGL and equal to or lower than the potential VSIGH is selected by using a selection signal (not shown), and is supplied to the image data signal SL(m). For example, in a period excluding the period PWR, the data signal VDATA is supplied with a potential that is supplied to pixels other than the selected pixel 180 (the pixel circuit 181).

The emission period PEM of the K−1st FRAME is a period in which the pixel 180 (the pixel circuit 181) emits light in accordance with the potential difference Vgs of the second transistor T2. For example, the pixel 180 (the pixel circuit 181) emits red light, and three pixels using the pixel 180 emitting red light, the pixel 180 emitting blue light, and the pixel 180 emitting green light emit white light.

For example, in the light emission period PEM of the K−1st FRAME, the image data signal SL(m) (data signal VDATA) is supplied with the potential of the data signal VDATA supplied to pixels other than the selected pixel 180 (pixel circuit 181), LO is supplied to the first scan signal SC1(*n*), the third scan signal SC3(*n*), the fourth scan signal SC4(*n*), and the sixth scan signal SC4(*n*), and HI is supplied to the second scan signal SC2(*n*) and the fifth scan signal SC5(*n*). The first transistor T1, the third transistor T3, the fourth transistor T4, the sixth transistor T6, and the eighth transistor T8 are in the off state, and the fifth transistor T5 and the seventh transistor T7 are in the on state. Further, for example, in this case, the potential held at the first node N1 is a potential Va (reference potential VREF, 2.2 V), the potential held at the third node N3 is 0 V, the potential held at the second node N2 is a potential Vnb (potential VSIGH, 4 V), and the potential difference Vgs is 4 V. Therefore, the second transistor T2 is in the on state, and the light-emitting device OLED and the standard potential line PVSS can be supplied with the potential difference Vgs corresponding to the potential VSIGH input in a horizontal period HRP of the K−1st FRAME and a current Ion based on the potential difference Vds from the driving potential line PVDD. Consequently, the light-emitting device OLED emits light. For example, the pixel 180 (pixel circuit 181) emits red light, and the three pixels using the pixel 180 emitting red light, the pixel 180 emitting blue light, and the pixel 180 emitting green light emit white light. In addition, a potential held in the first node N1 is a potential Vna (2.2 V) due to capacitive coupling by the capacitive element CV and the capacitive element CD.

In a period between the light emission period PEM of the K−1st FRAME and the period PIN of the Kth FRAME following the light emission period PEM of the K−1st FRAME, the potential of the data signal VDATA supplied to pixels other than the selected pixel 180 (pixel circuit 181) is supplied to the image data signal SL(m) (data signal VDATA). First, the fifth scan signal SC5(*n*) changes from the state where HI is supplied to the state where LO is supplied. If the fifth scan signal SC5(*n*) is supplied with LO, the second scan signal SC2(*n*) changes from the state where HI is supplied to the state where LO is supplied. If the second scan signal SC2(*n*) is supplied with LO, the third scan signal SC3(*n*) changes from the state where LO is supplied to the state where HI is supplied. The first scan signal SC1(*n*), the fourth scan signal SC4(*n*), and the sixth scan signal SC6(*n*) are in the state where LO is supplied.

Further, in the period PIN of the Kth FRAME, the potential of the data signal VDATA supplied to the pixel 180 (pixel circuit 181) other than the selected pixel is supplied to the image data signal SL(m) (data signal VDATA). If the third scan signal SC3(*n*) is supplied with HI, the sixth scan signal SC6(*n*) changes from the state where LO is supplied to the state where HI is supplied. The sixth scan signal SC6(*n*) is maintained in the state in which HI is supplied, and then changes from the state in which HI is supplied to the state in which LO is supplied. If the sixth scan signal SC6(*n*) is supplied with LO, the first scan signal SC1(*n*) changes from the state where LO is supplied to the state where HI is supplied. The second scan signal SC2(*n*), the fourth scan signal SC4(*n*), and the fifth scan signal SC5(*n*) remain in the state where LO is supplied, and the third scan signal SC3(*n*) remains in the state where HI is supplied.

Consequently, in a period between the light-emitting period PEM of the K−1st FRAME and the period PIN of the Kth FRAME to the period PIN of the Kth FRAME, the fifth transistor T5 and the seventh transistor T7 are turned from the on state to the off state, and the current Ion stops flowing from the driving potential line PVDD to the light emitting element OLED and the standard potential line PVSS. The sixth transistor T6 and the eighth transistor T8 are turned from the off state to the on state, the potential difference between the first electrode 32 and the second electrode 34 of the light-emitting device OLED is turned to 0 V, the light emission of the light-emitting device OLED is stopped, the first node N1 is conducted to the reference potential line SVR, and the potential Vna (reference potential VREF, 2.2 V) is supplied to the first node N1. The potential Vna has already been supplied to the first node N1, and the potential supplied to the first node N1 is maintained at the potential Vna. Therefore, the potential supplied to the first node N1 continues to be maintained at the potential Vna. Here, the potential Vna (2.2 V) is a potential supplied to the first node N1 in the emission period PEM of the K−1st FRAME in the case where the threshold voltage VTH of the second transistor T2 is 1 V. For example, in the case where the threshold voltage VTH is 1.1 V due to manufacturing variations, the potential in the light emission period PEM of the K−1st FRAME becomes 2.3 V, and since the reference potential VREF (2.2 V) is supplied to the first node N1, the potential supplied to the first node N1 changes from the potential Vna (2.3 V) to the reference potential VREF (2.2 V). Further, since the first transistor T1 and the third transistor T3 are maintained in the off state, the potential supplied to the second node N2 is maintained at the potential Vnb. In this case, the potential difference Vgs remains at 4 V, and the second transistor T2 is in the on state. If the sixth scan-signal SC6(*n*) is supplied with HI, the fourth transistor T4 is turned from the off state to the on state, and the third node N3 is electrically connected to the initialization potential line SVI. Further, since the second transistor T2 and the fourth transistor T4 are in the on state, the current Ion flows from the fifth node N5 and the third node N3 toward the initialization potential line SVI. That is, the potential supplied to the fifth node N5 and the potential supplied to the third node N3 become the initialization potential VINI (potential Vnd, −1 V). Further, if the sixth scan signal SC6(*n*) changes from the state where HI is supplied to the state where LO is supplied, the first scan signal SC1(*n*) is supplied with HI, the third transistor T3 is turned from the off state to the on state, the second node N2 is electrically connected to the reset potential line SVRE, and the potential supplied to the second node N2 drops from the potential Vnb toward a reset potential (potential Vnc, 1 V) to become the potential Vnc.

As described above, in the period PIN, the first node N1 is initialized by the reference potential VREF, the second node N2 is initialized by the reset potential VRES, and the third node N3 (the fifth node N5) is initialized by the initialization potential VINI.

In the period PVH following the period PIN, the image data signal SL(m) (data signal VDATA) is supplied with the potential of the data signal VDATA supplied to pixels other than the selected the pixel 180 (pixel circuit 181), the fifth scan signal SC5(*n*) changes from the state where LO is supplied to the state where HI is supplied, and the fifth transistor T5 is turned from the off state to the on state. The other scan signals and the other transistors are in the same condition as the period PIN.

Consequently, in the period PVH, the first node N1 maintains the potential Vna and the second node N2 maintains the potential Vnc. Further, at the beginning of the period PVH, the potential difference Vgs is 2 V and the second transistor T2 is in the on state. Since the eighth transistor T8, the fifth transistor T5, and the second transistor T2 are in the on state, the fourth node N4, the fifth node N5, and the third node N3 are conducted, and the current Ion flows from the driving potential line PVDD to the fourth node N4, the fifth node N5, and the third node N3. Therefore, since the sixth scan signal SC6(*n*) is already supplied with LO and the fourth transistor is in the off state, the potential supplied to the third node N3 is already released, and gradually rises from the potential Vnd (third node N3 is charged). When the potential difference Vgs (the potential difference between the potential supplied to the second node N2 and the potential supplied to the third node N3) becomes the threshold voltage VTH, the second transistor T2 is turned off. At this time, the first node N1 maintains the potential Vna (2.2 V) and the second node N2 maintains the potential Vnc (1 V). Therefore, for example, in the case where the threshold voltage VTH is 1 V (designed value), the potential supplied to the third node N3 is 0 V. In this case, with reference to the potential Vnc (a reset potential VRST) supplied to the second node N2, the potential difference between the potential Vnc supplied to the second node N2 (the second electrode 54 of the capacitive element CD) and 0 V supplied to the third node N3 (the first electrode 42 of the capacitive element CV) becomes the threshold voltage VTH (the potential of the third node N3=VRES−VTH). In practice, the threshold voltage VTH varies in manufacturing, for example, in the case where the threshold voltage VTH becomes 1.1 V, the potential supplied to the third node N3 becomes −0.1 V. The method for driving the display device 10 can realize the correction of the threshold voltage VTH by the operation in the period PVH because the method for driving the display device 10 includes acquiring the threshold voltage VTH by the operation in the period PVH and applying the correction using the acquired threshold voltage VTH.

As described above, in the period PVH, by making the potential difference Vgs of the second transistor T2 equal to the threshold voltage VTH, the threshold voltage VTH of the second transistor T2 is acquired, and a charge equivalent to the threshold voltage VTH is held in the capacitive element CV.

In a period between the period PVH and the period PWR following the period PVH, the potential of the data signal VDATA supplied to pixels other than the selected pixel 180 (the pixel circuit 181) is supplied to the image data signal SL(m) (the data signal VDATA). First, the fifth scan signal SC5(*n*) changes from the state where HI is supplied to the state where LO is supplied. If the fifth scan signal SC5(*n*) is supplied with LO, the first scan signal SC1(*n*) changes from the state where HI is supplied to the state where LO is supplied. The third scan signal SC3(*n*) is supplied with HI, and the second scan signal SC2(*n*), the fourth scan signal SC4(*n*), and the sixth scan signal SC6(*n*) are supplied with LO. The fifth transistor T5 and the third transistor T3 are turned from the on state to the off state. The rest of the transistors are similar to the period PVH. The potential supplied to the first node N1 maintains the potential Vna, the potential supplied to the second node N2 maintains the potential Vnc (1 V), the potential supplied to the third node N3 maintains 0 V, and the potential difference Vgs is 1 V.

In the period PWR following the period between the period PVH and the period PWR, the image data signal SL(m) (the data signal VDATA) is supplied with the potential VSIGL (0 V). The fourth scan signal SC4(*n*) changes from the state where LO is supplied to the state where HI is supplied, and the first transistor T1 is turned from the off state to the on state. The control signal and the transistor are the same as those of the period PVH. The potential supplied to the first node N1 maintains the potential Vna, and the potential supplied to the third node N3 maintains 0 V. Since the first transistor T1 is turned from the off state to the on state, the second node N2 is electrically connected to the image data signal line 321, and the potential supplied to the second node N2 gradually drops from the potential Vnc toward 0 V (potential VSIGL) and becomes 0 V. In this case, the capacitive element CD maintains the potential difference (−2.2 V based on the potential supplied to the first node N1) by holding a charge equivalent to the potential difference between Vna (reference potential VREF, 2.2 V) supplied to the first node N1 and 0 V supplied to the second node N2. Further, the capacitive element CV maintains the potential difference (2.2 V based on the potential supplied to the third node N3) by holding a charge equivalent to the potential difference between Vna (reference potential VREF, 2.2 V) supplied to the first node N1 and 0 V supplied to the third node N3. A sum (−2.2 V+2.2 V) of the potential difference held in the capacitive element CD and the potential difference held in the capacitive element CV is 0 V, that is, the potential difference Vgs is 0 V. Therefore, the second transistor T2 is in the off state.

As described above, in the period PWR, the data signal VDATA is written to the pixel 180 (pixel circuit 181). The capacitive element CD maintains (holds) the data potential of the data signal VDATA.

During a period after the period PWR, the fourth scan signal SC4(*n*) changes from the state where HI is supplied to the state where LO is supplied. If the fourth scan signal SC4(*n*) is supplied with LO, the third scan signal SC3(*n*) changes from the state where HI is supplied to the state where LO is supplied. If LO is supplied to the third scan signal SC3(*n*), the second scan signal SC2(*n*) changes from the state where LO is supplied to the state where HI is supplied. The first transistor T1, the sixth transistor T6, and the eighth transistor T8 are turned from the on state to the off state, and the seventh transistor T7 is turned from the off state to the on state. The other scan signals and the other transistors are the same as the period PWR. The potential supplied to the first node N1 capacitively coupled by the capacitive element CV and the capacitive element CD maintains the potential Vna, and the potential supplied to the second node N2 and the potential supplied to the third node N3 maintain 0 V. That is, the potential difference Vgs is maintained at 0 V, and the second transistor T2 is in the off state.

In the light emission period PEM of the Kth FRAME following the period PWR of the Kth FRAME, the potential of the data signal VDATA supplied to pixels other than the selected pixel 180 (pixel circuit 181) is supplied to the image data signal SL(m) (data signal VDATA). The fifth scan signal SC5(*n*) changes from the state where LO is supplied to the state where HI is supplied. Therefore, the fifth transistor T5 is turned from the off state to the on state. The other scan signals and the other transistors are in the same condition as the period after the period PWR of the Kth FRAME.

Consequently, the fifth transistor T5 is turned on, and the first electrode 32 of the light-emitting device OLED is electrically connected to the second electrode 626 (the fifth node N5) of the second transistor T2. Since the seventh transistor T7 is turned on, the third node N3 is electrically connected to the standard potential line PVSS, and the third node N3 is supplied with the standard potential VSSEL (0 V). The potential supplied to the third node N3 maintains 0 V because the third node N3 has been supplied with 0 V. The potential supplied to the second node N2 maintains 0 V by the capacitive coupling between the capacitive element CD and the capacitive element CV. The first node N1 also maintains 2.2 V by the capacitive coupling between the capacitive element CD and the capacitive element CV. In addition, for example, in the case where the threshold voltage VTH is 1 V (setting value) by manufacturing, even if the seventh transistor T7 is turned on, the potential supplied to the third node N3 remains 0 V and does not change, in the case where the threshold voltage VTH is 1.1 V due to manufacturing variation, the potential supplied to the third node N3 becomes −0.1 V, and the seventh transistor T7 is turned to the on state, thereby the potential supplied to the third node N3 changes from −0.1 V to 0 V. The potential difference Vgs is a sum of the potential difference held in the capacitive element CD and the potential difference held in the capacitive element CV (potential (potential VSIGL, 0 V) of the data signal VDATA-reference potential VREF (2.2 V)+reference potential VREF (2.2 V)−(reset potential VRES (1 V)−threshold voltage VTH (1 V)=0 V). In the pixel 180 (pixel circuit 181) in which the data signal VDATA includes the potential VSIGL, the potential difference Vgs is 0 V and the second transistor T2 is in the off state, so that the drain current Ion does not flow. Therefore, the light-emitting device OLED does not emit light. As a result, the pixel 180 (pixel circuit 181) emitting red light becomes black. Similar to the pixel 180 that emits red light, the pixel 180 that emits blue light and the pixel 180 that emits green light do not emit light, and therefore, the three pixels that use the pixel 180 that emits red light, the pixel 180 that emits blue light, and the pixel 180 that emits green light become black.

As described above, the display device 10 does not include a transistor connected between the gate electrode 622 of the second transistor T2 and the second electrode 54 of the capacitive element CD, and has a configuration in which the gate electrode 622 of the second transistor T2 is connected to the second electrode 54 of the capacitive element CD. In addition, the display device 10 has a configuration in which the light-emitting device OLED is arranged between the second electrode 626 of the second transistor T2 and the driving potential line PVDD. Further, the display device 10 includes the capacitive element CV and the capacitive element CD connected in series, and includes a configuration in which the first electrode 52 of the capacitive element CD and the second electrode 44 of the capacitive element CV are connected to the first node N1, and a configuration in which the reference potential VREF is supplied to the first node N1, and a configuration in which a potential difference corresponding to a charge corresponding to a data potential is acquired and maintained on the basis of the reference potential VREF in the capacitive element CD, and a potential difference corresponding to a charge corresponding to a threshold voltage of the second transistor T2 is acquired and maintained in the capacitive element CV on the basis of the reference potential VREF. In addition, the display device 10 is capable of independently controlling each node. In addition, the method for driving the display device 10 includes executing the period PWR after the period PVH, and includes supplying the driving potential VDDEL (or a potential larger than the driving potential VDDEL) to the fourth node N4 in the period PVH.

For example, in the method for driving the display device 10 including the configuration described above, in the period PVH, the second electrode 626 of the second transistor T2 is supplied with the driving potential VDDEL, so that the current Ion flowing through the second transistor T2 can be increased. Therefore, the display device 10 can acquire the threshold voltage at high speed.

Further, for example, the method for driving the display device 10 including the configuration described above can set the potential supplied to the gate electrode 622 and the potential supplied to the first electrode 624 of the second transistor T2 in the period PWR to be the same as the potential supplied to the gate electrode 622 and the potential supplied to the first electrode 624 of the second transistor T2 in the period PEM. As a result, it is possible to minimize the potential loss that the write potential decreases at the time of light emission.

Further, the display device 10 can apply information (data) about the threshold voltage VTH to a low potential side of the potential difference Vgs of the second transistor T2 (the first electrode 42, the first electrode 624, and the third node N3 of the capacitive element CV) with respect to the reference potential VREF, can apply the potential (data) of the data signal VDATA to the high potential side of the potential difference Vgs of the second transistor T2 (the second electrode 54 of the capacitive element CD, the gate electrode 622, and the second node N2), and can minimize fluctuations in the potentials (potential fluctuations) supplied to the first node N1, the second node N2, and the third node N3 in the period PWR to the light emission period PEM. In addition, in the display device 10, the potential supplied to the gate electrode 622 and the potential supplied to the first electrode 624 of the second transistor T2 in the period PWR can be made the same as the potential supplied to the gate electrode 622 and the potential supplied to the first electrode 624 of the second transistor T2 in the period PEM. Therefore, the display device 10 can suppress power consumption in the period PWR to the light emission period PEM, and is also capable of suppressing charge redistribution caused by the gate capacitance (capacitance between the gate electrode 622 and the second electrode 626) of the second transistor T2 due to the potential variation of the second node N2. As a result, the display device 10 can minimize the potential loss that the write potential decreases during the light emission.

[1-5-2. Second Example of Method for Driving Display Device 10]

Figure 6:
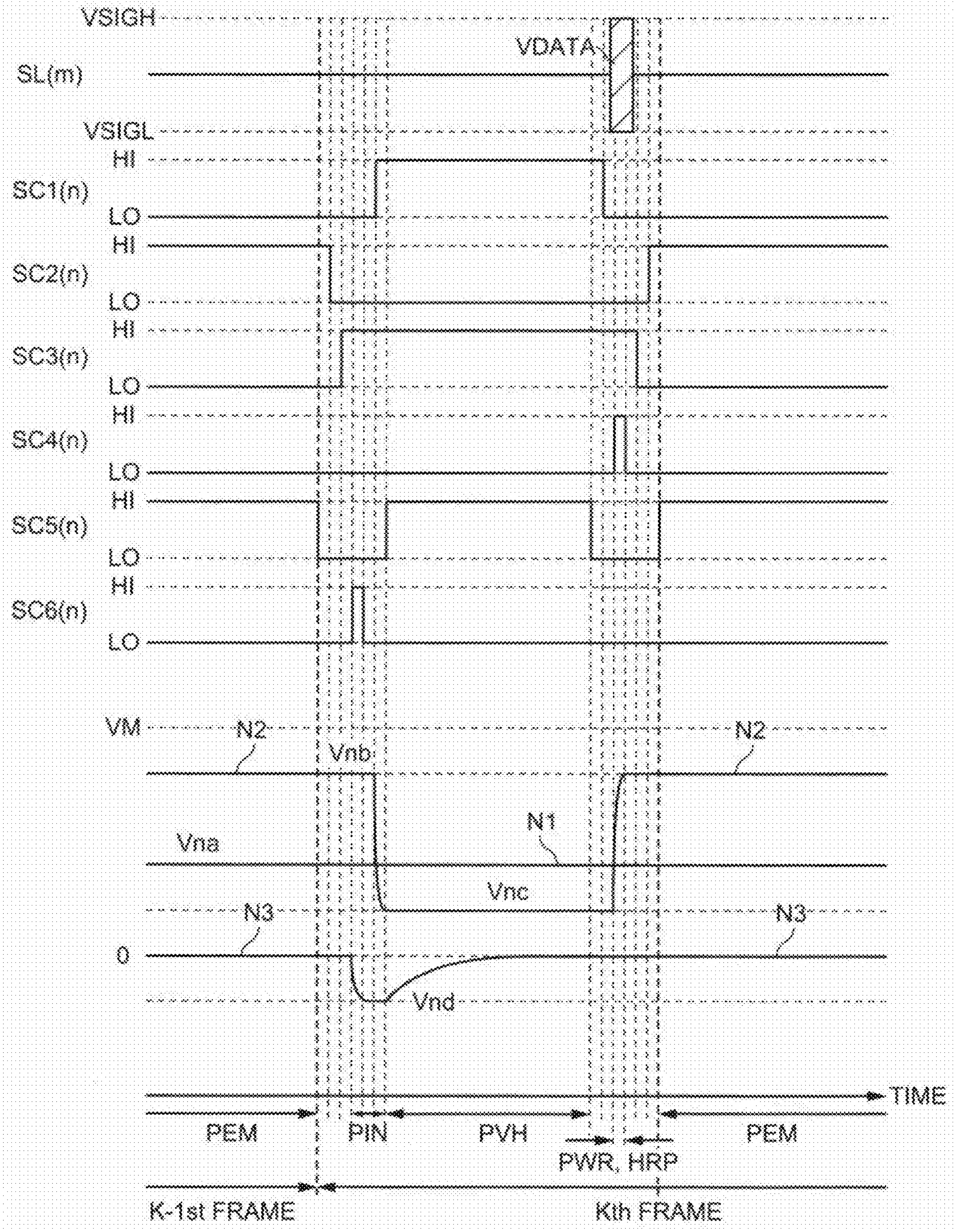
FIG. 6 is a timing chart of the display device according to the first embodiment of the present invention.

A second example of the method for driving the pixel circuit 181 will be described with reference to FIG. 6. The driving methods shown in the second embodiment include that the pixel 180 (pixel circuit 181) displays a white image based on the potential VSIGH included in the data signal VDATA in the previous frame (K−1st FRAME) of the current frame (Kth FRAME), and then the pixel 180 (pixel circuit 181) displays a white image based on the potential VSIGH included in the data signal VDATA in the Kth FRAME. In other words, the driving method shown in the second example includes displaying images of the same color (white) in consecutive frames. Configurations that are the same as or similar to those in FIG. 1 to FIG. 5 will be described as necessary.

Potentials and the like of the respective nodes in the emission period PEM of the K−1th FRAME to the period PVH of the Kth FRAME and in a period between the period PVH of the Kth FRAME and the period PWR of the Kth FRAME are the same as those described in the section "1-5-1. First Example of Method for Driving Display Device 10". The configuration of each scan signal and the operation of each transistor in each period are the same as the configuration described in the section "1-5-1. First Example of Driving Method of Display Device 10". Therefore, configurations and the like similar to those described in the section "1-5-1. First Example of Method for Driving Display Device 10" are described as necessary and may be omitted. In addition, the image data signal SL(m) is supplied with the data signal VDATA including the VSIGH (4 V) corresponding to white color in the period PWR of the Kth FRAME, and the same data signal VDATA as the configuration described in the section "1-5-1. First Example of Method for Driving Display Device 10" is supplied in the period other than the period PWR of the Kth FRAME.

In the emission period PEM of the K−1st FRAME, similar to the configuration described in the section "1-5-1. First Example of Method for Driving Display Device 10", the pixel 180 emits white light by the three pixels using the pixel 180 emitting red light, the pixel 180 emitting blue light, and the pixel 180 emitting green light.

Similar to the configuration described in the section "1-5-1. First Example of Driving the Display Device 10", from a period between the light emission period PEM of the K−1st FRAME and the period PIN of the Kth FRAME to the period PIN of the Kth FRAME, the first node N1 is initialized by the reference potential VREF, the second node N2 is initialized by the reset potential VRES, and the third node N3 (fifth node N5) is initialized by the initialization potential VINI.

In the period PVH following the period PIN, similar to the configuration described in the section "1-5-1. First Example of Method for Driving Display Device 10", the threshold voltage VTH of the second transistor T2 is acquired by the operation in which the potential difference Vgs of the second transistor T2 becomes the same as the threshold voltage VTH, and the charge corresponding to the threshold voltage VTH is held in the capacitive element CV.

In the period between the period PVH and the period PWR following the period PVH, similar to the configuration described in the section "1-5-1. First Example of Method for Driving Display Device 10", the potential supplied to the first node N1 maintains the potential Vna and the potential supplied to the second node N2 maintains the potential Vnc (1 V), the potential supplied to the third node N3 maintains 0 V, and the potential difference Vgs is 1 V.

In the period PWR following the period between the period PVH and the period PWR following the period PVH, the image data signal SL(m) (data signal VDATA) is supplied with the potential VSIGH (potential Vnb, for example, 4 V). The potential supplied to the first node N1 maintains the potential Vna, and the potential supplied to the third node N3 maintains 0 V. The potential supplied to the second node N2 gradually increases from the potential Vnc (reset potential VRES, 1 V) toward the potential Vnb, and becomes the potential Vnb. In this case, the capacitive element CD maintains the potential difference (1.8 V with reference to the potential supplied to the second node N1) by holding charges corresponding to the potential difference (1.8 V) between Vna (reference potential VREF, 2.2 V) supplied to the first node N1 and 4 V (potential VSIGH) supplied to the second node N2. Further, the capacitive element CV maintains the potential difference (2.2 V with reference to the potential supplied to the third node N3) by holding charges corresponding to the potential difference between Vna (the reference potential VREF, 2.2 V) supplied to the first node N1 and 0 V supplied to the third node N3. A sum (1.8 V+2.2 V) of the potential difference held in the capacitive element CD and the potential difference held in the capacitive element CV is 4 V, and the potential difference Vgs is 4 V. Therefore, the second transistor T2 is in the on state. For example, if the threshold voltage VTH varies, and the potential supplied to the third node N3 becomes 0.1V (if the threshold voltage VTH becomes 0.9 V, the potential of the third node N3 becomes VRES (1 V)−VTH (0.9 V)=0.1 V), the potential difference Vgs becomes 3.9 V (Vgs=(VDATA (Vnb, 4 V)−VREF (2.2 V))+(VRES (2.2 V)−0.1 V)). That is, when the threshold-voltage VTH is 0.1V lower than the setting value, the write potential difference Vgs is 3.9V, which is 0.1 V lower than the setting value of 4 V.

As described above, in the period PWR, the data signal VDATA is written to the pixel 180 (pixel circuit 181). The capacitive element CD maintains (holds) the data potential of the data signal VDATA.

In a period after the period PWR, the potential supplied to the first node N1 capacitively coupled by the capacitive element CV and the capacitive element CD maintains the potential Vna, the potential supplied to the second node N2 maintains the potential Vnb, and the potential supplied to the third node N3 maintains 0 V. That is, the potential difference Vgs is maintained at 4 V, and the second transistor T2 is in the on state.

In the emission period PEM of the Kth FRAME following the period PWR of the Kth FRAME, the potential supplied to the third node N3 maintains 0 V, and the potential supplied to the second node N2 maintains 4 V by the capacitive coupling between the capacitive element CD and the capacitive element CV. The potential difference Vgs is the sum of the potential difference held in the capacitive element CD and the potential difference held in the capacitive element CV (potential of the data signal VDATA (potential VSIGH, 4 V)−reference potential VREF (2.2 V)+reference potential VREF (2.2 V)−(reset potential VRES (1 V)−threshold voltage VTH (1 V))=4 V). In the case where the data signal VDATA includes the potential VSIGH, the potential difference Vgs is 4 V and the second transistor T2 is in the on state, so that the current Ion flows from the driving potential line PVDD to the light emitting element OLED and the reference potential line PVSS, causing the light emitting element OLED to emit light. For example, the pixels 180 that emit red light, the pixels 180 that emit blue light, and the pixels 180 that emit green light emit light, respectively, and the three pixels using the pixel 180 that emit red light, the pixel 180 that emit blue light, and the pixel 180 that emit green light becomes white. In other words, the pixel 180 (pixel circuit 181) can display images based on the data signal VDATA and the corrected threshold voltage.

The second example of the method for driving the display device 10 has the same effects as those described in the section “1-5-1. First Example of Method for Driving Display Device 10”.

[1-5-3. Third Example of Method for Driving Display Device 10]

Figure 7:
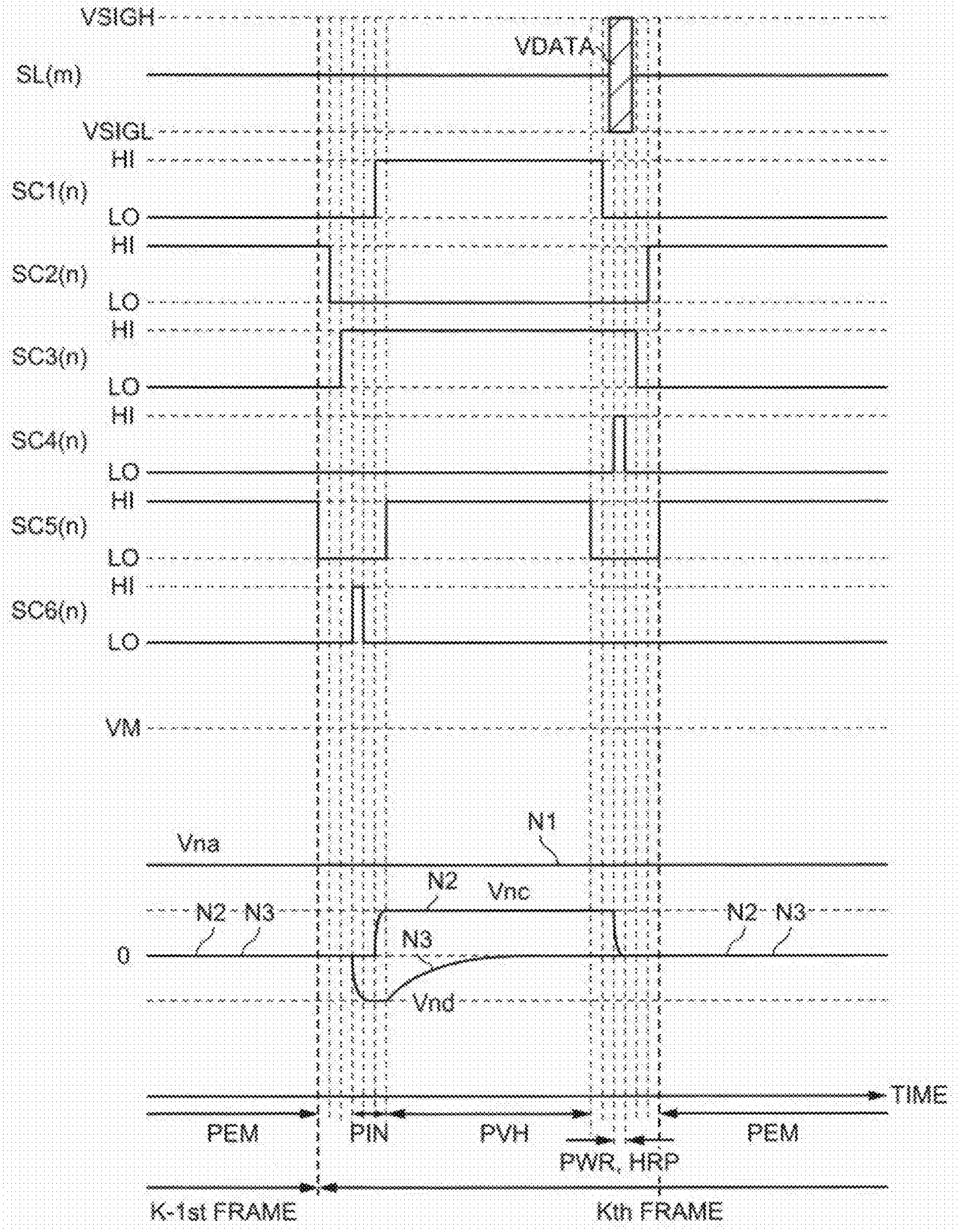
FIG. 7 is a timing chart of the display device according to the first embodiment of the present invention.

A third example of the method for driving the display device 10 will be described with reference to FIG. 7. The driving method shown in the third example includes that the pixel 180 (pixel circuit 181) displays a black image based on the potential VSIGL included in the data signal VDATA in the previous frame (K−1st FRAME) of the current frame (Kth FRAME), and then the pixel 180 (pixel circuit 181) displays a black image based on the potential VSIGL included in the data signal VDATA in the Kth FRAME. In other words, the driving method shown in the third example includes displaying images of the same color (black) in consecutive frames. Configurations that are the same as or similar to those in FIG. 1 to FIG. 6 will be described as necessary.

The potentials and the like of the respective nodes in the period PVH of the Kth FRAME to the emission period PEM of the Kth FRAME are the same as those described in the section “1-5-1. First Example of Method for Driving Display Device 10”. The configuration of each scan signal and the operation of each transistor in each period are the same as the configuration described in the section “1-5-1. First Example of Method for Driving Display Device 10”. Therefore, configurations and the like similar to those described in the section “1-5-1. First Example of Method for Driving Display Device 10” will be described as necessary.

In the emission period PEM of the K−1st FRAME, for example, the potential held in the first node N1 is the potential Vna (2.2 V). Further, the potential supplied to the second node N2 and the potential held at the third node N3 are 0 V, and the potential difference Vgs is 0 V. Therefore, the second transistor T2 is in the off-state, the drain current Ion does not flow, and the light-emitting device OLED does not emit light.

As a result, the pixels 180 that emit red light (pixel circuits 181), the pixels 180 that emit blue light, and the pixels 180 that emit green light do not emit light, and the three pixels using the pixel 180 that emit red light, the pixel 180 that emit blue light, and the pixel 180 that emit green light become black.

From the period between the light emission period of the K−1st FRAME and the period PIN of the Kth FRAME to the period PIN of the Kth FRAME following the emission period PEM of the K−1st FRAME, similar to the configuration described in the section “1-5-1. First Example of Method for Driving Display Device 10”, the potential supplied to the first node N1 maintains the potential Vna (reference potential VREF), and the potential supplied to the fifth node N5 and the potential supplied to the third node N3 become the initialization potential VINI (potential Vnd, −1 V). While the third transistor T3 remains in the off state, the potential supplied to the second node N2 remains 0 V. The sixth scan signal SC6(*n*) changes from the state where LO is supplied to the state in which HI is supplied, if the first scan signal SC1(*n*) is supplied with HI, the third transistor T3 is turned from the off state to the on state, the second node N2 is conductive to the reset potential line SVRE, the potential supplied to the second node N2 gradually rises toward the reset potential (potential Vnc, 1 V) from 0 V, and becomes the potential Vnc. Thus, the potential difference Vgs is 2 V (1 V−(−1 V)=2 V) and the second transistor T2 is in the on state.

As described above, in the same manner as in the configuration described in the section “1-5-1. First Example of Method for Driving Display Device 10”, in the period PIN, the first node N1 is initialized by the reference potential VREF, the second node N2 is initialized by the reset potential VRES, and the third node N3 (the fifth node N5) is initialized by the initialization potential VINI.

In the period PVH following the period PIN, similar to the configuration described in the section “1-5-1. First Example of Method for Driving Display Device 10”, the threshold voltage VTH of the second transistor T2 is acquired by the operation in which the potential difference Vgs of the second transistor T2 becomes the same as the threshold voltage VTH, and the charge corresponding to the threshold voltage VTH is held in the capacitive element CV.

In the period PWR following the period PVH, the data signal VDATA is written to the pixel 180 (pixel circuit 181) in the same manner as in the configuration described in the section “1-5-1. First Example of Method for Driving Display Device 10”. The capacitive element CD maintains (holds) the data potential of the data signal VDATA.

In a period after the period PWR and the emission period PEM of the Kth FRAME following the period after the period PWR, the pixel circuit 181 operates in the same manner as the configuration described in the section “1-5-1. First Example of Method for Driving Display Device 10”, and since the potential difference Vgs is 0 V and the second transistor T2 is in the off state, the drain current Ion does not flow and the light-emitting device OLED does not emit light. As a result, the pixel 180 becomes black by the three pixels using the pixel 180 that emits red light, the pixel 180 that emits blue light, and the pixel 180 that emits green light.

The third example of the method for driving the display device 10 has the same effects as those described in the section “1-5-1. First Example of Method for Driving Display Device 10”.

[1-5-4. Fourth Example of Method for Driving Display Device 10]

Figure 8:
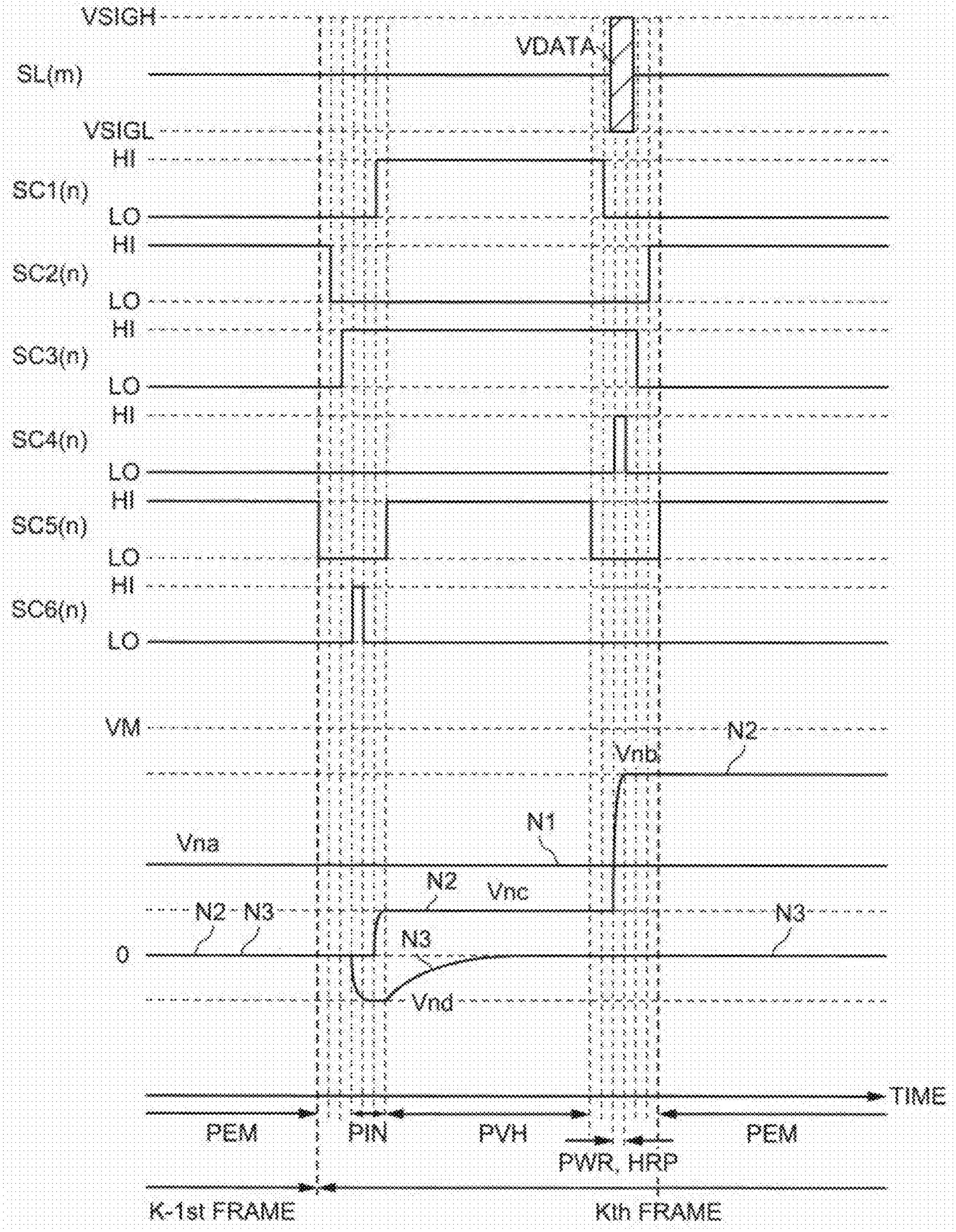
FIG. 8 is a timing chart of the display device according to the first embodiment of the present invention.

A fourth example of the method for driving the display device 10 will be described with reference to FIG. 8. The driving method shown in the fourth embodiment includes the pixel 180 (pixel circuit 181) displaying a black image based on the potential VSIGL of the data signal VDATA in the previous frame (K−1st FRAME) of the current frame (Kth FRAME), and then the pixel 180 (pixel circuit 181) displays a white image based on the potential VSIGH of the data signal VDATA in the Kth FRAME. In other words, the driving method shown in the fourth example includes displaying images of different colors in successive frames. Configurations that are the same as or similar to those in FIG. 1 to FIG. 7 will be described as necessary.

The potential of each node, the configuration of each scan signal, the operation of each transistor, and the like in the emission period PEM of the K−1st FRAME to the period PVH of the Kth FRAME are the same as those described in the section “1-5-3. Third Example of Method for Driving Display Device 10”. Further, the potential of each node, the configuration of each scan signal, the operation of each transistor, and the like from a period after the period PVH of the Kth FRAME to the emission period PEM of the Kth FRAME are the same as those described in the section “1-5-2. Second Example of Method for Driving Display Device 10”. Therefore, the description thereof will be omitted.

The fourth example of the method for driving the display device 10 has the same effects as those described in the section "1-5-1. First Example of Method for Driving Display Device 10".

[1-6. End Face Structure of Pixel 180]

Figure 9:
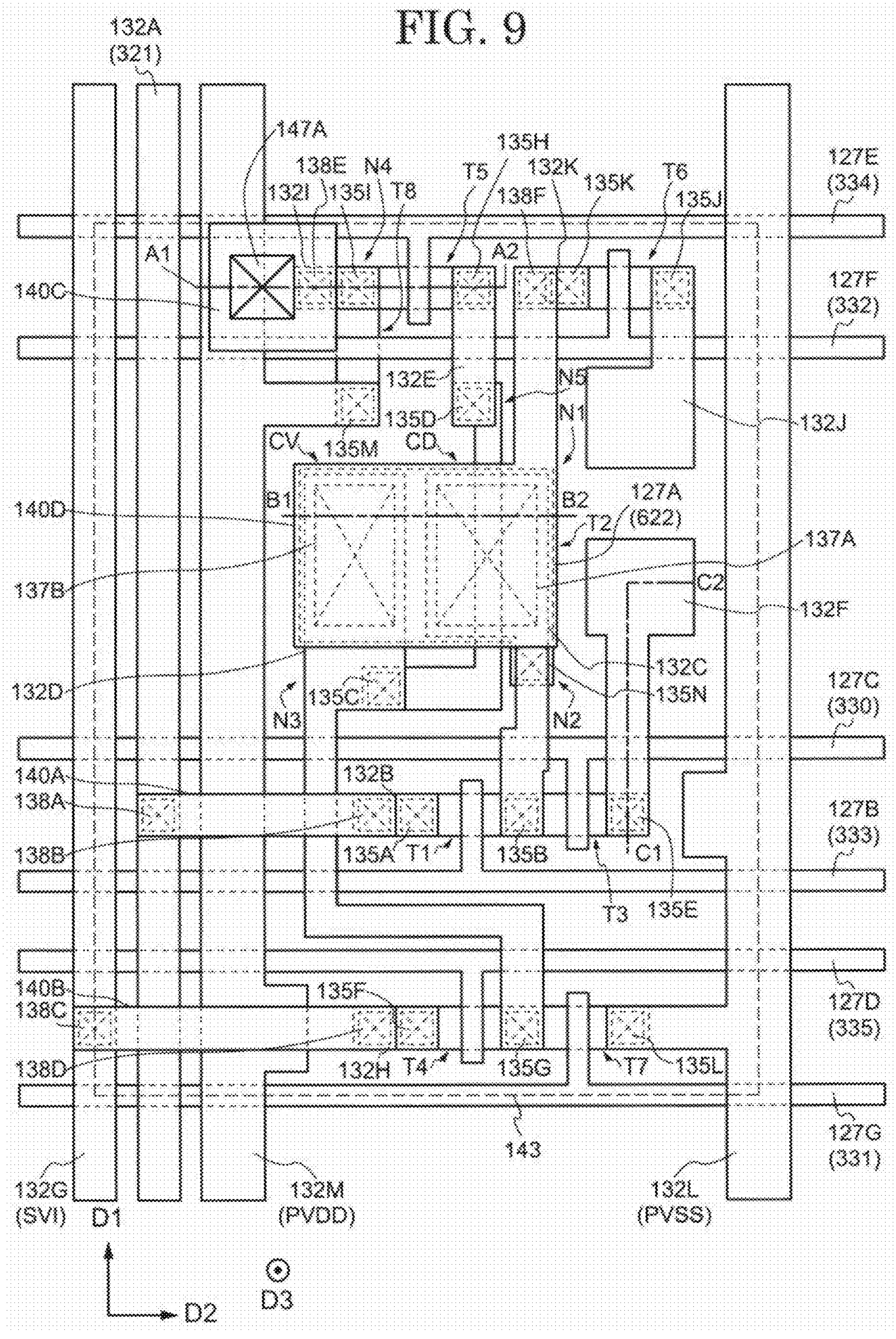
FIG. 9 is a layout diagram of a pixel according to the first embodiment of the present invention.
Figure 10:
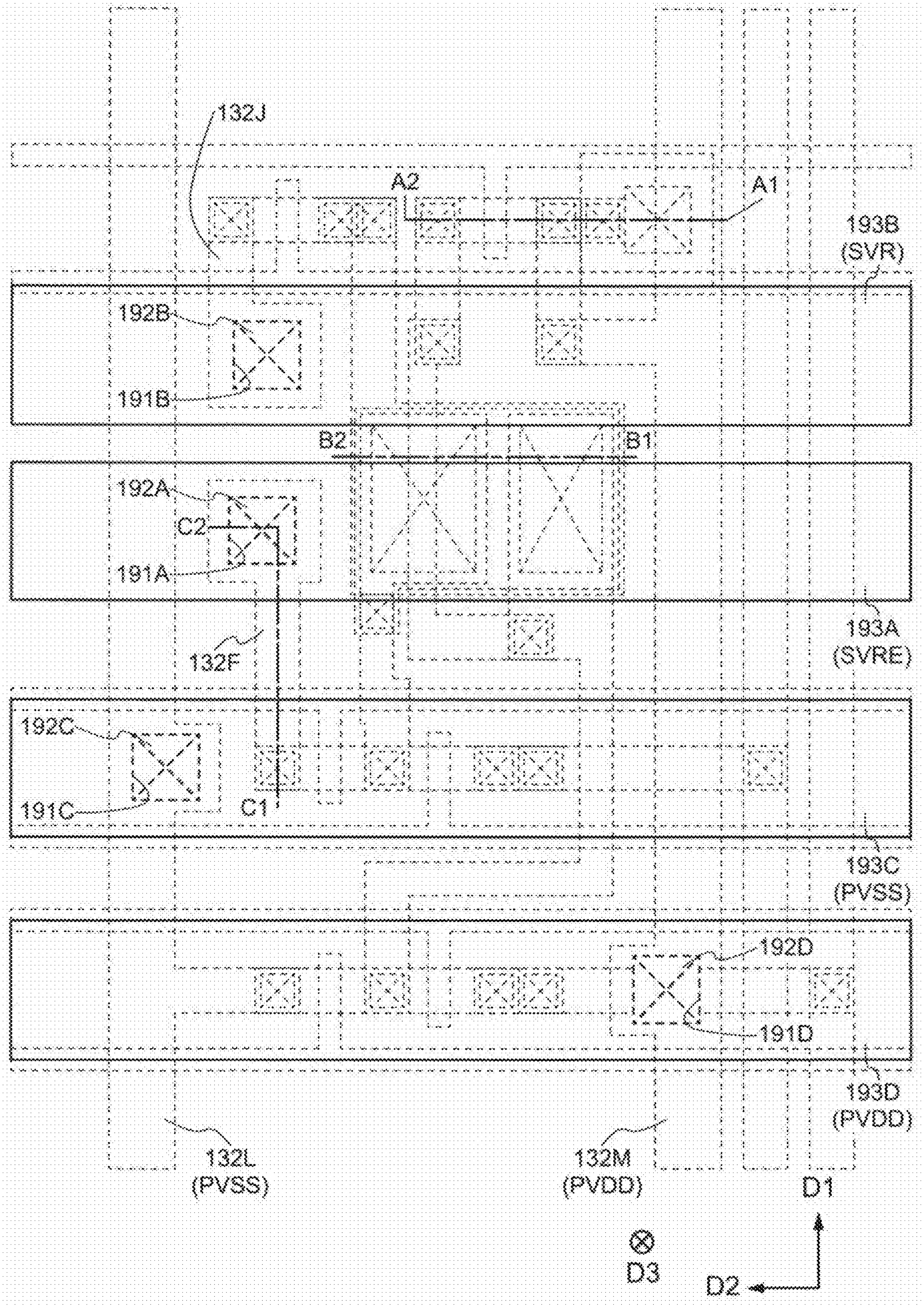
FIG. 10 is a layout diagram of the pixel according to the first embodiment of the present invention.
Figure 11:
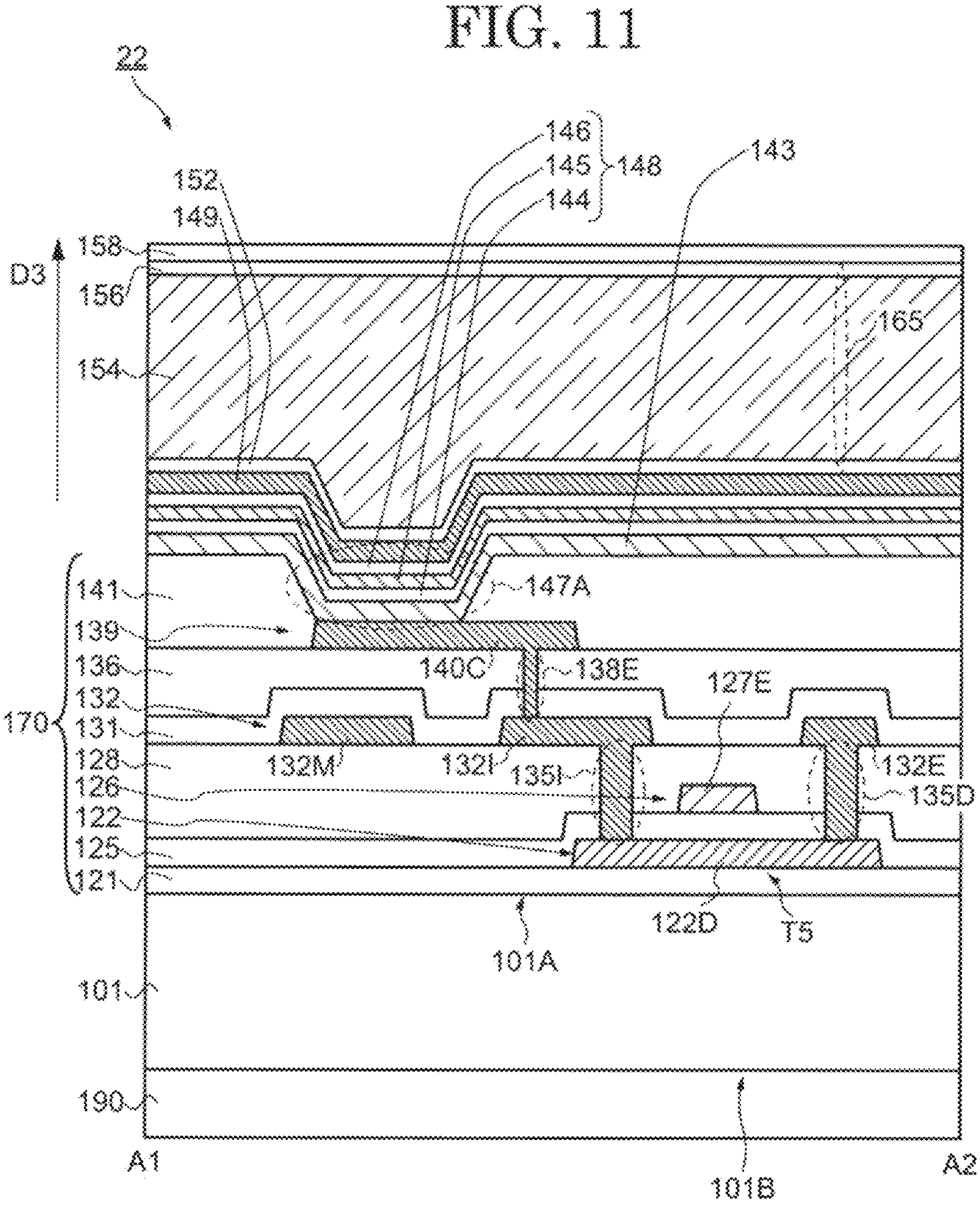
FIG. 11 is an end view showing an end face cut along A1-A2 in the layout shown in FIG. 9.
Figure 12:
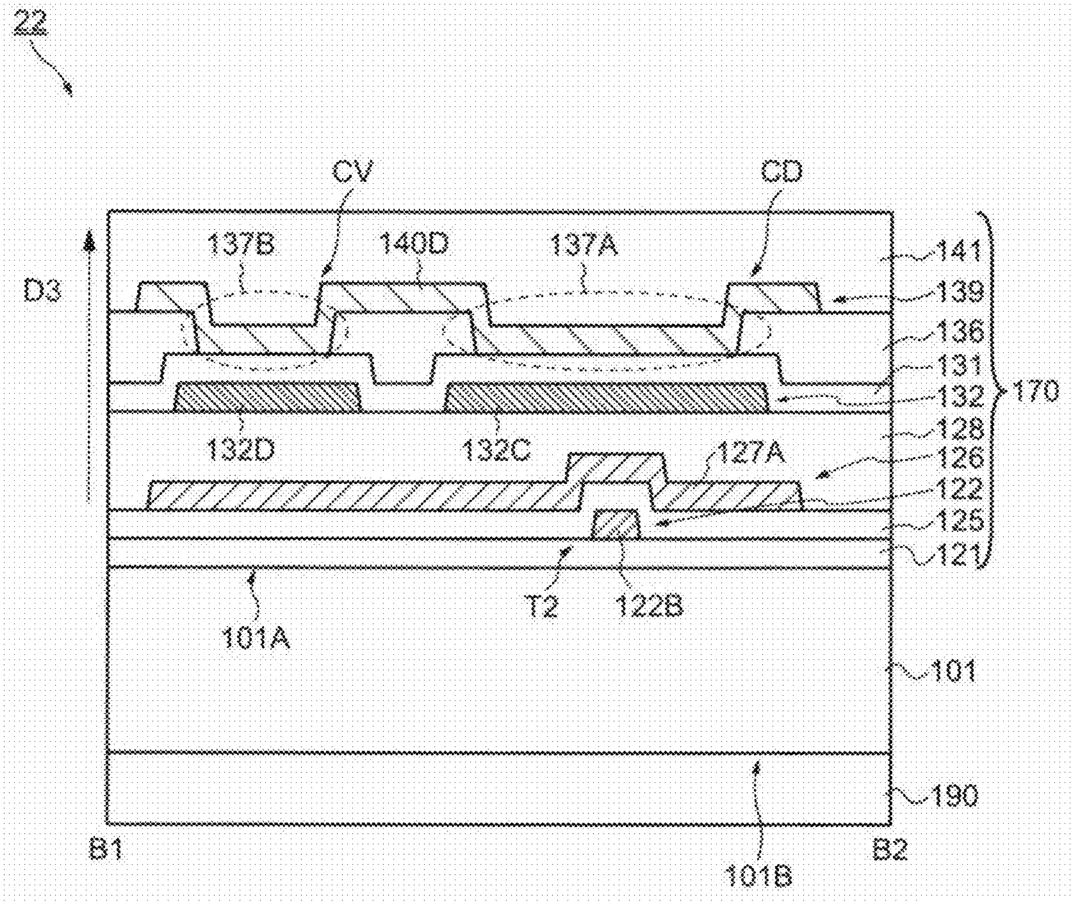
FIG. 12 is an end view showing an end face cut along B1-B2 in the layout shown in FIG. 9.
Figure 13:
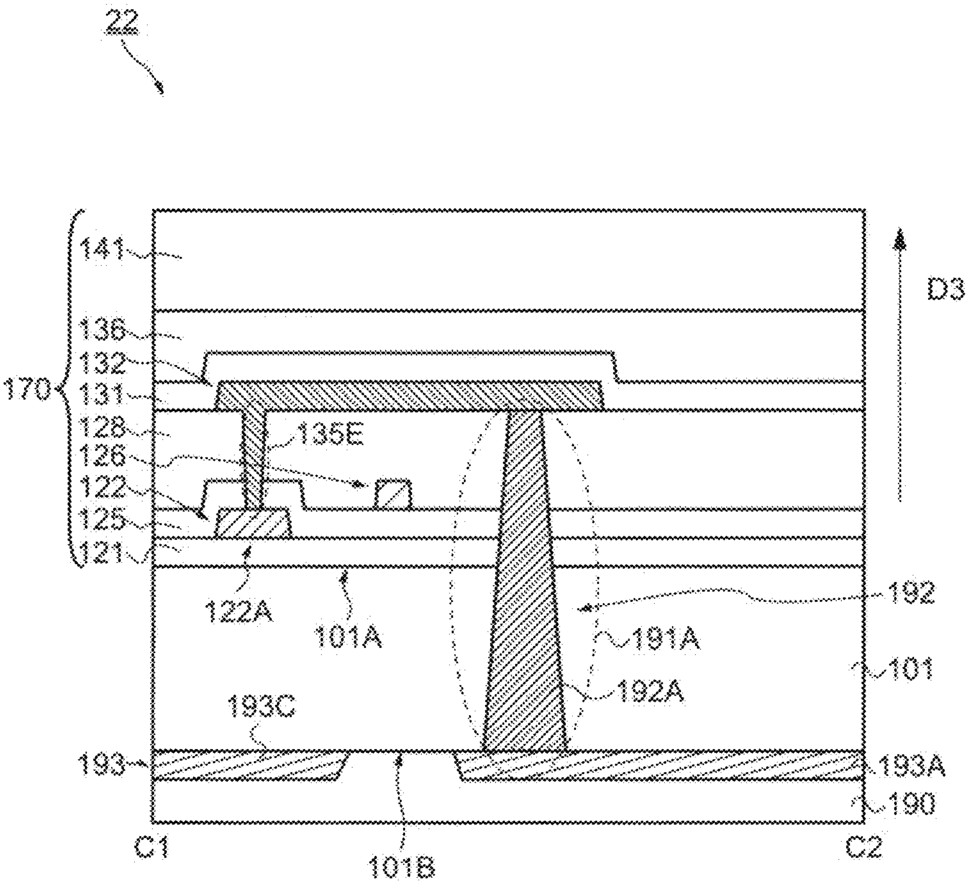
FIG. 13 is an end view showing an end face cut along C1-C2 in the layout shown in FIG. 9.

An end surface structure of the pixel 180 will be described with reference to FIG. 9 to FIG. 13. FIG. 9 is a layout diagram of the pixel 180 when the display device 10 is viewed from a front side (a first surface 101A). FIG. 10 is a layout diagram of the pixel 180 when the display device 10 is viewed from a rear surface (a second surface 101B). FIG. 11 is an end view showing an end face cut along A1-A2 in the layout shown in FIG. 9. FIG. 12 is an end view showing an end face cut along B1-B2 in the layout shown in FIG. 9. FIG. 13 is an end view showing an end face cut along C1-C2 in the layout shown in FIG. 9. The layout of the pixel 180 shown in FIG. 9 and FIG. 10 and the end faces of the pixel 180 shown in FIG. 11 to FIG. 13 are examples, and the layout and the end faces of the pixel 180 are not limited to the examples shown in FIG. 9 to FIG. 13. Configurations that are the same as or similar to those in FIG. 1 to FIG. 8 will be described as necessary.

In addition, in the layout of the pixel 180 shown in FIG. 9, in order to make the drawing easy to see, a semiconductor layer 122, a gate wiring 127, a conductive layer 132, a first contact hole opening 135, an organic insulating film opening 137, a second contact hole opening 138, a second wiring 140, and a contact hole opening 147 for a cathode electrode are omitted. Further, in the layout of the pixel 180 shown in FIG. 10, for the sake of clarity of the drawing, each element including first wirings 132J, 132L, and 132M shown in FIG. 9, rear surface side openings 191A to 191D and vias 192A to 192D are shown by a broken line, rear wirings 193A to 193D are shown by a solid line, and the other elements and their reference signs are omitted. Further, in the end face of the pixel 180 shown in FIG. 12 and FIG. 13, a configuration of an upper layer (opposite to a substrate 101) from an insulating layer 141 is omitted along the third direction D3.

Further, the end face of the pixel 180 shown in FIG. 11 is an end face along the first wiring 132M, a functional layer 148, a contact hole opening 147A for the cathode electrode, a second wiring 140C, a second contact hole opening 138E, a first wiring 132I, a first contact hole opening 135I, a semiconductor layer 122D, a gate wiring 127E, a first wiring 132E, and a first contact hole opening 135D, as an example of the end face of the pixel 180. The end face of the pixel 180 shown in FIG. 12 is an end face along a second wiring 140D, an organic insulating film opening 137A for the capacitive element CS, a first wiring 132G, a first contact hole opening 135H, a semiconductor layer 122A, a second wiring 140A, an organic insulating film opening 137B for the capacitive element CS, a first wiring 132D, a gate wiring 127A, a first wiring 132C, and the semiconductor layer 122B, as an example of the end face of the pixel 180. The end face of the pixel 180 shown in FIG. 13 is an end face along the rear wiring 193C, the semiconductor layer 122A, a first wiring 132F, a first contact hole opening 135E, a gate wiring 127C, the rear wiring 193A, the rear surface side opening 191A, and the via 192A, as an example of end face of the pixel 180.

The substrate 101 includes the first surface 101A and the second surface 101B opposed to the first surface 101A. The semiconducting layer 122 is provided on the first surface 101A of the substrate 101 via an underlayer 121. The semiconductor layer 122 includes the semiconductor layer 122A, the semiconductor layer 122B, the semiconductor layer 122D, and a semiconductor layer 122C. The semiconductor layer 122B includes a channel area 123 (see FIG. 16) and an impurity region 124A (see FIG. 16). For example, the impurity region is referred to as a source region or a drain region. Further, for example, the second transistor T2 (see FIG. 16) includes the semiconductor layer 122B, and the first electrode 624 (see FIG. 16) and the second electrode 626 (see FIG. 16) include the impurity region 124A. In other words, the semiconductor layer 122B includes the channel area of the second transistor T2.

Similar to the semiconductor layer 122B, the first transistor T1 (see FIG. 16) and the third transistor T3 (see FIG. 16) include the semiconductor layer 122A, the fourth transistor T4 (see FIG. 16) and the seventh transistor T7 (see FIG. 16) include the semiconductor layer 122C, and the fifth transistor T5 (see FIG. 16) and the eighth transistor T8 (see FIG. 16) include the semiconductor layer 122D. Further, the first electrode and the second electrode of each transistor include an impurity region. For example, the first electrode 614 (see FIG. 16) and the second electrode 616 (see FIG. 16) of the first transistor T1 and the first electrode 634 (see FIG. 16) and the second electrode 636 (see FIG. 16) of the third transistor T3 include impurity regions. In other words, the semiconductor layer 122A includes a channel area of the first transistor T1 and a channel area of the third transistor T3, and also serves as the channel area of the first transistor T1 and the channel area of the third transistor T3.

On the semiconductor layer 122, a gate insulating layer 125, a conductive layer 126, an insulating layer 128, and the conductive layer 132 are provided in this order. The conductive layer 126 includes the gate wiring 127E (gate electrode 652), the gate wiring 127A (gate electrode 622), and the gate wiring 127C (scan signal line 330 and gate electrode 632). The conductive layer 132 includes the first wiring 132M (driving potential line PVDD), the first wiring 132I, the first wiring 132E, the first wiring 132D (first electrode 42), the first wiring 132C (second electrode 54), and the first wiring 132F. In addition, a region where the conductive layer 126 and the semiconductor layer 122 overlap each other is a channel area. In other words, a region where the gate electrode and the semiconductor layer of each transistor overlap each other is a channel area.

Each of the transistors of the pixel 180 is formed using the semiconductor layer 122 (for example, the semiconductor layer 122B, the channel area 123, and the impurity region 124A), the gate insulating layer 125, and the conductive layer 126 (for example, the gate wiring 127A).

First contact hole openings 135I, 135D, and 135A that reach the semiconducting layer 122 pass through the gate insulating layer 125 and the insulating layer 128, and are provided in the gate insulating layer 125 and the insulating layer 128. For example, the first contact hole openings 135I and 135D expose the semiconductor layer 122D (for example, the second electrode 656 and the first electrode 654), and the first wiring 132I is electrically connected to the semiconductor layer 122D by the first contact hole openings 135I and 135D. Further, the first contact hole opening 135E exposes the semiconductor layer 122A (for example, the second electrode 626), and the first contact hole opening 135E electrically connects the first wiring 132F to the semiconductor layer 122A. Further, the first wiring 132C (see FIG. 17) is electrically connected to the gate wiring 127A by a first contact hole opening 135N (see FIG. 17), and the first wiring 132C is electrically connected to the semiconductor layers 122A by a first contact hole opening 135B (see FIG. 17). That is, the first contact hole opening may penetrate the gate insulating layer 125 and the insulating layer 128 and may open to expose the semiconductor layer 122, and the first contact hole opening may penetrate the insulating layer 128 and may open to expose the conductive layer 126.

An insulating layer 131 is provided to cover the conductive layer 132 and the insulating layer 131 where the conductive layer 132 is not exposed. An insulating layer 136 is provided to cover the insulating layer 131.

A second contact hole opening is provided in the insulating layer 131 and the insulating layer 136. For example, the second contact hole opening includes a second contact hole opening 138E. Further, the organic insulating film openings 137A and 137B for the capacitive element CS are provided in the insulating layer 136. A conductive layer 139 is provided on the insulating layer 136, in the organic insulating film openings 137A and 137B for the capacitive element CS, and in the second contact hole opening 138E. The conductive layer 139 includes the second wiring 140C (first electrode 32) and the second wiring 140D (first electrode 52 and second electrode 44). The second contact hole opening 138E penetrates the insulating layer 136 and exposes the first wiring 132I. The second wiring 140C is electrically connected to the first wiring 132I via the second contact hole opening 138E. The organic insulating film openings 137A and 137B for the capacitive element penetrate the insulating layer 136 and expose the insulating layer 131. For example, the capacitive element CV is formed by using the insulating layer 131 as a dielectric and using the first wiring 132D (the first electrode 42) and the second wiring 140D (the second electrode 44), and the capacitive element CD is formed by using the insulating layer 131 as a dielectric and using the first wiring 132C (the second electrode 54) and the second wiring 140C (the first electrode 52). For example, the second wiring 140C also serves as a pixel electrode. Further, although not shown, for example, the second contact hole opening 138 exposes a part of a plurality of terminals (not shown) included in the terminal portion 150. Part of the exposed terminals are electrically connected to the FPC 200 using a conductive film such as an anisotropic conductive film (not shown). Further, the pixel electrodes are provided independently for each pixel.

The insulating layer 141 is provided on the insulating layer 136 where the conductive layer 139 is not provided, and is provided so as to cover the conductive layer 139.

For example, the underlayer 121, the semiconductor layer 122, the gate insulating layer 125, the conductive layer 126, the insulating layer 128, the conductive layer 132, the insulating layer 131, the insulating layer 136, the conductive layer 139, and the insulating layer 141 are collectively referred to as an array portion 170.

Next, a plurality of layers stacked on the insulating layer 141 will be described. The contact hole opening 147 for the cathode electrode is provided in the insulating layer 141. The contact hole opening 147 for the cathode electrode includes the contact hole opening 147A for the cathode electrode. The contact hole opening 147A for the cathode penetrates the insulating layer 141 and is provided in the insulating layer 141 to expose the conductive layer 139 (for example, the second wiring 140C).

A cathode electrode 143 is provided so as to cover the exposed conductive layer 139, the contact hole opening 147A for the cathode electrode, and the insulating layer 141. The functional layer 148 is provided over the cathode electrode 143. A common electrode 149 is provided on the functional layer 148 so as to cover the functional layer 148. The common electrode 149 is electrically connected to the cathode electrode (the first electrode 32 of the light-emitting device OLED). Here, the light-emitting device OLED includes the cathode electrode 143, the functional layer 148, and the common electrode 149 (anode electrode).

A configuration of the functional layer 148 can be selected as appropriate. For example, the functional layer 148 may be formed by combining a carrier injection layer, a carrier transport layer, a light emitting layer, a carrier blocking layer, an exciton blocking layer, and the like. For example, the functional layer 148 shown in FIG. 9 includes a first layer 144, a second layer 145, and a third layer 146. For example, the first layer 144 is a carrier (electron) injection and transport layer, the second layer 145 is a light emitting layer, and the third layer 146 is a carrier (hole) injection and transport layer. For example, the functional layer 148 is provided independently for each pixel, similar to the pixel electrode.

A sealing film 165 is provided on the common electrode 149. For example, the sealing film 165 includes a first inorganic insulating layer 152, an organic insulating layer 154, and a second inorganic insulating layer 156. The first inorganic insulating layer 152 and the second inorganic insulating layer 156 are formed so as to cover at least the display area 22. A cover film 158 is arranged over the second inorganic insulating layer 156.

For example, the first layer 144, the second layer 145 (light emitting layer), and the third layer 146 included in the functional layer 148, and the common electrode 149 are not arranged on the IC chip 110 and the control circuit 120. Above the IC chip 110 and the control circuit 120, the sealing film 165 and the cover film 158 are arranged. The sealing film 165 and the cover film 158 prevent impurities (water, oxygen, and the like) from entering the light-emitting device OLED, the transistors, or the like from the outside of the display device 10.

Next, the rear surface side opening, a via 192, and a plurality of layers stacked on the second surface 101B side (back surface side) will be described. For example, the rear side opening includes the rear surface side opening 191A, the rear surface side opening 191A penetrates through the substrate 101, the underlayer 121, the gate insulating layer 125, and the insulating layer 128, and is provided in the substrate 101, the underlayer 121, the gate insulating layer 125, and the insulating layer 128 to expose the conductive layer 132 (the first wiring 132F). That is, each of the plurality of rear side openings penetrates through the substrate 101, the underlayer 121, the gate insulating layer 125, and the insulating layer 128, and is provided in the substrate 101, the underlayer 121, the gate insulating layer 125, and the insulating layer 128, and each of the rear side openings exposes the conductive layer 132.

For example, the via 192 includes the via 192A, and the via 192A is provided in the substrate 101, the underlayer 121, the gate insulating layer 125, the insulating layer 128, and the exposed conductive layer 132 (the first wiring 132F) which are opened by the rear surface side opening 191A. That is, each of the plurality of vias 192 is provided in the corresponding rear side opening and the corresponding exposed conductive layer 132.

For example, a conductive layer 193 is provided on the second surface 101B. For example, the conductive layer 193 includes the rear wirings 193A (reset potential line SVRE) and 193C (standard potential line PVSS). The rear wiring 193C is electrically connected to the via 192A.

An insulating layer 190 is provided over the second surface 101B where the conductive layer 193 is not provided and over the conductive layer 193. Further, a rear organic insulating film opening 194 (see FIG. 22) penetrates the insulating layer 190 and is provided in the insulating layer 190 to expose the conductive layer 193. A pad 195 is provided on the exposed conductive layer 193 and the insulating layer 190.

As the substrate 101, a rigid substrate having no flexibility, such as a glass substrate, a quartz substrate, a sapphire substrate, or a silicon substrate, can be used. Further, the substrate 101 may have flexibility, and for example, a flexible substrate including a resin such as a polyimide substrate, an acrylic substrate, a siloxane substrate, or a fluorine resin substrate can be used as the substrate 101.

General metallic materials are used as the conducting layer 126, the conductive layer 132, the conductive layer 139, the common electrode 149, the via 192 and the conductive layer 193. For example, aluminum (Al), titanium (Ti), chromium (Cr), cobalt (Co), nickel (Ni), molybdenum (Mo), hafnium (Hf), tantalum (Ta), tungsten (W), bismuth (Bi), silver (Ag), copper (Cu), and alloys or compounds thereof are used as general metallic materials.

For example, the semiconductor layer 122 may include crystalline silicon and may include a metal oxide.

A general insulating material can be used as a material for forming the underlayer 121, the gate insulating layer 125, the insulating layer 131, the first inorganic insulating layer 152, and the second inorganic insulating layer 156. For example, inorganic insulating layers such as silicon oxide ($SiO_x$), silicon oxynitride ($SiO_xN_y$), silicon nitride ($SiN_x$), and silicon nitride oxide ($SiN_xO_y$) are used as the insulating layers.

As a material for forming the insulating layer 128, the insulating layer 136, the insulating layer 141, the organic insulating layer 154, and the insulating layer 190, for example, an organic compound material having excellent surface flatness can be used. The insulating layer 128, the insulating layer 136, the insulating layer 141, and the insulating layer 190 may be referred to as organic insulating layers. The insulating layer 190 may be referred to as a rear organic insulating layer.

[1-7. Method for Manufacturing Display Device 10]

Figure 14:
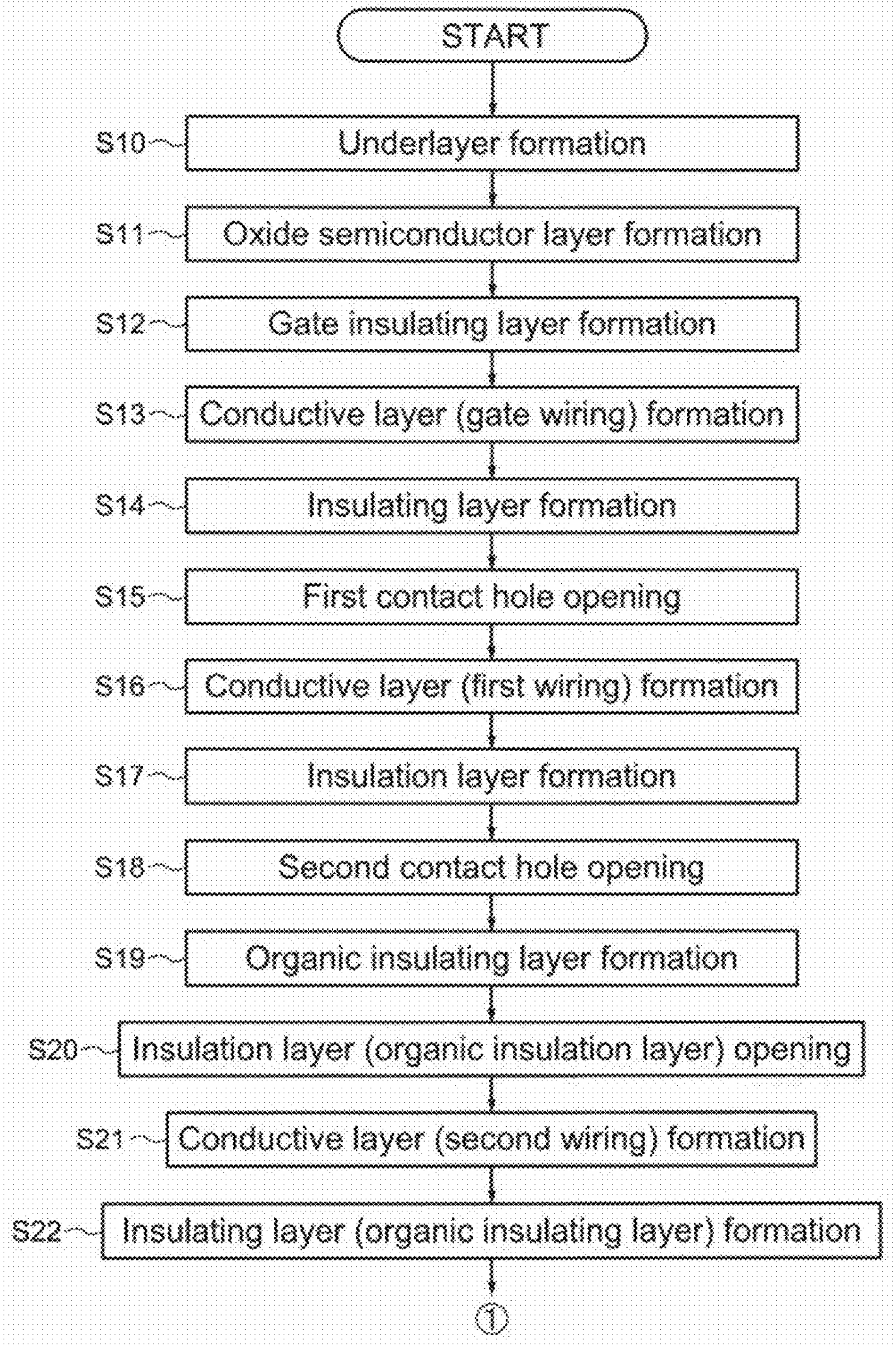
FIG. 14 is a sequence diagram showing a method for manufacturing the display device according to the first embodiment of the present invention.
Figure 15:
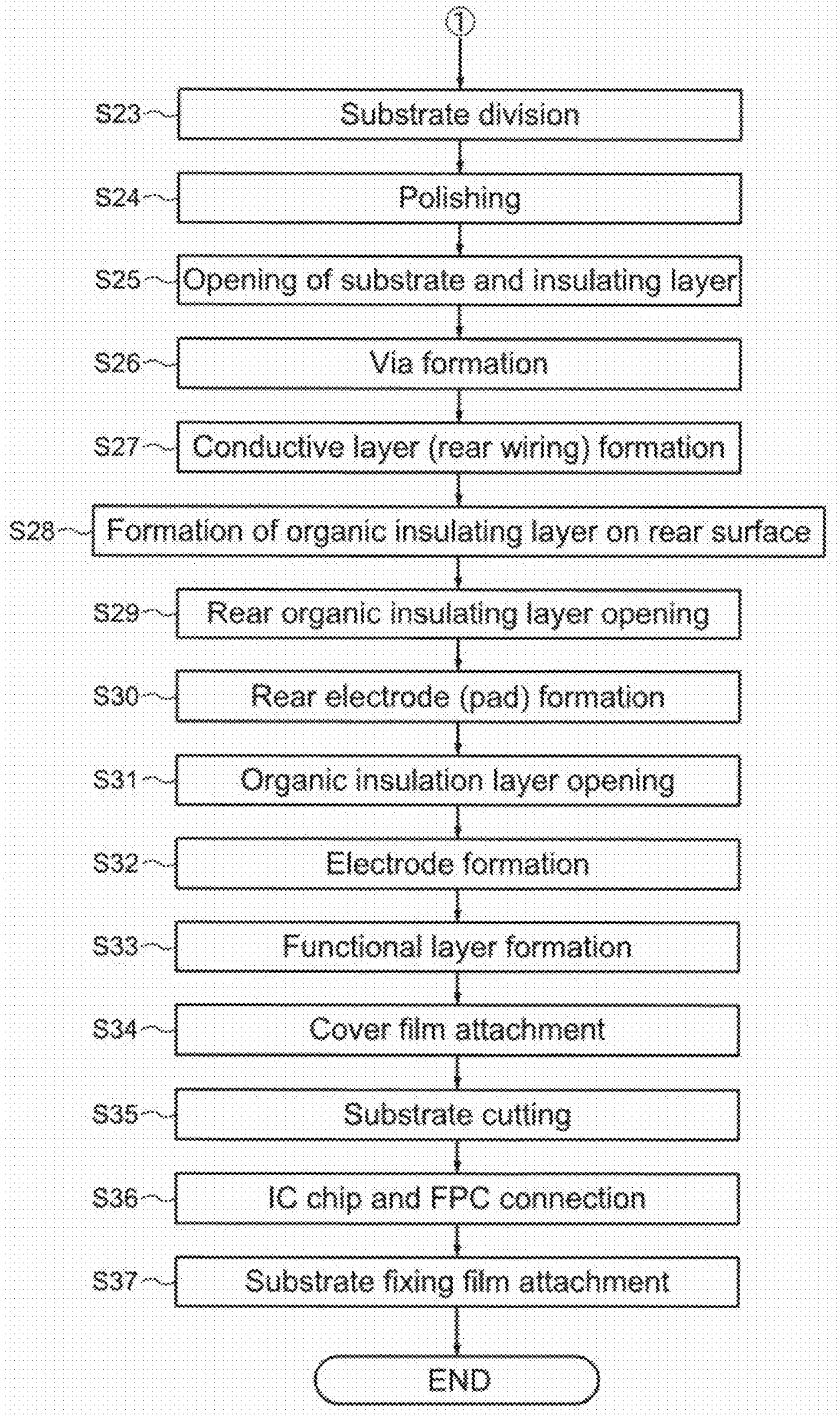
FIG. 15 is a sequence diagram showing the method for manufacturing the display device according to the first embodiment of the present invention.
Figure 16:
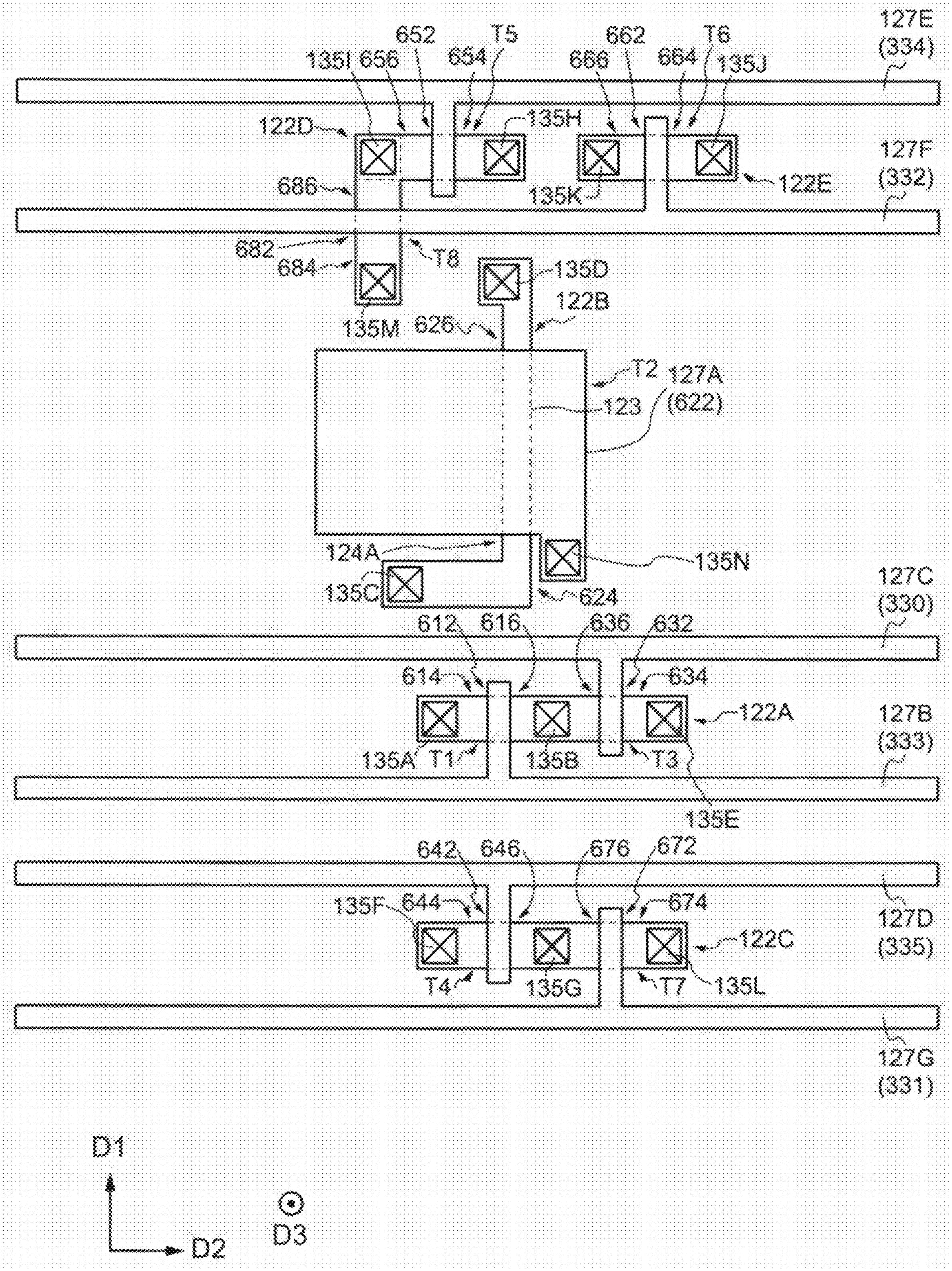
FIG. 16 is a layout diagram of the pixel according to the first embodiment of the present invention.
Figure 17:
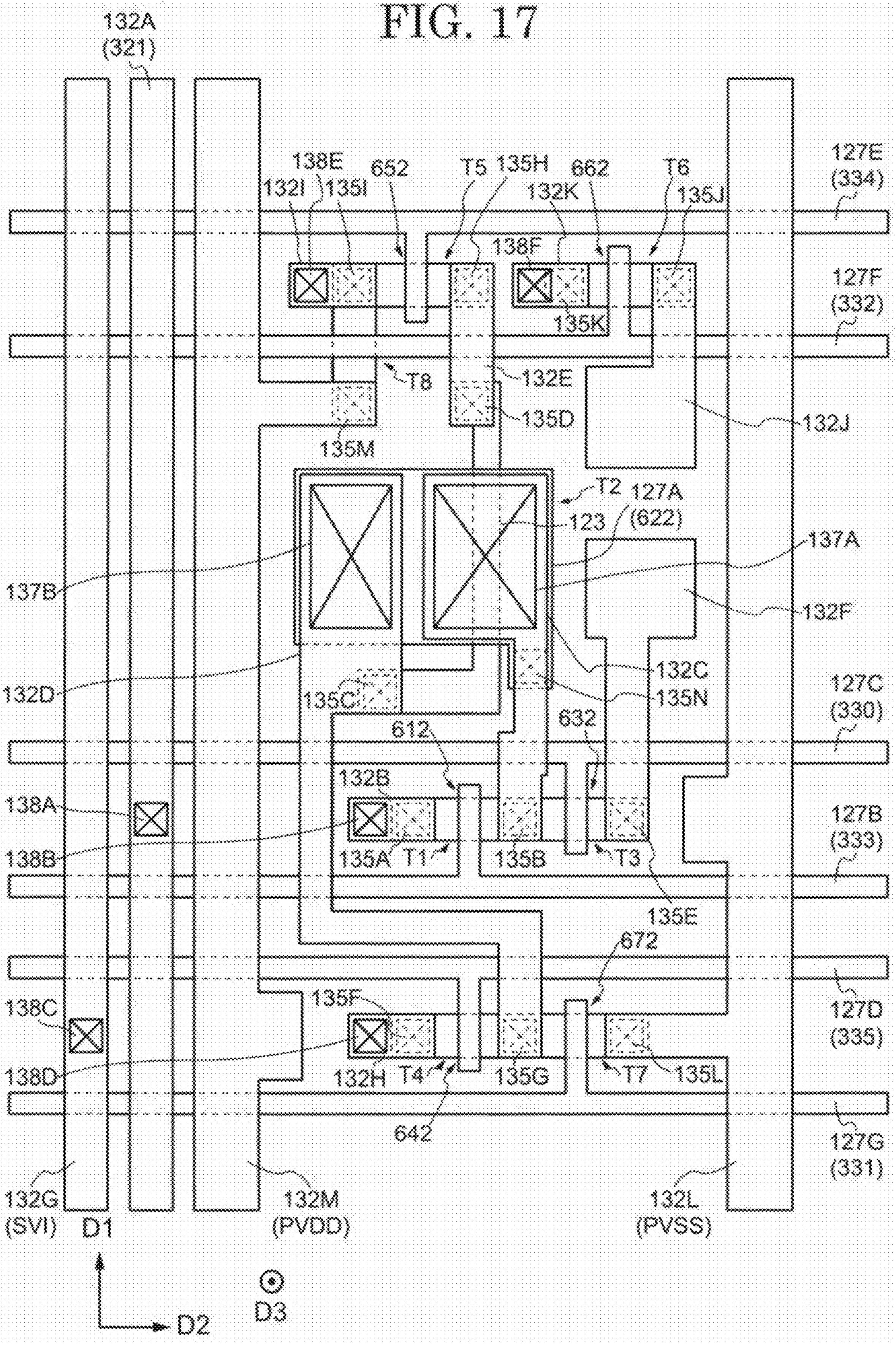
FIG. 17 is a layout diagram of the pixel according to the first embodiment of the present invention.
Figure 18:
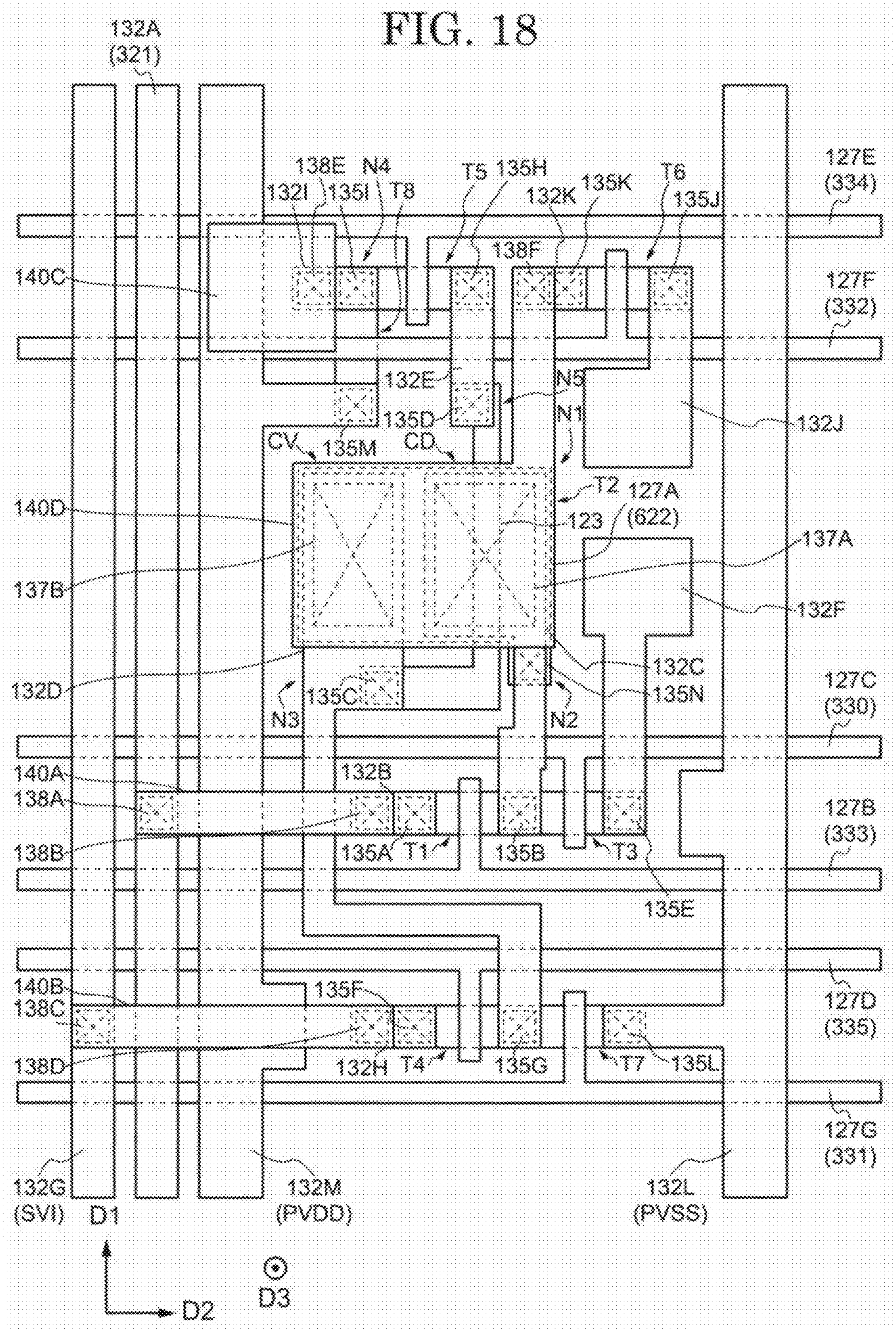
FIG. 18 is a layout diagram of the pixel according to the first embodiment of the present invention.
Figure 19:
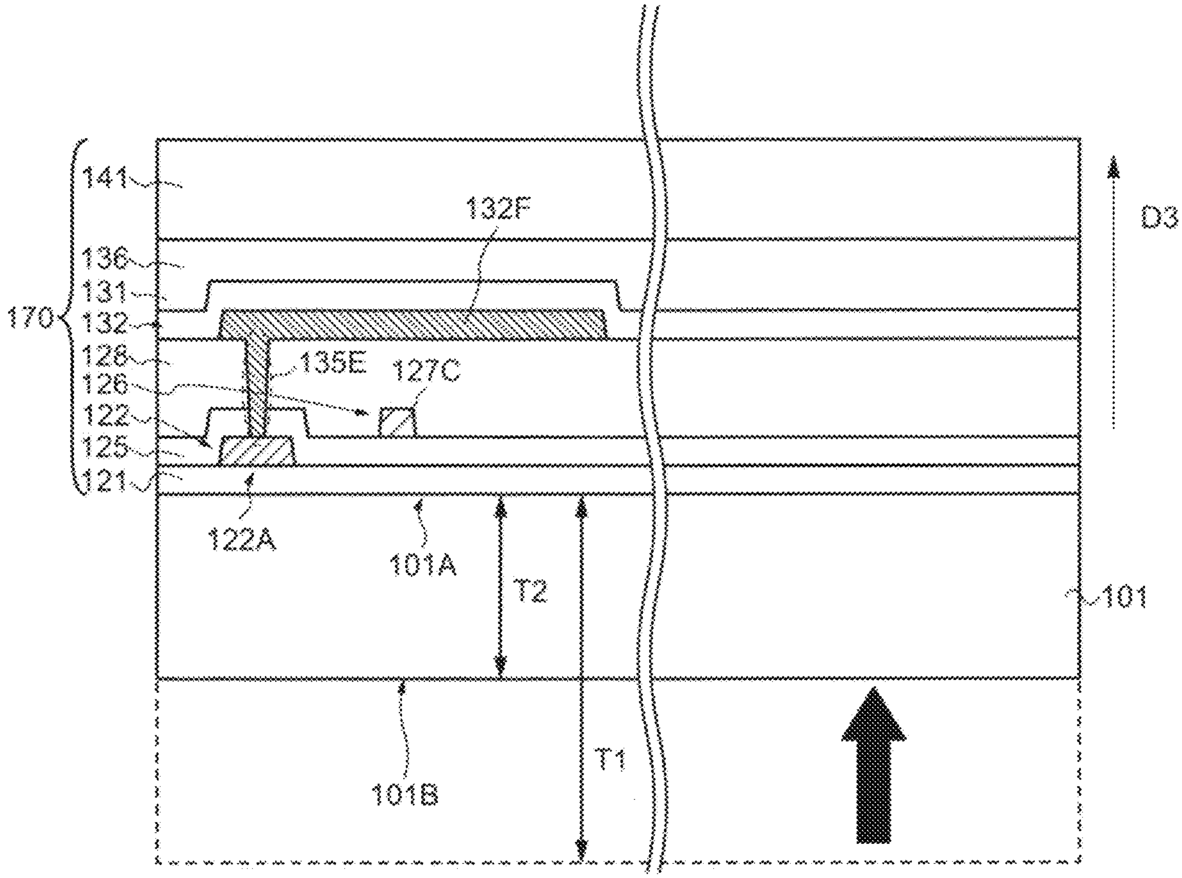
FIG. 19 is an end view showing an end face of the display device according to the first embodiment of the present invention.

A method for manufacturing the display device 10 (pixel 180) will be described with reference to FIG. 9, FIG. 10, and FIG. 14 to FIG. 22. FIG. 14 and FIG. 15 are sequence diagrams showing a method for manufacturing the display device 10. FIG. 16 to FIG. 18 are diagrams showing the pixels 180 when the display device 10 is viewed from the front side (the first surface 101A). FIG. 19 to FIG. 22 are end views showing an end face of the display device 10 (pixel 180). Configurations that are the same as or similar to those in FIG. 1 to FIG. 13 are described as necessary, and may be omitted. The manufacturing method shown in FIG. 13 includes, for example, that the semiconductor layer is an oxide semiconductor layer formed using an oxide semiconductor.

When manufacturing of the display device 10 (pixel 180) is started, the underlayer 121 (see FIG. 11 to FIG. 13 and FIG. 19 to FIG. 22) is formed on the first surface 101A (see FIG. 11 to FIG. 13 and FIG. 19 to FIG. 22) of the substrate 101 (see FIG. 11 to FIG. 13 and FIG. 19 to FIG. 22) (step 10 (S10) in FIG. 14). For example, the substrate 101 is a glass substrate.

As shown in FIG. 9, FIG. 16, and FIG. 18, the semiconductor layer 122 includes semiconductor layers 122A, 122B, 122C, 122D, and 122E. The semiconductor layer 122A serves as a semiconductor layer of the first transistor T1 and a semiconductor layer of the third transistor T3. The semiconductor layer 122B is a semiconductor layer of the second transistor T2. The semiconductor layer 122C serves as a semiconductor layer of the fourth transistor T4 and a semiconductor layer of the seventh transistor T7. The semiconductor layer 122D serves as a semiconductor layer of the fifth transistor T5 and a semiconductor layer of the eighth transistor T8. The semiconductor layer 122E is a semiconductor layer of the sixth transistor T6. In other words, the semiconductor layer 122A includes a channel area of the first transistor T1 and a channel area of the third transistor T3, the semiconductor layer 122B includes a channel area of the second transistor T2, the semiconductor layer 122C includes a channel area of the fourth transistor T4 and a channel area of the seventh transistor T7, the semiconductor layer 122D includes a channel area of the fifth transistor T5 and a channel area of the eighth transistor T8, and the semiconductor layer 122E includes a channel area of the sixth transistor T6.

The gate insulating layer 125 (see FIG. 11 to FIG. 13 and FIG. 19 to FIG. 22) is formed on the semiconductor layer 122 and on the underlayer 121 on which the semiconductor layer 122 is not formed (step 12 (S12) in FIG. 14).

The conductive layer 126 (see FIG. 11 to FIG. 13 and FIG. 19 to FIG. 22) is formed over the gate insulating layer 125 (step 13 (S13) in FIG. 14). As shown in FIG. 9, FIG. 16, and FIG. 18, the conductive layer 126 includes the gate wiring 127A (gate electrode 622), a gate wiring 127B (scan signal line 333), the gate wiring 127C (scan signal line 330), a gate wiring 127D (scan signal line 335), the gate wiring 127E (scan signal line 334), a gate wiring 127F (scan signal line 332), and a gate wiring 127G (scan signal line 331). The gate wiring 127B includes the gate electrode 612, the gate wiring 127C includes the gate electrode 632, the gate wiring 127D includes the gate electrode 642, the gate wiring 127E includes the gate electrode 652, the gate wiring 127F includes the gate electrodes 662 and 682, and the gate wiring 127G includes the gate electrode 672.

The region where the gate electrode 622 of the second transistor T2 and the semiconductor layer 122B overlap each other is the channel area 123, and the channel area 123 corresponds to a channel length of the second transistor T2. Similar to the second transistor T2, a region where the gate electrode 612 of the first transistor T1 and the semiconductor layer 122A overlap each other is the channel area of the first transistor T1 and corresponds to a channel length. Similar to the second transistor T2 and the first transistor T1, each of the transistors other than the second transistor T2 and the first transistor T1 has a region in which the gate electrode and the semiconductor layer overlap each other, which is a channel area of the transistor and corresponds to a channel length.

As shown in FIG. 16, in a plan view, the channel area 123 of the second transistor T2 is larger (longer) than the channel area of the first transistor T1, the channel area of the third transistor T3, the channel area of the fourth transistor T4, the channel area of the fifth transistor T5, the channel area of the sixth transistor T6, the channel area of the seventh transistor T7, and the channel area of the eighth transistor T8. That is, the channel length of the second transistor T2 is longer than the channel length of the first transistor T1, the channel length of the third transistor T3, the channel length of the fourth transistor T4, the channel length of the fifth transistor T5, the channel length of the sixth transistor T6, the channel length of the seventh transistor T7, and the channel length of the eighth transistor T8. Since the second transistor T2 operates in a saturated range, a kink effect needs to be suppressed. Furthermore, the resistance of the second transistor T2 to hot carriers needs to be higher than the resistance of other transistors in the pixel 180 to hot carriers. The channel length of the second transistor T2 is longer than the channel length of the other transistors in the pixel 180 in order to suppress the kink effect and ensure reliability (hot carrier resistance).

The insulating layer 128 (see FIG. 11 to FIG. 13, FIG. 19 to FIG. 22) is formed over the conductive layer 126 and over the gate insulating layer 125 on which the conductive layer 126 is not formed (step 14 (S14) in FIG. 14).

As shown in FIG. 9, FIG. 16, and FIG. 18, first contact hole openings 135A to 135M are opened (step 15 (S15) in FIG. 14). Each opening opens the gate insulating layer 125 and the insulating layer 128, and exposes a wiring, a semiconductor layer, or an electrode corresponding to each opening. For example, the first contact hole opening 135A exposes the semiconductor layer 122A, and the first contact hole opening 135N exposes the gate wiring 127A. Other openings also expose corresponding wirings, semiconductor layers or electrodes.

The conductive layer 132 (see FIG. 11 to FIG. 13 and FIG. 19 to FIG. 22) is formed over the insulating layer 128 (step 16 (S16) in FIG. 14). As shown in FIG. 9, FIG. 16, and FIG. 18, the conductive layer 132 includes a first wiring 132A (image data signal line 321), a first wiring 132B, the first wiring 132C (second electrode 54), the first wiring 132D (first electrode 42), the first wiring 132E, the first wiring 132F, the first wiring 132G (initialization potential line SVI), a first wiring 132H, the first wiring 132J, a first wiring 132K, the first wiring 132L (standard potential line PVSS), and the first wiring 132M (driving potential line PVDD).

As shown in FIG. 17, in a plan view, for example, the first wiring 132B is electrically connected to the first transistor T1 via the first contact hole opening 135A. Further, the first wiring 132C is electrically connected to the first transistor T1 and the third transistor T3 via the first contact hole opening 135B, and is electrically connected to the gate wiring 127A via the first contact hole opening 135C. The other first wirings are also electrically connected to the gate wirings or the transistors (the semiconductor layer 122) via the corresponding openings.

In addition, as shown in FIG. 17, the first wiring 132C (second electrode 54), the gate wiring 127A (gate electrode 622), and the semiconductor layer 122B (channel area 123) overlap each other. That is, the second transistor T2 (the channel area 123 and the gate electrode 622) overlaps the second electrode 54 of the capacitive element CD. The first wiring 132C (the second electrode 54) and the first wiring 132D (the first electrode 42) are arranged on the gate electrode 622 and adjacently along the second direction D2.

The insulating layer 131 (see FIG. 11 to FIG. 13 and FIG. 19 to FIG. 22) is formed on the conductive layer 132 and on the insulating layer 128 on which the conductive layer 132 is not formed (step 17 (S17) in FIG. 14).

As shown in FIG. 9, FIG. 17, or FIG. 18, second contact hole openings 138B to 138F are opened (step 18 (S18) in FIG. 14). Each of the openings opens the insulating layer 131 to expose the wiring corresponding to each of the openings.

The insulating layer 136 (organic insulating layer) (see FIG. 11 to FIG. 13 and FIG. 19 to FIG. 22) is formed on the insulating layer 131 (step 19 (S19) in FIG. 14).

As shown in FIG. 9, FIG. 17, or FIG. 18, the insulating layer 136 (organic insulating layer) is opened (step 20 (S20) in FIG. 14). In the opening of S20, the organic insulating film openings 137A and 137B for the capacitive element are opened. In addition, in the opening of S20, the second contact hole openings 138B to 138F are opened similar to the opening of S18. That is, the second contact hole openings 138B to 138F are opened twice. Each opening opens the insulating layer 136 to expose an insulating layer, wiring, or electrode corresponding to each opening. For example, the organic insulating film opening 137A for the capacitive element removes only the insulating layer 136 on the first wiring 132C (the second electrode 54) to expose the insulating layer 131. On the other hand, the organic insulating film opening 137B for the capacitive element removes only the insulating layer 136 on the first wiring 132D (the first electrode 42) to expose the insulating layer 131. Other openings also expose corresponding insulating layers, wirings, or electrodes.

The conductive layer 139 (see FIG. 11 to FIG. 13, FIG. 19 to FIG. 22) is formed on the insulating layer 136, on the insulating layer 131 exposed by the organic insulating film opening 137A for the capacitive element, and on the insulating layer 131 exposed by the organic insulating film opening 137B for the capacitive element (step 21 (S21) in FIG. 14). As shown in FIG. 9 or FIG. 16, the conductive layer 139 includes the second wiring 140A, a second wiring 140B, the second wiring 140C (first electrode 32), and the second wiring 140D (first electrode 52 and second electrode 44).

As shown in FIG. 18, in a plan view, the second wiring 140A is electrically connected to the first wiring 132A (the image data signal line 321) via a second contact hole opening 138A, and is electrically connected to the first transistor T1 via the second contact hole opening 138B, the first wiring 132B, and the first contact hole opening 135A. The other second wirings are also electrically connected to the first wirings, the gate wirings, or the transistors (the semiconductor layer 122) via the respective openings.

In addition, as shown in FIG. 18, the second wiring 140D (the first electrode 52 and the second electrode 44), the first wiring 132C (the second electrode 54), the gate wiring 127A (the gate electrode 622), and the semiconductor layer 122B (the channel area 123) overlap each other. That is, the second transistor T2 overlaps the capacitive element CD. Further, the second wiring 140D (the first electrode 52 and the second electrode 44), the first wiring 132D (the first electrode 42), and the gate wiring 127A (the gate electrode 622) overlap each other, and the first electrode 42 and the second electrode 54 are arranged adjacently on the gate electrode 622. That is, the capacitive element CV and the capacitive element CD are arranged adjacently along the second direction D2.

The insulating layer 141 (organic insulating layer) (see FIG. 11 to FIG. 13 and FIG. 19 to FIG. 22) is formed on the conductive layer 139 and on the insulating layer 136 on which the conductive layer 139 is not formed (step 22 (S22) in FIG. 14).

For example, since a plurality of display devices 10 are formed using a mother glass, the mother glass is divided (substrate division) to separate the plurality of display devices 10 (step 23 (S23) in FIG. 14). In addition, for example, S23 is performed by attaching the protective film to the mother glass.

After S23, the second surface 101B of the separated displays 10 is polished (step 24 (S24) in FIG. 14). In this case, a size of the separated substrate is preferably a size capable of chemical mechanical polishing (CMP (Chemical Mechanical Polishing)). S24 can be performed using a polishable device. For example, S24 is performed using the CMP. For example, in FIG. 19, the separated substrate before thinning to a thickness T1 is indicated by a broken line, and the separated substrate after thinning to a thickness T2 is indicated by a solid line. By S24, the separated board is thinned from the thickness T1 to the thickness T2.

Figure 20:
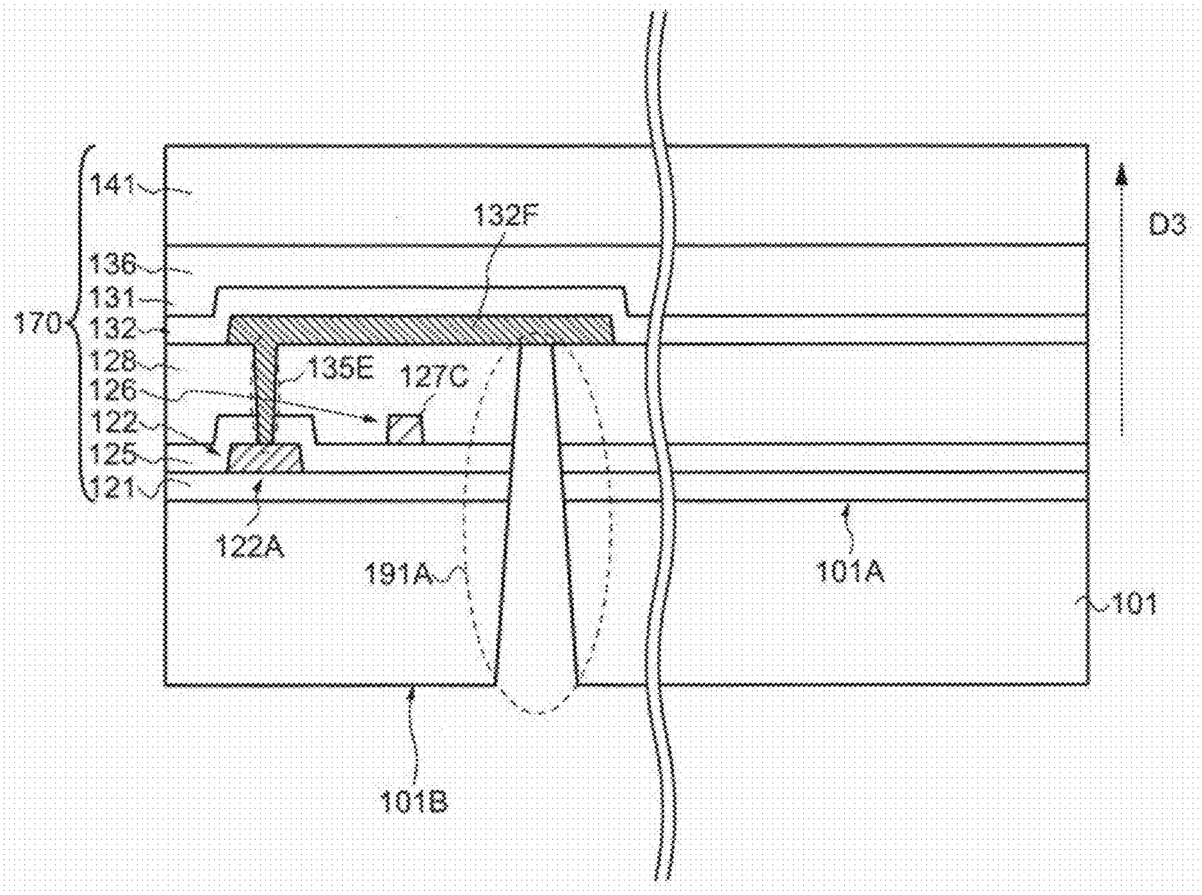
FIG. 20 is an end view showing the end face of the display device according to the first embodiment of the present invention.

After S24, the substrate 101, the underlayer 121, the gate insulating layer 125, and the insulating layer 128 in the thinned substrate are opened from the second surface 101B side, and the rear surface side openings 191A to 191D are formed (step 25 (S25) in FIG. 14). For example, as shown in FIG. 10 or FIG. 20, the rear surface side opening 191A is formed in the substrate 101, the underlayer 121, the gate insulating layer 125, and the insulating layer 128 to expose the first wiring 132F. For example, the substrate 101, the underlayer 121, the gate insulating layer 125, and the insulating layer 128 are opened by dry etching. Further, for example, in the case where the substrate 101 has flexibility, the substrate 101, the underlayer 121, the gate insulating layer 125, and the insulating layer 128 are opened by laser processing. In this case, in order to suppress an increase in the substrate temperature due to laser processing, it is preferable that the opening time is performed in femtoseconds by the laser processing.

After S25, the vias 192 are formed (step 26 (S26) of FIG. 14). For example, S26 includes forming a metal film on the rear surface side opening 191A and the second surface 101B, and polishing the formed metal film to form the vias 192A to 192D (see FIG. 10 or FIG. 21). For example, polishing is performed using the CMP, similar to S24.

Figure 21:
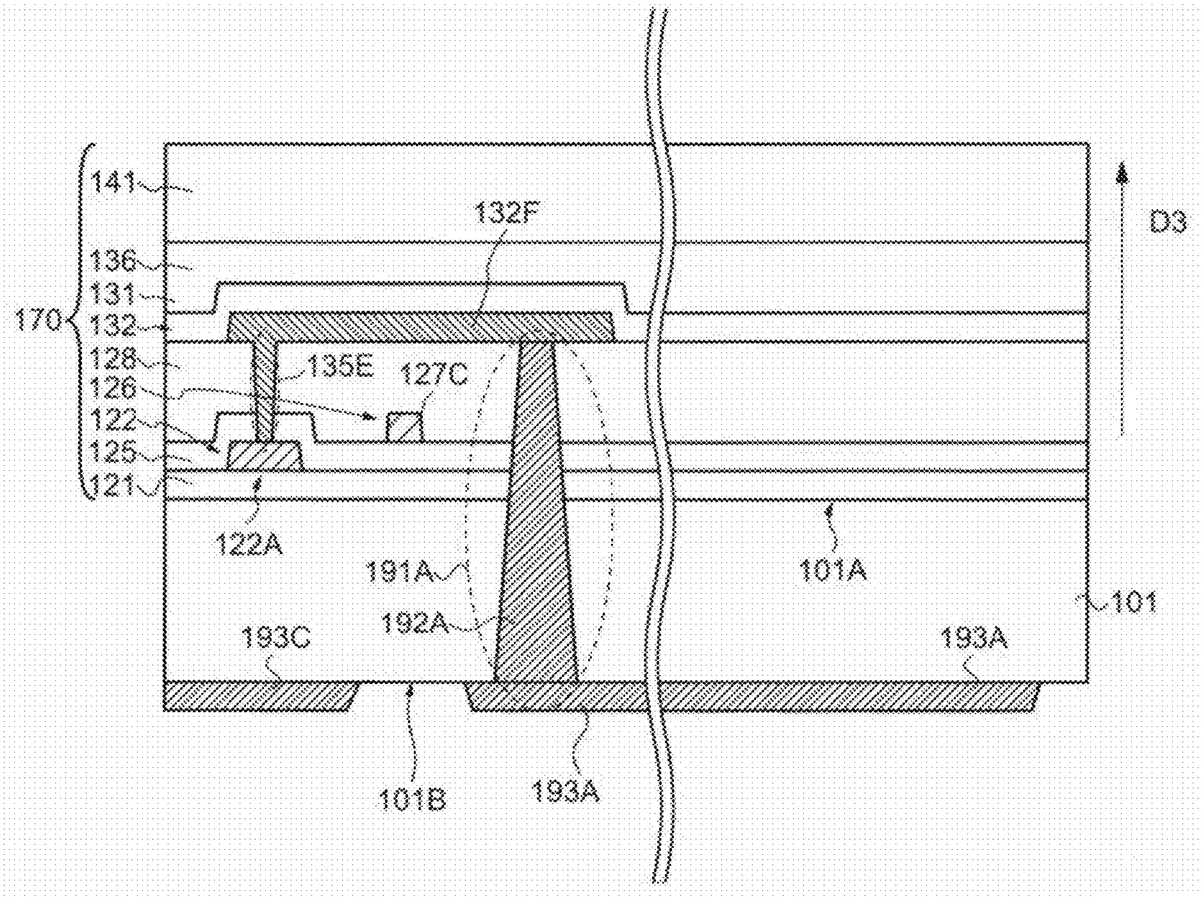
FIG. 21 is an end view showing the end face of the display device according to the first embodiment of the present invention.

After S26, the conductive layers 193 are formed, and the rear surface wirings 193A to 193D are formed (step 27 (S27) in FIG. 14). For example, as shown in FIG. 21, the rear wiring 193C and the rear wiring 193A are formed, and the rear wiring 193A (reset potential line SVRE) is electrically connected to the via 192A. Further, as shown in FIG. 10, the rear wiring 193C (standard potential line PVSS) is electrically connected to the via 192C, the rear wiring 193B (reference potential line SVR) is electrically connected to the via 192B, and the rear wiring 193D (driving potential line PVDD) is electrically connected to the via 192D.

Figure 22:
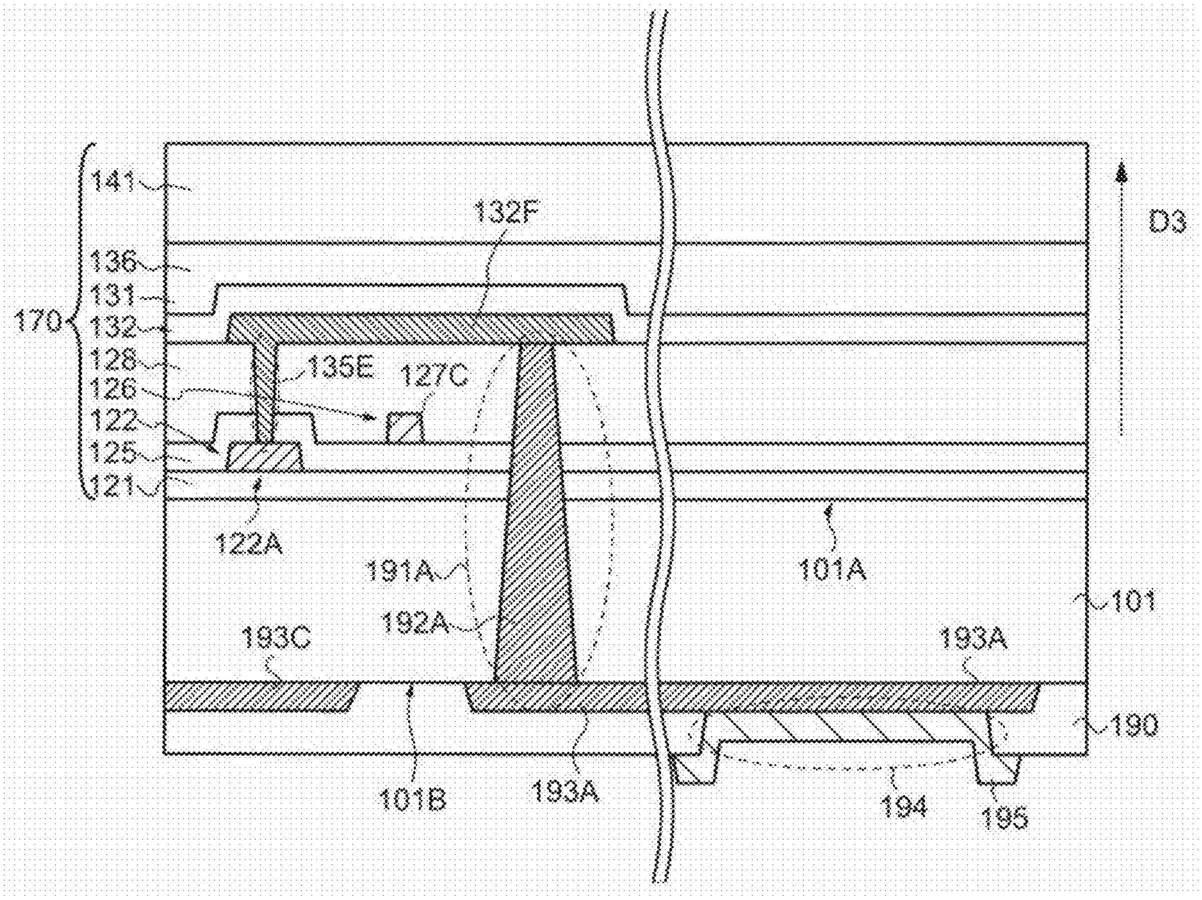
FIG. 22 is an end view showing the end face of the display device according to the first embodiment of the present invention.

After S27, the insulating layer 190 is formed over the second surface 101B without the conductive layer 193 and over the conductive layer 193 (step 28 (S28) in FIG. 14, see FIG. 22). Further, after S28, the rear organic insulating film opening 194 is formed (step 29 (S29) in FIG. 14, see FIG. 22). The rear organic insulating film opening 194 penetrates through the insulating layer 190 and is provided in the insulating layer 190 to expose the conductive layer 193. Also, after S29, rear electrodes (pads 195) are formed in the exposed conductive layer 193 and the insulating layer 190 (step 30 (S30) in FIG. 14, see FIG. 22).

Further, as shown in FIG. 9 and FIG. 11, the insulating layer 141 (organic insulating layer) on the first surface 101A is opened (step 31 (S31) in FIG. 15). In the opening of S31, the contact hole opening 147A for the cathode is opened. The contact hole opening 147A for the cathode removes the insulating layer 141 on the second wiring 140C to expose the second wiring 140C. The contact hole opening 147A for the cathode may be referred to as an organic insulating layer opening.

The cathode electrode 143 (see FIG. 11) is provided on the exposed second wiring 140C, on the contact hole opening 147A for the cathode electrode, and on the insulating layer 141 (step 32 (S32) of FIG. 15). Further, the functional layer 148 (see FIG. 11) is also provided on the cathode electrode 143. The common electrode 149 (see FIG. 9 and FIG. 11) is provided on the functional layer 148 (step 33 (S33) in FIG. 15). In addition, for example, the cathode electrode 143 and the functional layer 148 are provided for each pixel, and the common electrode 149 is provided so as to overlap the display area 22.

After S33, the sealing film 165 is provided on the common electrode 149, and the cover film 158 is provided on the sealing film 165 (see FIG. 11, step 34 (S34) of FIG. 15). That is, the sealing film 165 and the cover film 158 are provided on the common electrode 149 in this order (see FIG. 11).

After S34, each of the plurality of divided displays 10 is formed (substrate cutting) (step 35 (S35) in FIG. 15). Further, after S35, for example, various IC chips including the IC chip 110 are electrically connected to a plurality of pads 195 or the connection wiring 341, and the FPC 200 is connected to the terminal portion 150 (step 36 (S36) in FIG. 15). Further, after S36, for example, a substrate fixing film (not shown) is attached to the rear surface side (the second surface 101B side). The substrate fixing film may be applied over the insulating layer 190, may be applied over the pads 195, and may be applied over the IC chips electrically connected to the pads 195. For example, the substrate fixing film can protect the thinned substrate 101 and improve the strength of the display device 10 including the thinned substrate 101.

As described above, the manufacturing of the display device 10 (pixel 180) is completed. For example, since S27 to S30 is not a process that necessarily requires miniaturization, S27 to S30 may include using a low resolution, high throughput exposure machine. Also, pre-treatment or post-treatment such as cleaning of the substrate may be performed before or after each step. Further, after each step, an inspection process for inspecting whether or not each step is normally executed may be executed.

For example, in the case where current supplying capability from the driving potential line PVDD to the pixel 180 (pixel circuit 181) is insufficient, the potential supplied to the second electrode 626 of the second transistor T2 may decrease. Although the second transistor T2 is required to operate in the saturated region, if the potential supplied to the second electrode 626 decreases, the second transistor T2 may operate in a linear region. As a consequence, the second transistor T2 may not be able to pass a sufficient current Ion according to the luminance, and the image displayed by the display device 10 may become dark. Further, if the reset potential VRES and the reference potential VREF supplied from the reset potential line SVRE and the reference potential line SVR are not stable, it is difficult to accurately hold the data potential and the threshold voltage VTH of the data signal VDATA in the capacitive elements CD and CV. As a result, the display quality of the display device 10 may deteriorate.

On the other hand, the second surface 101B of the display device 10 includes an area in which wirings can be formed in a region larger than the first surface 101A. Therefore, the method for manufacturing the display device 10 includes forming the standard potential line PVSS, the driving potential line PVDD, the reset potential line SVRE, and the reference potential line SVR on the second surface 101B side along the second direction D2, and it is possible to increase line widths of the standard potential line PVSS, the driving potential line PVDD, the reset potential line SVRE, and the reference potential line SVR formed on the second surface 101B side. The first surface 101A of the display device 10 includes the standard potential line PVSS, the driving potential line PVDD, the reset potential line SVRE, and the reference potential line SVR formed along the first direction D1. That is, the display device 10 has a configuration in which the widths of the reference potential lines PVSS, the driving potential lines PVDD, the reset potential lines SVRE, and the reference potential lines SVR are increased, and are arranged in the row direction and the column direction. Therefore, the display device 10 can reduce the resistances of the standard potential line PVSS, the driving potential line PVDD, the reset potential line SVRE, and the reference potential line SVR, so that a sufficient current can be stably supplied to the pixel 180. As a result, the display device 10 has a configuration capable of suppressing deterioration in display quality of the display device.

Further, for example, the standard potential line PVSS and the driving potential line PVDD formed on the second surface 101B are made closer to each other, so that a depleting condenser is formed by the standard potential line PVSS and the driving potential line PVDD. As a result, the display device 10 can suppress the power supply noise, and can supply a sufficient current to the pixel 180 more stably.

Further, for example, in recent years, a large display device is formed by arranging a plurality of display devices so that adjacent display devices do not overlap each other (for example, called tiling). In this case, a joint between adjacent display devices is a problem. For example, if a display device in which IC chips are arranged around the display device is tiled, since gaps are generated between adjacent display devices due to the IC chips, joints between the adjacent display devices are visible, which causes problems. On the other hand, the display device 10 has a configuration in which the IC chip is provided on the rear surface side (the second surface 101B side), and the IC chip 110 on the front surface side (the first surface 101A side) is provided in the peripheral area 24. Therefore, when a large display device is formed using the plurality of display devices 10, it is possible to minimize joints between adjacent display devices 10. As a consequence, by using the plurality of display devices 10, it is possible to form a large display device in which the plurality of display devices 10 is laid down by suppressing the joints of the adjacent display devices 10 to a minimum without causing a gap due to the IC chip.

Further, for example, in the case where the substrate 101 has flexibility, the display device 10 is bent. For example, the display device 10 may be bendable, and the plurality of display devices 10 may be connected in a spherical shape to form a spherical display device.

[1-8. Modification]

Figure 23:
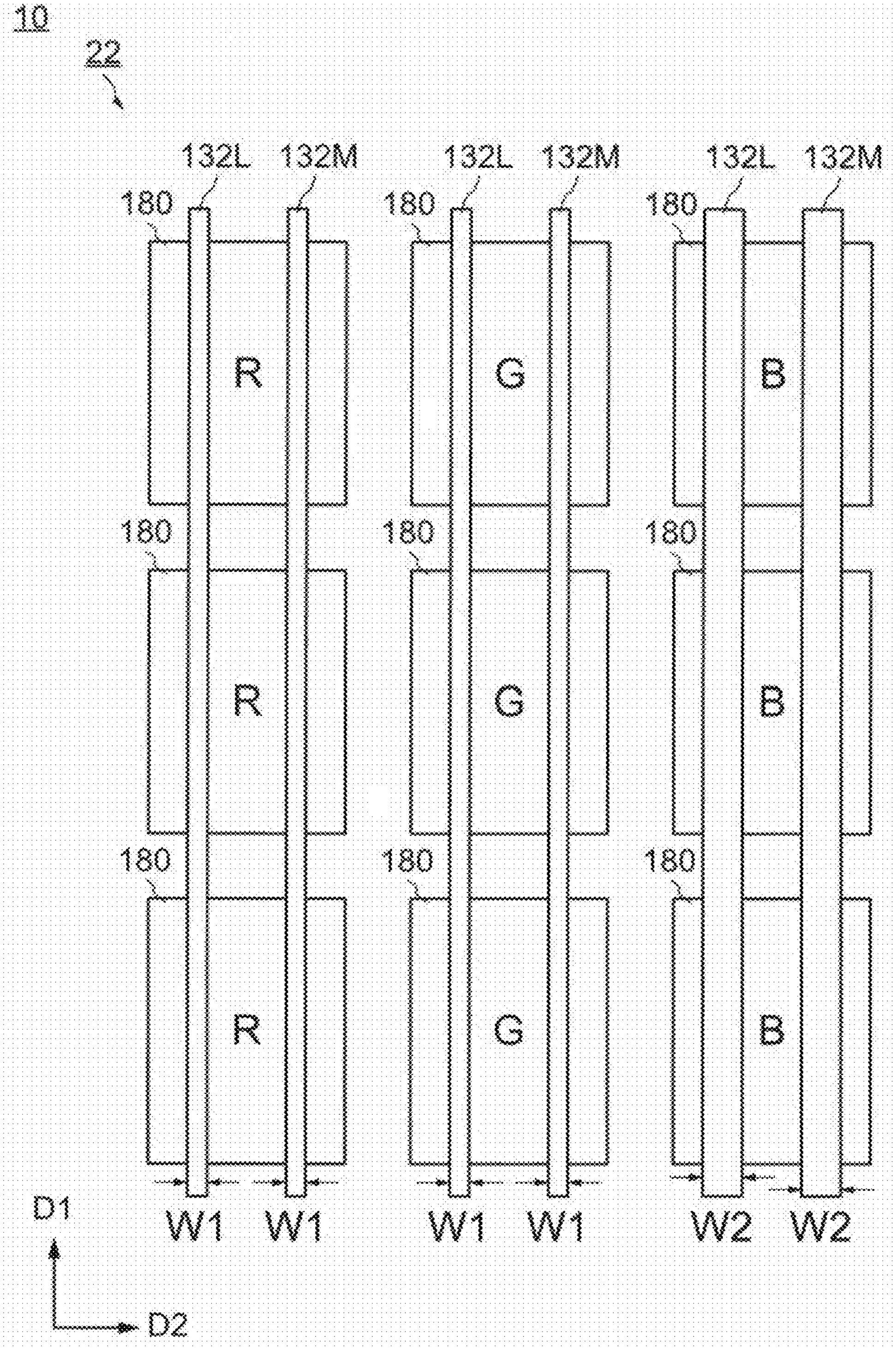
FIG. 23 is a schematic diagram showing an example of a driving potential line and a standard potential line according to the first embodiment of the present invention.

A modification of the display device 10 will be described with reference to FIG. 23. FIG. 23 is a schematic diagram showing examples of the driving potential line PVDD and a standard potential line PVSS of the display device 10.

As shown in FIG. 23, for example, the display device 10 includes a configuration in which each of the pixel 180 emitting red light, the pixel 180 emitting blue light, and the pixel 180 emitting green light is formed along the first direction D1.

The pixel 180 that emits red (R) light and the pixel 180 that emits green (G) light are electrically connected to the first wiring 132L (standard potential line PVSS) of a line width W1 and the first wiring 132M (driving potential line PVDD) of the line width W1.

The pixel 180 that emits blue light (B) is electrically connected to the first wiring 132L of a line width W2 (the standard potential line PVSS) and the first wiring 132M of the line width W2 (the driving potential line PVDD).

The line width W2 is thicker than the line width W1. Therefore, the pixel 180 emitting blue (B) is electrically connected to the standard potential line PVSS and the driving potential line PVDD that have lower resistance than the pixel 180 emitting red (R) and the pixel 180 emitting green (G).

For example, the luminous efficiency of the pixel 180 emitting blue (B) is lower than the luminous efficiency of the pixel 180 emitting red (R) and the luminous efficiency of the pixel 180 emitting green (G). By making the line widths of the standard potential line PVSS and the driving potential line PVDD electrically connected to the pixel 180 that emits blue (B) thicker than the line widths of the standard potential line PVSS and the driving potential line PVDD electrically connected to the pixel 180 that emits red (R) and the pixel 180 that emits green (G), it is possible to make the variation in the luminous efficiency according to the color developed by the pixel 180 uniform. In addition, the pixels that increase the line widths of the standard potential line PVSS and the driving potential line PVDD are not limited to the pixels 180 that emit blue (B). For example, in the case where the luminous efficiency of the pixel 180 that emits red (R) is lower than the luminous efficiency of the pixel 180 that emits blue (B) and the luminous efficiency of the pixel 180 that emits green (G), the line width of the standard potential line PVSS and the driving potential line PVDD that are electrically connected to the pixel 180 that emits red (R) is made thicker than the line width of the standard potential line PVSS and the driving potential line PVDD that are electrically connected to the pixel 180 that emits blue (B) and the pixel 180 that emits green (G), whereby the variation in luminous efficiency according to the color developed by the pixel 180 can be made uniform. In other words, the display device 10 including the plurality of pixels 180 that develop colors differing from each other can change the line widths of the standard potential line PVSS and the driving potential line PVDD in accordance with the light emission efficiency of the pixel 180, thereby making the variation in the light emission efficiency according to the color that the pixel 180 develops uniform.

2. Second Embodiment

Figure 24:
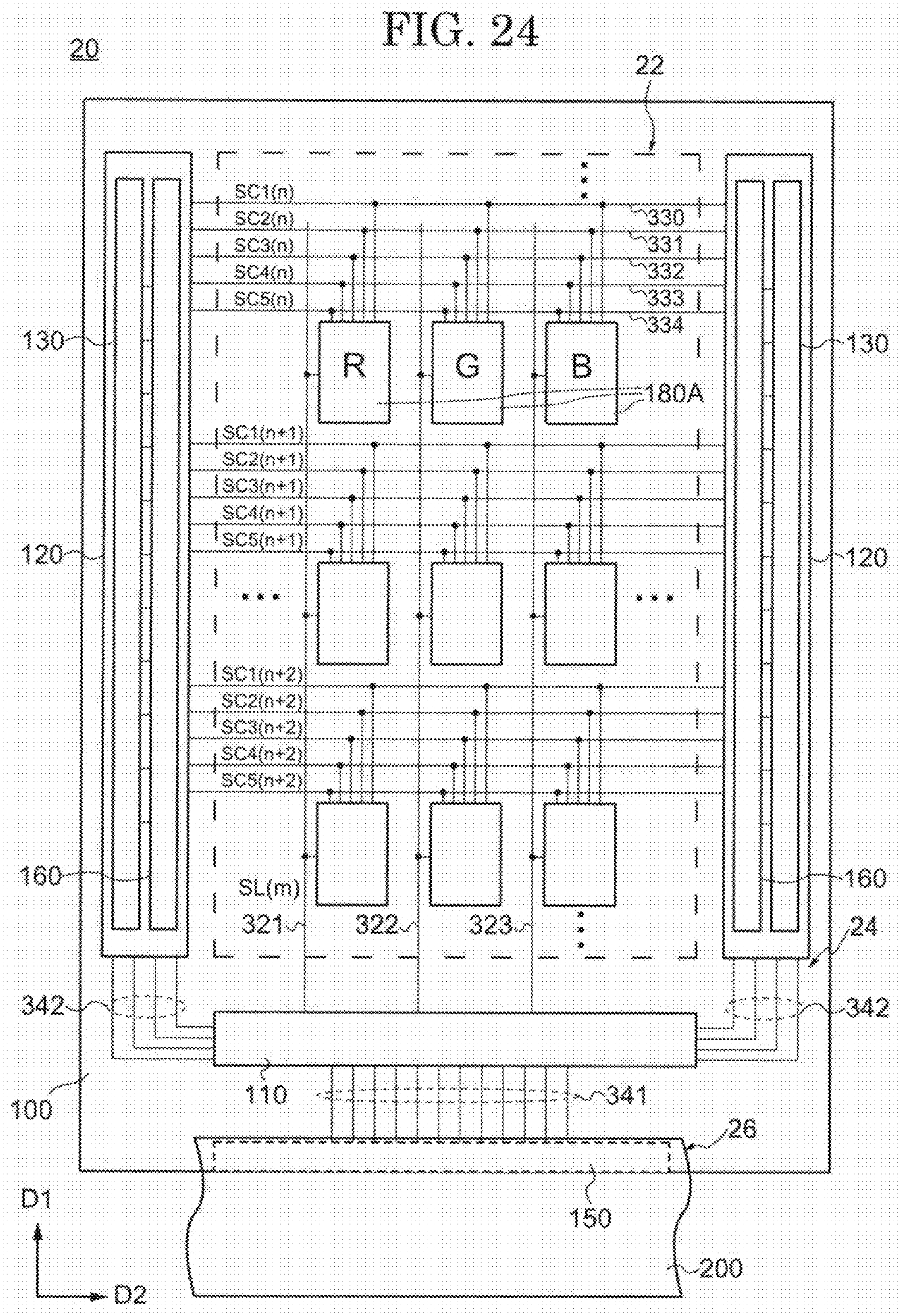
FIG. 24 is a schematic diagram showing a configuration of a display device according to a second embodiment of the present invention.
Figure 25:
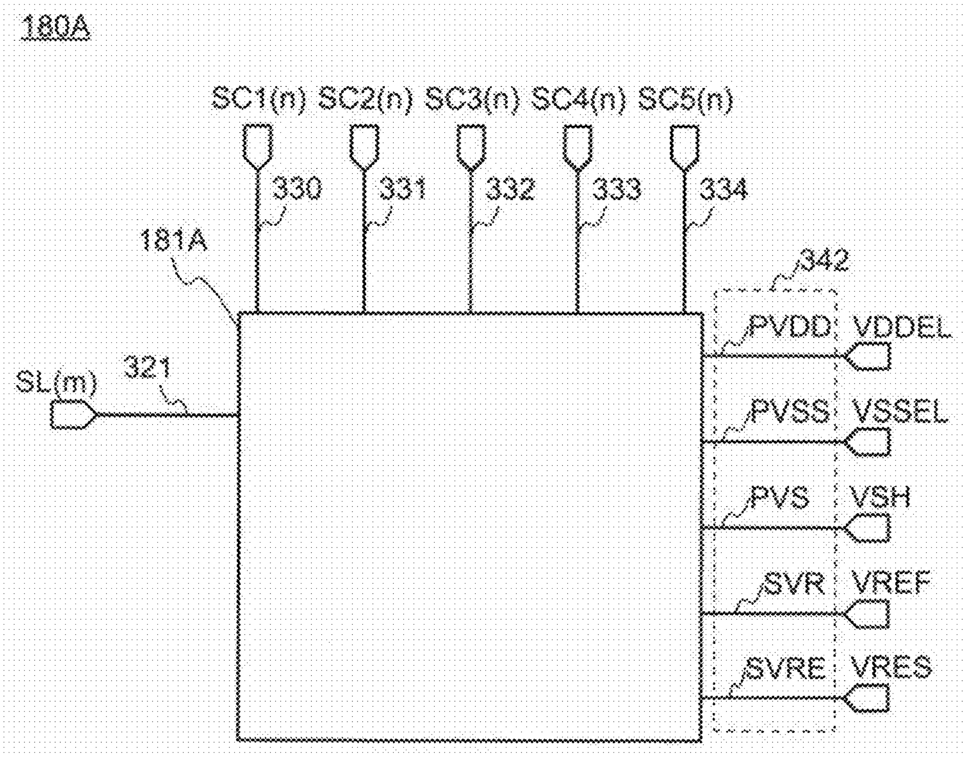
FIG. 25 is a schematic diagram showing an input signal to a pixel circuit according to the second embodiment of the present invention.
Figure 26:
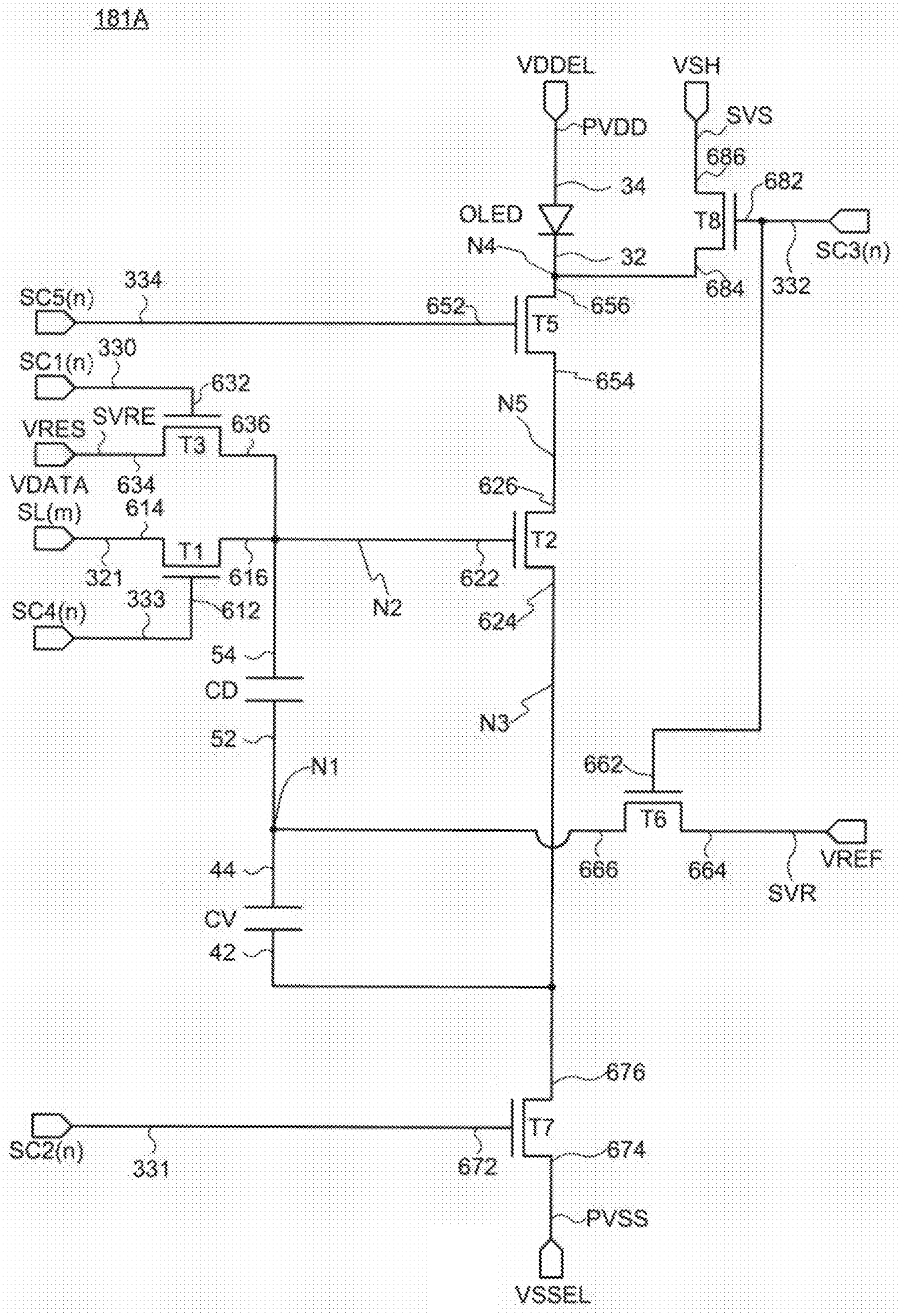
FIG. 26 is a circuit diagram showing a configuration of a pixel circuit according to the second embodiment of the present invention.
Figure 28:
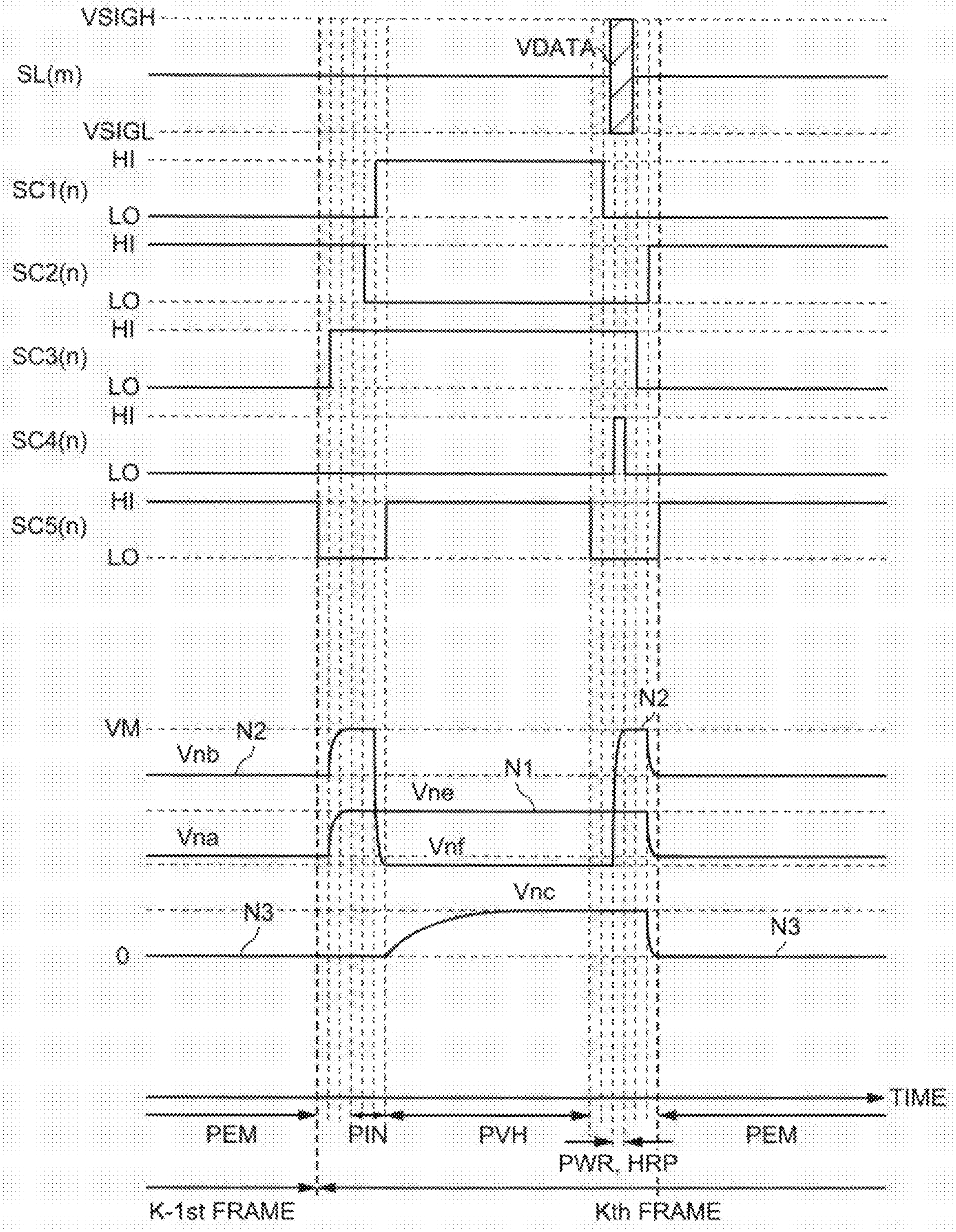
FIG. 28 is a timing chart of the display device according to the second embodiment of the present invention.
Figure 29:
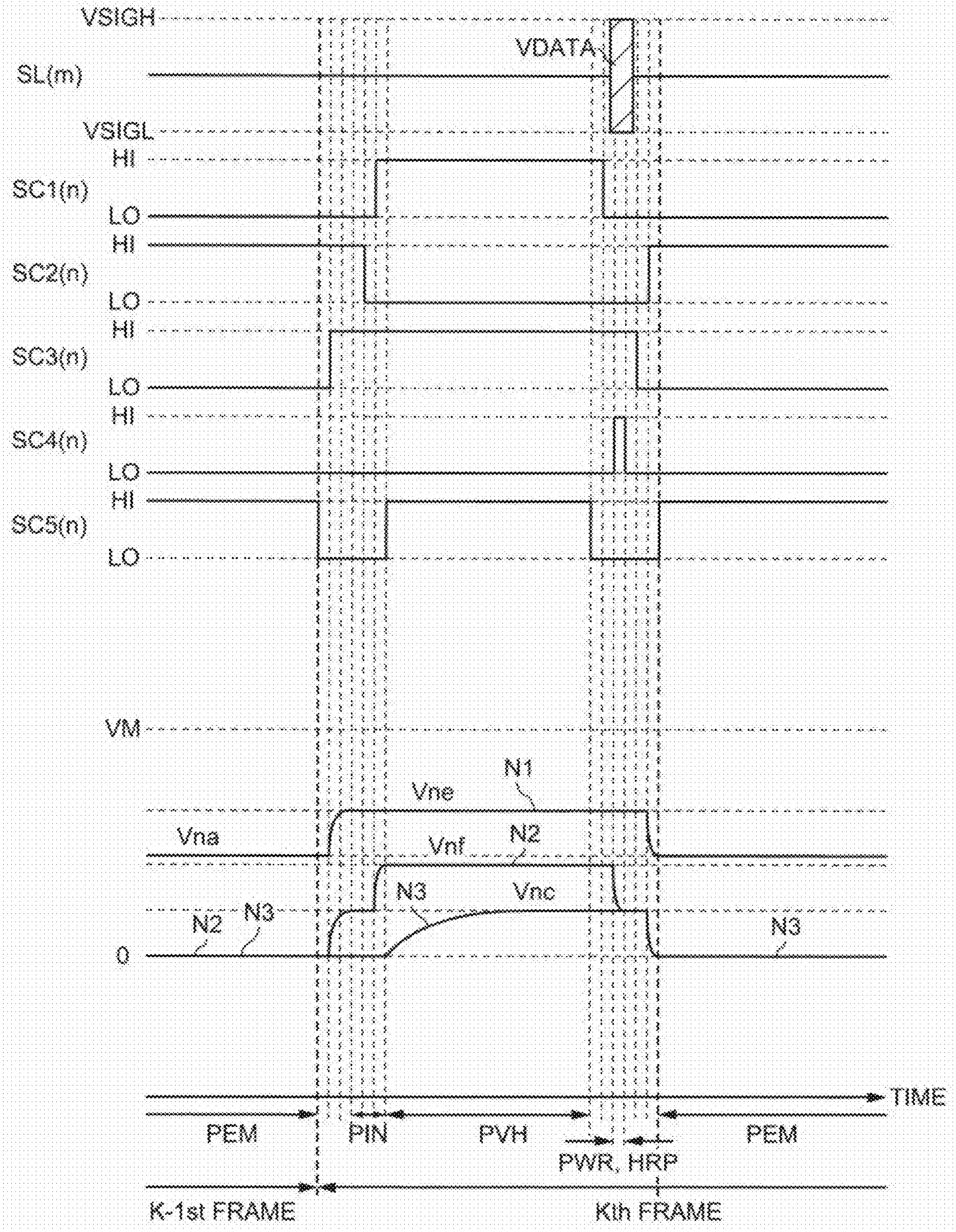
FIG. 29 is a timing chart of a control circuit according to the second embodiment of the present invention.
Figure 30:
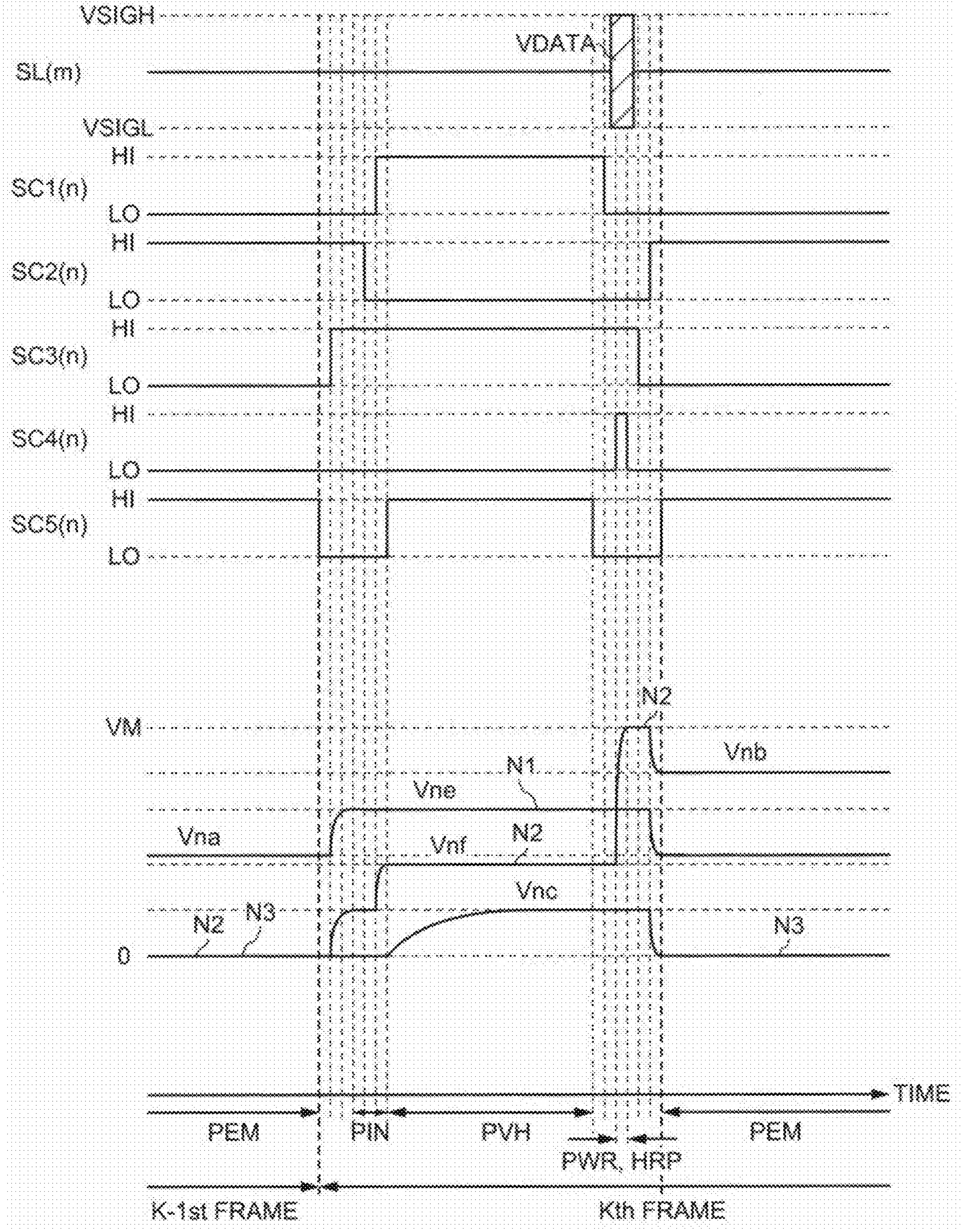
FIG. 30 is a timing chart of the pixel circuit according to the second embodiment of the present invention.

With reference to FIG. 4, FIG. 24, and FIG. 30, an overview of a display device 20 according to a second embodiment will be described. FIG. 24 is a schematic diagram showing a configuration of the display device 20. FIG. 25 is a schematic diagram showing an input signal to a pixel 180A (pixel circuit 181A) according to the second embodiment, FIG. 26 is a circuit diagram showing a configuration of the pixel circuit 181A, and FIG. 27 to FIG. 30 are timing charts of the display device 20. Configurations that are the same as or similar to those in FIG. 1 to FIG. 23 are described as necessary, and descriptions of the same or similar configurations as those in FIG. 1 to FIG. 23 may be omitted.

The display device 20 includes the pixel 180A and the pixel circuit 181A. Configurations of the pixel 180A and the pixel circuit 181A differ from the configurations of the pixel 180 and the pixel circuit 181 of the display device 10 according to the first embodiment. Specifically, the display device 20 includes the following configurations (1) to (5). Mainly, the configurations shown in (1) to (5) and the configurations related to the configuration shown in (1) to (5) are different from the configurations of the display device 10 according to the first embodiment.

(1) A configuration and function in which the pixel 180 (pixel circuit 181) of the display device 10 according to the first embodiment is replaced with the pixel 180A (pixel circuit 181A), and a configuration and function related to the pixel 180A (pixel circuit 181A) differ from the configuration and the function related to the pixel 180 (pixel circuit 181).

(2) The electrical connection between the control circuit 120 and the pixel 180A (pixel circuit 181A) differs from the electrical connection between the control circuit 120 and the pixel 180 (pixel circuit 181).

(3) The display device 20 does not include the scan signal SC6(*n*) and the scan signal line 335 to which the scan signal SC6(*n*) is supplied. Falling and rising timings of the second scan signal SC2(*n*) and falling and rising timings of the third scan signal SC3(*n*) differ from those of the first embodiment.

(4) The fourth transistor T4, the initialization potential VINI, and the initialization potential line SVI to which the initialization potential VINI is supplied are not included.

(5) A constant potential VSH and a constant potential line SVS to which the constant potential VSH is supplied is included.

Configurations other than those shown in (1) to (5) in the display device 20 and configurations other than those related to the configurations shown in (1) to (5) in the display device 20 are the same as those of the display device 10 according to the first embodiment. In describing the configuration and function of the display device 20, the same configuration and function as those of the display device 10 may be described and omitted as necessary.

[2-1. Configuration of Pixel 180A]

Referring to FIG. 24 to FIG. 26, an overview of the pixel 180A and the pixel circuit 181A will be described.

As described in (5) above, the display device 20 includes the constant potential VSH and the constant potential line SVS to which the constant potential VSH is supplied. The pixel circuit 181A is electrically connected to the scan signal lines 330 to 334, the constant potential line SVS, the driving potential line PVDD, the standard potential line PVSS, the reset potential line SVRE, and the reference potential line SVR, which are similar to those of the pixel circuit 181. On the other hand, as described in (1) to (5) above, the display device 20 does not include the scan signal SC6(*n*) and the scan signal line 335 to which the scan signal SC6(*n*) is supplied, and the initialization potential VINI and the initialization potential line SVI to which the initialization potential VINI is supplied. Similar to the display device 10, the scan signal lines 330 to 334 in the display device 20 extend from the control circuit 120 in the second direction D2 and are connected to a plurality of pixels 180A arranged in the second direction D2.

For example, the constant potential line SVS is electrically connected to the connection wiring 342 that differs from the reset potential line SVRE, the reference potential line SVR, the driving potential line PVDD, and the standard potential line PVSS. Further, for example, the constant potential line SVS may be the connection wiring 342 that differs from the reset potential line SVRE, the reference potential line SVR, the driving potential line PVDD, and the standard potential line PVSS.

For example, similar to the reset potential VRES, the reference potential VREF, the driving potential VDDEL, and the standard potential VSSEL, the constant potential VSH is supplied from an external device to the IC chip 110 via the FPC 200, the terminal portion 150, and the connection wiring 341, and supplied from the IC chip 110 to the plurality of pixels 180A (pixel circuits 181A) via the constant potential line SVS. In addition, although not shown, the constant potential VSH may be connected from an external device to the constant potential line SVS via the FPC 200, the terminal portion 150, and the connection line 341 without passing through the IC chip 110 and the connection wiring 342, and may be supplied to the plurality of pixels 180A (pixel circuits 181A). For example, the constant potential VSH is the same potential as the driving potential VDDEL.

The second terminal 686 of the eighth transistor T8 is electrically connected to the constant potential line VSH. The eighth transistor T8 has a function of conducting the first electrode 32 (the fourth node N4) and the second electrode 686 of the light-emitting device OLED, supplying a constant potential VSH (8 V) to the first electrode 32 of the light-emitting device OLED, setting the potential difference between the first electrode 32 and the second electrode 34 of the light-emitting device OLED to zero, and suppressing the light emission of the light-emitting device OLED in a period other than the light emission period. Further, the eighth transistor T8 has a function of supplying a current from the constant potential line VSH to the second electrode 626 and the first electrode 624 (that is, the fifth node N5 and the third node N3) of the second transistor T2 at the time of acquiring and holding the threshold voltage VTH, and charging the fifth node N5 and the third node N3. The configuration of the eighth transistor T8 other than the configuration of the eighth transistor T8 in the pixel circuit 181A is the same as the configuration of the eighth transistor T8 of the pixel circuit 181.

The first electrode 42 of the capacitive element CV is electrically connected to the third node N3, the first electrode 624 of the second transistor T2, and the second electrode 676 of the seventh transistor T7.

The configuration and the function of the pixel circuit 181A other than the configuration and the function described in the section "2-1. Configuration of Pixel 180A" are the same as those of the pixel circuit 181.

[2-2. Method for Driving Pixel Circuit 181A]

A method of driving the display device 20 will be described with reference to FIG. 27 to FIG. 30. Configurations that are the same as or similar to those in FIG. 1 to FIG. 26 will be described as necessary. The horizontal axis of the timing charts indicates time (TIME).

The method for driving the display device 20 includes a period similar to the method for driving the display device 10 according to the first embodiment shown in FIG. 4.

In one horizontal period (horizontal period HRP) in the method for driving the display device 20, the pixel 180A (pixel circuit 181A) is input with the first scan signal SC1(*n*), the second scan signal SC2(*n*), the third scan signal SC3(*n*), the fourth scan signal SC4(*n*), the fifth scan signal SC5(*n*) and the image data signal VDATA including the data signal SL(m), the constant potential VSH, the reset potential VRES, and the reference potential VREF. For example, the pixel 180A (pixel circuit 181A) is selected according to timings of the first scan signal SC1(*n*), the second scan signal SC2(*n*), the third scan signal SC3(*n*), the fourth scan signal SC4(*n*), and the fifth scan signal SC5(*n*). The image data signal SL(m) is input to the selected pixel 180A (pixel circuit 181A) in accordance with the timings of the respective signals. A similar operation is performed on all the pixels 180A (pixel circuits 181A), and an image of the corresponding frame corresponding to 1 FRAME is displayed in the display area 22 of the display device 10 on the basis of the image data signal SL(m) input to all the pixels 180A (pixel circuits 181A).

For example, the signals of each frame and the potentials supplied to each node in the timing charts shown in FIG. 27 to FIG. 30 are shown in Table 2.

TABLE 2

| | Setting value [V] |
|---|---|
| VTH | 1 |
| VSIGL(black) | 1 |
| VSIGH(white) | 5 |
| HI | 10 |
| LO | −2 |
| VREF | 3.2 |
| VRES | 2 |
| VSH | 8 |
| VDDEL | 8 |
| VSSEL | 0 |

For example, as shown in Table 2, the potential VSIGH is 5 V, and the pixel 180A to which the potential VSIGH is supplied emits light and emits white color. Further, for example, the potential VSIGL is 1 V, and the pixel 180 to which the potential VSIGL is supplied does not emit light and turns black. The reference potential VREF is 3.2 V, the potential VH (HI) is 10 V, and the potential VL (LO) is −2 V. The constant potential VSH is 8 V and is the same as the driving potential VDDEL. The other set values of the potentials are the same as the set values shown in Table 1 described in the section "1-5. Method for Driving Display Device 10". In addition, like the respective potentials in the display device 10, the respective potentials in the display device 20 shown in Table 2 are examples, and the respective potentials in the display device 20 are not limited to the respective potentials shown in Table 2. Each potential of the display device 20 can be appropriately selected according to the application and specifications of the display device 20.

[2-2-1. First Example of Method for Driving Display Device 20]

Figure 27:
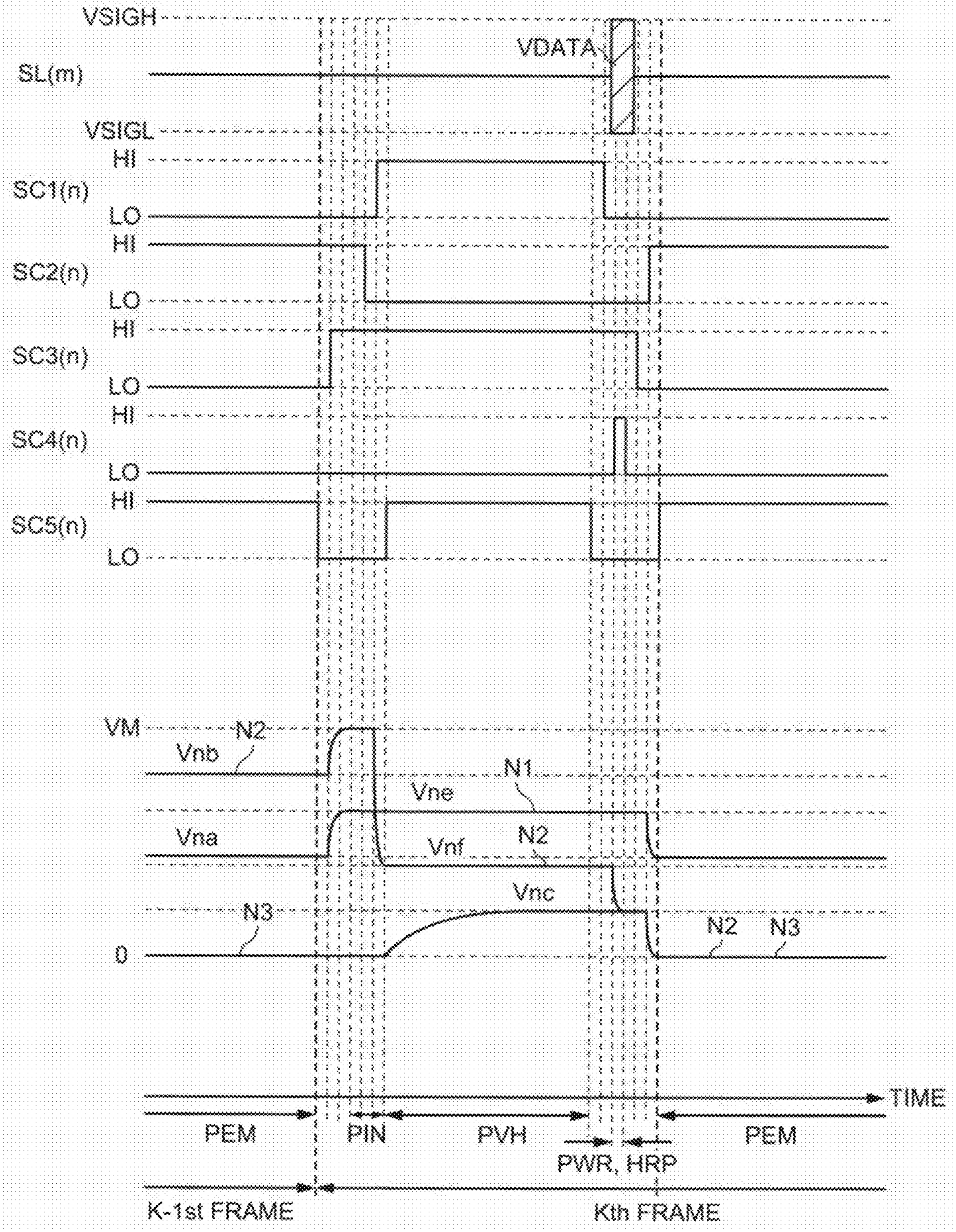
FIG. 27 is a timing chart of the display device according to the second embodiment of the present invention.

Referring to FIG. 27 and Table 2, a first example of the method for driving the display device 20 will be described. The first example of the method for driving the display device 20 includes displaying images of different colors in consecutive frames as in the first example of the method for driving the display device 10 according to the first embodiment. Configurations that are the same as or similar to those in FIG. 1 to FIG. 26 will be described as necessary.

As in the first example of the method for driving the display device 10 according to the first embodiment, the image data signal SL(m) including the data signal VDATA is input to each pixel 180A (pixel circuit 181A) in accordance with each period. The data signal VDATA is analog data including a potential that is equal to or greater than the potential VSIGL and equal to or less than the potential VSIGH. For example, in the period PWR, the potential supplied to the selected pixel 180A (pixel circuit 181A) is supplied to the image data signal SL(m). For example, in a period excluding the period PWR, the data signal VDATA is supplied with a potential supplied to pixels other than the selected pixel 180A (pixel circuit 181A).

The emission period PEM of the K−1st FRAME is a period in which the pixel 180A (pixel circuit 181A) emits light in accordance with the potential difference Vgs of the second transistor T2. For example, the pixel 180A emits white by the three pixels using the pixel 180A that emits red light, the pixel 180A that emits blue light, and the pixel 180A that emits green light.

For example, in the light emission period PEM of the K−1st FRAME, the image data signal SL(m) (data signal VDATA) is supplied with the potential of the data signal VDATA supplied to pixels other than the selected pixel 180A (pixel circuit 181A), the first scan signal SC1(*n*), the third scan signal SC3(*n*), and the fourth scan signal SC4(*n*) are supplied with LO, and the second scan signal SC2(*n*) and the fifth scan signal SC5(*n*) are supplied with HI. The first transistor T1, the third transistor T3, the sixth transistor T6, and the eighth transistor T8 are in the off state, and the fifth transistor T5 and the seventh transistor T7 are in the on state. Further, for example, in this case, the potential held at the first node N1 is the potential Vna (2.2 V), the potential held at the third node N3 is 0 V, the potential held at the second node N2 is the potential Vnb (for example, 4 V), and the potential difference Vgs is 4 V. Therefore, the second transistor T2 is in the on state, and the current Ion based on the potential difference Vgs and potential difference Vds according to the potential VSIGH input in the horizontal period HRP of the K−1st FRAME can be passed from the drive potential line PVDD to the light emitting element OLED and reference potential line PVSS. Consequently, the light-emitting device OLED emits light. For example, the pixel 180A (pixel circuit 181A) emits red light, and the three pixels using the pixel 180A that emits red light, the pixel 180A that emits blue light, and the pixel 180A that emits green light emit white light. In addition, the potential held in the first node N1 is the potential Vna (2.2 V) due to the capacitive coupling by the capacitive element CV and the capacitive element CD.

In a period between the light emission period PEM of the K−1st FRAME and the period PIN of the Kth FRAME following the light emission period PEM of the K−1st FRAME, the potential of the data signal VDATA supplied to pixels other than the pixel 180A (pixel circuit 181A) is supplied to the image data signal SL(m) (data signal VDATA). First, the fifth scan signal SC5(*n*) changes from the state where HI is supplied to the state where LO is supplied. If the fifth scan signal SC5(*n*) is supplied with LO, the third scan signal SC3(*n*) changes from the state where LO is supplied to the state where HI is supplied.

Consequently, in the period between the light emission period PEM of the K−1st FRAME and the period PIN of the Kth FRAME, the fifth transistor T5 is turned from the on state to the off state, and after the fifth transistor T5 is turned to the off state, the sixth transistor T6 and the eighth transistor T8 are turned from the off state to the on state. The first transistor T1 and the third transistor remain in the off state, and the second transistor T2 and the seventh transistor T7 remain in the on state. Therefore, the fifth node N5 is electrically connected to the third node N3, the third node N3 is electrically connected to the standard potential line PVSS, and the third node N3 is supplied with 0 V (standard potential VSSEL). The potential supplied to the third node N3 remains 0 V since the third node N3 has been supplied with 0 V. Further, since the potential difference between the first electrode 32 and the second electrode 34 of the light-emitting device OLED becomes zero, the light emission of the light-emitting device OLED is stopped by the current Ion not flowing from the driving potential line PVDD to the light-emitting device OLED. Further, the first node N1 is electrically connected to the reference potential line SVR, and the potential supplied to the first node N1 rises from the potential Vna (2.2 V) toward a potential Vne (the reference potential VREF, 3.2 V) and becomes the potential Vne. Since the first transistor T1 and the third transistor T3 remain in the off state, the second node N2 is in a floating state, and the potential supplied to the first node N1 rises from the potential Vna to the potential Vne, so that the potential supplied to the first node N1 is increased by 1 V, so that the potential supplied to the second node N2 rises 1 V from the potential Vna (4 V) and becomes the potential VM (5 V) by capacitive coupling by the capacitive elements CD between the first node N1 and the second node N2.

As described above, in the period between the emission period PEM of the K−1st FRAME and the period PIN of the Kth FRAME, the first node N1 is supplied with the potential Vne (reference potential VREF, 3.2 V), the second node N2 is supplied with the potential VM (5 V), and the potential supplied to the third node N3 remains 0 V.

In the period PIN of the Kth FRAME following the period between the emission period PEM of the K−1st FRAME and the period PIN of the Kth FRAME, the potential of the data signal VDATA supplied to pixels other than the selected pixel (pixel circuit 181A) is supplied to the image data signal SL(m) (data signal VDATA). The second scan signal SC2(*n*) changes from the state where HI is supplied to the state where LO is supplied. If the second scan signal SC2(*n*) is supplied with LO, the first scan signal SC1(*n*) changes from the state where LO is supplied to the state where HI is supplied. The fourth scan signal SC4(*n*) and the fifth scan signal SC5(*n*) remain in the state where LO is supplied.

Consequently, since the sixth transistor T6 remains in the on state, the potential supplied to the first node N1 maintains the potential Vne (reference potential VREF, 3.2 V). Further, the potential supplied to the third node N3 maintains 0 V (standard potential VSSEL). The seventh transistor T7 is turned from the on state to the off state, and after the seventh transistor T7 is turned to the off state, the third transistor T3 is turned from the off state to the on state. If the third transistor T3 is turned on, the second node N2 conducts with the reset potential line SVRE, and the potential supplied to the second node N2 gradually drops from the potential VM toward a reset potential (a potential Vnf, 2 V), and becomes the potential Vnf. Since the eighth transistor T8 remains in the on state and the potential difference between the first electrode 32 and the second electrode 34 of the light-emitting device OLED is zero, the light-emitting device OLED does not emit light. Further, since the fifth transistor T5 is maintained in the off state, the current Ion does not flow from the constant potential line SVS to the light-emitting device OLED and the standard potential line PVSS.

As described above, in the period PIN, the first node N1 is initialized by the reference potential VREF, the second node N2 is initialized by the reset potential VRES, and the third node N3 is initialized by the standard potential VSSEL.

In the period PVH following the period PIN, the image data signal SL(m) (data signal VDATA) is supplied with the potential of the data signal VDATA supplied to pixels other than the selected pixel 180A (pixel circuit 181A), the fifth scan signal SC5(*n*) changes from the state where LO is supplied to the state where HI is supplied, and the fifth transistor T5 is turned from the off state to the on state. The other scan signals and the other transistors are in the same condition as the period PIN.

Consequently, in the period PVH, the first node N1 maintains the potential Vne and the second node N2 maintains the potential Vnf. Further, at the beginning of the period PVH, the potential difference Vgs is 2 V and the second transistor T2 is in the on state. Since the eighth transistor T8, the fifth transistor T5, and the second transistor T2 are in the on state, the fourth node N4, the fifth node N5, and the third node N3 are conducted, and the drain current Ion flows from the constant potential line SVS to the fourth node N4, the fifth node N5, and the third node N3. Therefore, since the second scan signal SC2(*n*) is supplied with LO and the seventh transistor T7 is in the off state, the potential supplied to the third node N3 is already released and gradually rises from 0 V (the third node N3 is charged).

If the potential difference Vgs (the potential difference between the potential supplied to the second node N2 and the potential supplied to the third node N3) becomes the threshold voltage VTH, the second transistor T2 is turned to the off state. At this time, the first node N1 maintains the potential Vne (3.2 V) and the second node N2 maintains the potential Vnf (2 V). Therefore, for example, in the case where the threshold voltage VTH is 1 V, the potential supplied to the third node N3 is 1 V. Further, at this time, with reference to the potential Vnf (reset potential VRST) supplied to the second node N2, the potential difference between the second node N2 (the second electrode 54 of the capacitive element CD) and the potential Vnf supplied to the third node N3 (the first electrode 42 of the capacitive element CV) becomes the threshold voltage VTH (potential of the third node N3=VRES−VTH). In practice, the threshold voltage VTH varies in manufacturing, for example, in the case where the threshold voltage VTH becomes 1.1 V, the potential supplied to the third node N3 becomes 0.9 V. Since the method for driving the display device 10 includes acquiring the threshold voltage VTH by the operation in the period PVH and applying the correction by the acquired threshold voltage VTH, the method for driving the display device 20 can realize the correction of the threshold voltage VTH by the operation in the period PVH.

As described above, in the period PVH, by the operation in which the potential difference Vgs of the second transistor T2 becomes the same as the threshold voltage VTH, the threshold voltage VTH of the second transistor T2 is acquired, and charges corresponding to the threshold voltage VTH in the capacitive element CV are held.

In the period between the period PVH and the period PWR following the period PVH, the image data signal SL(m) (data signal VDATA) is supplied with the potential of the data signal VDATA supplied to pixels other than the selected pixel 180A (pixel circuit 181A). First, the fifth scan signal SC5(*n*) changes from the state where HI is supplied to the state where LO is supplied. If the fifth scan signal SC5(*n*) is supplied with LO, the first scan signal SC1(*n*) changes from the state where HI is supplied to the state where LO is supplied. The third scan signal SC3(*n*) is supplied with HI, and the second scan signal SC2(*n*) and the fourth scan signal SC4(*n*) are supplied with LO. The fifth transistor T5 and the third transistor T3 are turned from the on state to the off state. The rest of the transistors are similar to the period PVH. The potential supplied to the first node N1 maintains the potential Vne, the potential supplied to the second node N2 maintains the potential Vnf (2 V), the potential supplied to the third node N3 maintains the potential Vnc (1 V), and the potential difference Vgs is 1 V. Since the eighth transistor T8 remains in the on state and the potential difference between the first electrode 32 and the second electrode 34 of the light-emitting device OLED is zero, the light-emitting device OLED does not emit light. The fifth transistor T5 is turned off, and the drain current Ion does not flow from the constant potential line SVS to the light-emitting device OLED and the standard potential line PVSS.

In the period PWR following the period between the period PVH and the period PWR, the image data signal SL(m) (the data signal VDATA) is supplied with the potential VSIGL (1 V). The fourth scan signal SC4(*n*) changes from the state where LO is supplied to the state where HI is supplied, and the first transistor T1 is turned from the off state to the on state. The control signal and the transistor are the same as those of the period PVH. The potential supplied to the first node N1 maintains the potential Vne, and the potential supplied to the third node N3 maintains the potential Vnc. By the first transistor T1 changing from the off state to the on state, the second node N2 is electrically connected to the image data signal line 321, and the potential supplied to the second node N2 gradually drops from the potential Vnf toward the potential VSIGL (potential Vnc, 1 V) to become the potential Vnc. In this case, the capacitive element CD maintains the potential difference (−2.2 V with reference to the potential supplied to the first node N1) by holding charges corresponding to the potential difference between Vne (reference potential VREF, 3.2 V) supplied to the first node N1 and the potential Vnc (1 V) supplied to the second node N2. Further, the capacitive element CV maintains the potential difference (2.2V with reference to the potential supplied to the third node N3) by holding charges corresponding to the potential difference between Vne (the reference potential VREF, 3.2 V) supplied to the first node N1 and the potential Vnc (1 V) supplied to the third node N3. A sum (−2.2 V+2.2 V) of the potential difference held in the capacitive element CD and the potential difference held in the capacitive element CV is 0 V, that is, the potential difference Vgs is 0 V. Therefore, the second transistor T2 is in the off state. Note that, similar to the period between the period PVH and the period PWR, the light-emitting device OLED does not emit light in the period PWR.

As described above, in the period PWR, the data signal VDATA is written to the pixel 180A (pixel circuit 181A). The capacitive element CD maintains (holds) the data potential of the data signal VDATA.

During a period after the period PWR, the fourth scan signal SC4(*n*) changes from the state where HI is supplied to state where LO is supplied. If the fourth scan signal SC4(*n*) is supplied with LO, the third scan signal SC3(*n*) is supplied with LO from the state where HI is supplied. If the third scan signal SC3(*n*) is supplied with LO, the second scan signal SC2(*n*) changes from the state where LO is supplied to the state where HI is supplied. The first transistor T1, the sixth transistor T6, and the eighth transistor T8 are turned from the on state to the off state, and the seventh transistor T7 is turned from the off state to the on state. The other scan signals and the other transistors are the same as the period PWR. By the seventh transistor T7 changing to the on state, the third node N3 is electrically connected to the standard potential line PVSS (0 V), and the potential supplied to the third node N3 gradually decreases from the potential Vnc (VSIGL, 1 V) toward 0 V and becomes 0 V. The sixth transistor T6 is in the off state, and the first node N1 and the second node N2 are in the floating state. Therefore, by the potential supplied to the third node N3 changing from Vnc (1 V) to 0 V, the potential supplied to the first node N1 decreases from the potential Vne (3.2 V) to the potential Vna (2.2 V) due to capacitive coupling between the third node N3 and the first node N1. Also, due to the capacitive coupling between the first node N1 and the second node N2, the potential supplied to the second node N2 decreases from the potential Vnc (1 V) to 0 V. In addition, although the eighth transistor T8 is in the off state, since the fifth transistor T5 is in the off state, the current Ion does not flow from the driving potential line PVDD and the constant potential line SVS to the light-emitting device OLED and the standard potential line PVSS, and the light-emitting device OLED does not emit light.

Consequently, in the period after the period PWR, the potential supplied to the first node N1 capacitively coupled by the capacitive element CV and the capacitive element CD becomes the potential Vna (2.2 V), and the potential supplied to the second node N2 and the potential supplied to the third node N3 become 0 V. At this time, the potential difference Vgs is 0 V (−2.2 V+2.2 V=0 V) and the second transistor T2 is in the off state.

In the light emission period PEM of the Kth FRAME following the period PWR of the Kth FRAME, the potential of the data signal VDATA supplied to pixels other than the selected pixel 180A (pixel circuit 181A) is supplied to the image data signal SL(m) (data signal VDATA). The fifth scan signal SC5(*n*) changes from the state where LO is supplied to the state where HI is supplied. Therefore, the fifth transistor T5 is turned from the off state to the on state. The other scan signals and the other transistors are in the same condition as the period after the period PWR of the Kth FRAME.

Consequently, the fifth transistor T5 is turned into the on state, and the first electrode 32 of the light-emitting device OLED is electrically connected to the second electrode 626 (the fifth node N5) of the second transistor T2. Since the seventh transistor T7 is in the on state and the third node N3 is electrically connected to the standard potential line PVSS, the potential supplied to the third node N3 maintains 0 V. The potential supplied to the second node N2 maintains 0 V by the capacitive coupling between the capacitive element CD and the capacitive element CV. The first node N1 maintains 2.2 V by the capacitive coupling between the capacitive element CD and the capacitive element CV. The potential difference Vgs is the sum of the potential difference held in the capacitive element CD and the potential difference held in the capacitive element CV (potential of the data signal VDATA (potential VSIGL, 1 V)−reference potential VREF (3.2 V)+reference potential VREF (3.2 V)−(reset potential VRES (2 V)−threshold voltage VTH (1 V))=0 V). In the pixel 180A (pixel circuit 181A) in which the data signal VDATA includes the potential VSIGL, the potential difference Vgs is 0 V and the second transistor T2 is in the off state, so that the drain current Ion does not flow. Therefore, the light-emitting device OLED does not emit light. Consequently, the pixel 180A (pixel circuit 181A) that emits red light, the pixel 180A (pixel circuit 181A) that emits blue light, and the pixel 180A (pixel circuit 181A) that emits green light do not emit light, so that the three pixels using the pixel 180A that emits red light, the pixel 180A that emits blue light, and the pixel 180A that emits green light become black.

The display device 20 including the configuration described above can acquire the threshold voltage at high speed as in the display device 10, and can minimize the potential loss that the write potential decreases at the time of light emission.

Further, the display device 20 includes the configurations (1) to (5) described above, and can initialize the third node N3 by supplying the standard potential VSSEL to the third node N3 using the seventh transistor T7 in the period PIN without supplying the initialization potential VINI to the third node N3 using the fourth transistor T4 in the period PIN. As a result, the display device 20 does not include the fourth transistor T4, and has a configuration capable of reducing parasitic capacitance due to switching of the fourth transistor T4, so that the threshold voltage can be acquired at a higher speed. Further, since the display device 20 does not include the fourth transistor T4 and does not include the initialization potential VINI and the scan signal line 335 for supplying the initialization potential VINI, the number of elements, the number of power sources, and the number of signal lines can be reduced from the display device 10.

[2-2-2. Second Example of Method for Driving Display Device 20]

A second example of the method for driving the display device 20 will be described with reference to FIG. 28. The driving method shown in the second example of the display device 20 includes displaying an image of the same color (white color) in consecutive frames as in the second example of the method for driving the display device 10 according to the first embodiment. Configurations that are the same as or similar to those in FIG. 1 to FIG. 27 will be described as necessary.

The potential of the respective nodes in the light emission period PEM of the K−1th FRAME to the period PVH of the Kth FRAME, and the period between the period PVH of the Kth FRAME and the period PWR of the Kth FRAME are the same as those described in the section "2-2-1. First Example of Method for Driving Display Device 20". The configuration of each scan signal and the operation of each transistor in each period are the same as the configuration described in the section "2-2-1. First Example of Method for Driving Display Device 20". Therefore, configurations and the like similar to those described in the section "2-2-1. First Example of Method for Driving Display Device 20" will be described as necessary. In addition, the image data signal SL(m) is supplied with the data signal VDATA including the VSIGL (0 V) corresponding to white in the period PWR of the Kth FRAME, and is supplied with the data signal VDATA similar to the configuration described in the section "2-2-1. First Example of Method for Driving Display Device 20" in a period other than the period PWR of the Kth FRAME.

In the emission period PEM of the K−1st FRAME, similar to the configuration described in the section "2-2-1. First Example of Method for Driving Display Device 20", the pixel 180A emits white light by the three pixels using the pixel 180A that emits red light, the pixel 180A that emits blue light, and the pixel 180A that emits green light.

In the period between the emission period PEM of the K−1st FRAME and the period PIN of the Kth FRAME, the first node N1 is supplied with the potential Vne (reference potential VREF, 3.2 V), the second node N2 is supplied with the potential VM (5 V), and the potential supplied to the third node N3 is maintained at 0 V, similar to the configuration described in the section "2-2-1. First Example of Method for Driving Display Device 20".

In the period PIN of the Kth FRAME, the first node N1 is initialized by the reference potential VREF, the second node N2 is initialized by the reset potential VRES, and the third node N3 is initialized by the standard potential VSSEL, similar to the configuration described in the section "2-2-1. First Example of Method for Driving Display Device 20".

In the period PVH following the period PIN, the threshold voltage VTH of the second transistor T2 is acquired by the operation in which the potential difference Vgs of the second transistor T2 becomes the same as the threshold voltage VTH, and the charge corresponding to the threshold voltage VTH is held in the capacitive element CV, similar to the configuration described in the section "2-2-1. First Example of Method for Driving Display Device 20".

In the period between the period PVH and the period PWR following the period PVH, the potential supplied to the first node N1 maintains the potential Vne, the potential supplied to the second node N2 maintains the potential Vnf (2 V), the potential supplied to the third node N3 maintains the potential Vnc (1 V), and the potential difference Vgs is 1 V, similar to the configuration described in the section "2-2-1. First Example of Method for Driving Display Device 20".

In the period PWR following the period between the period PVH and the period PWR, the image data signal SL(m) (data signal VDATA) is supplied with the potential VSIGH (potential VM, 5 V). The potential supplied to the first node N1 maintains the potential Vne, and the potential supplied to the third node N3 maintains the potential Vnc. The potential supplied to the second node N2 gradually increases from the potential Vnf (2 V) toward the potential VM, and becomes the potential VM (potential VSIGH, 5 V). In this case, the capacitive element CD maintains the potential difference (1.8 V with reference to the potential supplied to the first node N1) by holding a charge corresponding to the potential difference between Vne (reference potential VREF, 3.2 V) supplied to the first node N1 and the potential VM (5 V) supplied to the second node N2. Further, the capacitive element CV maintains the potential difference (2.2 V with reference to the potential supplied to the third node N3) by holding charges corresponding to the potential difference between Vne (the reference potential VREF, 3.2 V) supplied to the first node N1 and the potential Vnc (1 V) supplied to the third node N3. A sum (1.8 V+3.2 V) of the potential difference held in the capacitive element CD and the potential difference held in the capacitive element CV is 4 V, and the potential difference Vgs is 4 V. Therefore, the second transistor T2 is in the on state. For example, in the case where the threshold voltage VTH varies and the potential VM supplied to the third node N3 becomes 0.9 V (assuming that the threshold voltage VTH becomes 1.1 V, in the case where the potential of the third node N3 becomes VRES (2 V)−VTH (1.1 V)=0.9 V), the potential difference Vgs becomes 4.1 V (Vgs=(VDATA (Vnb, 5 V)−VREF (3.2 V))−(VREF (3.2 V)−0.9 V). That is, in the case where the threshold voltage VTH is 0.1 V higher than the setting value, the write potential difference Vgs is 4.1 V that is 0.1 V higher than 4.0 V of the setting value.

As described above, in the period PWR, the data signal VDATA is written to the pixel 180A (pixel circuit 181A). Further, the capacitive element CD maintains (holds) the data potential of the data signal VDATA.

In the period after the period PWR, the seventh transistor T7 is turned to the on state, so that the third node N3 is electrically connected to the standard potential line PVSS (0 V), and the potential supplied to the third node N3 gradually decreases from the potential Vnc (VSIGL, 1 V) toward 0 V and becomes 0 V. The sixth transistor T6 is in the off state, and the first node N1 and the second node N2 are in the floating state. Therefore, by the potential supplied to the third node N3 becoming 0 V from the potential Vnc (1 V), the potential supplied to the first node N1 decreases from the potential Vne (3.2 V) to the potential Vna (2.2 V) due to the capacitive coupling by the capacitive element CV between the first node N1 and the third node N3. Further, the potential supplied to the second node N2 decreases from the potential VM (5 V) to the potential Vnb (4 V) due to the capacitive coupling by the capacitive element CD between the second node N2 and the first node N1.

In the emission period PEM of the Kth FRAME following the period PWR of the Kth FRAME, the potential supplied to the third node N3 remains 0 V. The potential supplied to the second node N2 maintains the potential Vnb (4 V) by the capacitive coupling between the capacitive element CD and the capacitive element CV. The first node N1 also maintains the potential Vna (2.2 V) by the capacitive coupling of the capacitive element CD and the capacitive element CV. The potential difference Vgs is the sum of the potential difference held in the capacitive element CD and the potential difference held in the capacitive element CV (potential of the data signal VDATA (potential VSIGH, 5 V)−reference potential VREF (3.2 V)+reference potential VREF (3.2 V)−(reset potential VRES (2 V)−threshold voltage VTH (1 V)=4 V). In the pixel 180A (pixel circuit 181A) in which the data signal VDATA includes the potential VSIGH, since the potential difference Vgs is 4 V and the second transistor T2 is in the on state, the current Ion flows from the driving potential line PVDD to the light-emitting device OLED and the standard potential line PVSS, and the light-emitting device OLED emits light. For example, the pixel 180A emitting red light, the pixel 180A emitting blue light, and the pixel 180A emitting green light emit light, respectively, the three pixels using the pixel 180A emitting red light, the pixel 180A emitting blue light, and the pixel 180A emitting green light become white.

The second example of the method for driving the display device 20 has the same effects as those described in the section "2-2-1. First Example of Method for Driving Display Device 20".

[2-2-3. Third Example of Method for Driving Display Device 20]

A third example of the method for driving the display device 20 will be described with reference to FIG. 29. The driving method shown in the third example of the method for driving the display device 20 includes displaying images of the same color (black) in consecutive frames as in the third example of the method for driving the display device 10 according to the first embodiment. Configurations that are the same as or similar to those in FIG. 1 to FIG. 28 will be described as necessary.

The potentials and the like of the respective nodes in the period PVH of the Kth FRAME to the emission period PEM of the Kth FRAME are the same as those described in the section "2-2-1. First Example of Method for Driving Display Device 20". Further, the configuration of each scan signal and the operation of each transistor in each period are the same as the configuration described in the section "2-2-1. First Example of Method for Driving Display Device 20". Therefore, configurations and the like similar to those described in the section "2-2-1. First Example of Method for Driving Display Device 20" will be described as necessary.

In the emission period PEM of the K−1st FRAME, for example, the potential supplied to the first node N1 is the potential Vna (2.2 V). Further, the potential supplied to the second node N2 and the potential supplied to the third node N3 are 0 V, and the potential difference Vgs is 0 V. Therefore, the second transistor T2 is in the off state, the drain current Ion does not flow, and the light-emitting device OLED does not emit light.

Consequently, since the pixel 180A that emits red light (pixel circuit 181A), the pixel 180A that emits blue light, and the pixel 180A that emits green light do not emit light, the three pixels using the pixel 180A that emits red light, the pixel 180A that emits blue light, and the pixel 180A that emits green light become black.

In the period between the emission period PEM of the K−1st FRAME and the period PIN of the Kth FRAME following the emission period PEM of the K−1st FRAME, since the third node N3 has been supplied with 0 V, the potential supplied to the third node N3 continues to remain at 0 V. Further, although the current Ion does not flow from the driving potential line PVDD to the light-emitting device OLED and the standard potential line PVSS, and the light emission of the light-emitting device OLED is stopped, the first node N1 is conducted to the reference potential line SVR, and the potential supplied to the first node N1 rises toward the potential Vne (the reference potential VREF, 3.2 V) from the potential Vna (2.2 V) and becomes the potential Vne. Since the first transistor T1 and the third transistor T3 remain in the off state, the second node N2 is in the floating state, and the potential supplied to the first node N1 is increased by 1 V by the potential supplied to the first node N1 changing from the potential Vna to the potential Vne, the potential supplied to the second node N2 is increased by 1 V from 0 V due to the capacitive coupling by the capacitive elements CD between the first node N1 and the second node N2, and becomes the voltage Vc (1 V).

As described above, in the period between the emission period PEM of the K−1st FRAME and the period PIN of the Kth FRAME, the first node N1 is supplied with the potential Vne (reference potential VREF, 3.2 V), the second node N2 is supplied with the potential Vc (1 V), and the potential supplied to the third node N3 remains at 0 V.

In the period PIN of the Kth FRAME following the period between the period PIN of the Kth FRAME, the potential supplied to the first node N1 maintains the potential Vne (reference potential VREF, 3.2 V). The potential supplied to the third node N3 maintains 0 V (standard potential VSSEL). If the third transistor T3 is turned to the on state, the second node N2 conducts with the reset potential line SVRE, and the potential supplied to the second node N2 gradually rises from the potential Vnc toward the reset potential (potential Vnf, 2 V), and becomes the potential Vnf.

As described above, in the period PIN, the first node N1 is initialized by the reference potential VREF, the second node N2 is initialized by the reset potential VRES, and the third node N3 is initialized by the standard potential VSSEL.

In the period PVH following the period PIN, similar to the configuration described in the section "2-2-1. First Example of Method for Driving Display Device 20", the threshold voltage VTH of the second transistor T2 is acquired by the operation in which the potential difference Vgs of the second transistor T2 becomes the same as the threshold voltage VTH, and the charge corresponding to the threshold voltage VTH is held in the capacitive element CV.

In the period between the period PVH and the period PWR following the period PVH, the potential supplied to the first node N1 maintains the potential Vne, the potential supplied to the second node N2 maintains the potential Vnf (2 V), the potential supplied to the third node N3 maintains the potential Vnc (1 V), and the potential difference Vgs is 1 V, similar to the configuration described in the section "2-2-1. First Example of Method for Driving Display Device 20".

In the period PWR following the period between the period PVH and the period PWR, the data signal VDATA is written to the pixel 180A (pixel circuit 181A) in the period PWR in the same manner as in the configuration described in the section "2-2-1. First Example of Method for Driving Display Device 20". The capacitive element CD maintains (holds) the data potential of the data signal VDATA.

In the period after the period PWR, similar to the configuration described in the section "2-2-1. First Example of Method for Driving Display Device 20", the potential supplied to the first node N1 capacitively coupled by the capacitive element CV and the capacitive element CD becomes a potential Vna (2.2 V), and the potential supplied to the second node N2 and the potential supplied to the third node N3 become 0 V. In this case, the potential difference Vgs is 0 V (−2.2 V+2.2 V=0 V) and the second transistor T2 is in the off state.

In the light emission period PEM of the Kth FRAME following the period after the period PWR, similar to the configuration described in the section "2-2-1. First Example of Method for Driving Display Device 20", since the potential difference Vgs is 0 V and the second transistor T2 is in the off state, the drain current Ion does not flow and the light-emitting device OLED does not emit light. Consequently, the pixel 180A becomes black by the three pixels using the pixel 180A that emits red light, the pixel 180A that emits blue light, and the pixel 180A that emits green light.

The third example of the method for driving the display device 20 has the same effects as those described in the section "2-2-1. First Example of Method for Driving Display Device 20".

[2-2-4. Fourth Example of Method for Driving Display Device 20]

A fourth example of the method for driving the display device 20 will be described with reference to FIG. 30. The driving method shown in the fourth example of the method for driving the display device 20 includes displaying images of different colors in consecutive frames as in the fourth example of the method for driving the display device 10 according to the first embodiment. Configurations that are the same as or similar to those in FIG. 1 to FIG. 29 will be described as necessary.

The potential of each node, the configuration of each scan signal, the operation of each transistor, and the like in the emission period PEM of the K−1st FRAME to the period PVH of the Kth FRAME are the same as those described in the section "2-2-3. Third Example of Method for Driving Display Device 20". Further, the potential of each node, the configuration of each scan signal, the operation of each transistor, and the like in the period after the period PVH of the Kth FRAME to the emission period PEM of the Kth FRAME are the same as those described in the section "2-2-2. Second Example of Method for Driving Display Device 20". Therefore, the description thereof will be omitted.

The fourth example of the method for driving the display device 20 has the same effects as those described in the section "2-2-1. First Example of Method for Driving Display Device 20".

As the embodiment of the present invention, each of the embodiments described above or a part of each of the embodiments described above can be appropriately combined as long as they do not conflict with each other.

It is to be understood that the present invention provides other functional effects that are different from the operational effects provided by the aspects of the embodiments described above, and those that are obvious from the description of the present specification or those that can be easily predicted by a person skilled in the art.

What is claimed is:

1. A display device comprising:

a plurality of pixels arranged in a matrix in a first direction and a second direction intersecting the first direction;

a control circuit that outputs a first control signal to a fifth control signal;

an image data signal line to which a data potential is supplied;

a reset potential line to which a reset potential is supplied;

a reference potential line to which a reference potential is supplied;

a standard potential line to which a standard potential is supplied; and a constant potential line to which a constant potential is supplied, wherein each of the plurality of pixels includes a first transistor, a second transistor, a third transistor, a fifth transistor, a sixth transistor, a seventh transistor, an eighth transistor, a first capacitive element, a second capacitive element, and a light-emitting element, wherein the first transistor is controlled by the first control signal and is electrically connected between the image data signal line and a second electrode of the second capacitive element, the second transistor includes a gate electrode electrically connected to the second electrode of the second capacitive element and is electrically connected between a first electrode of the first capacitive element and a first electrode of the fifth transistor, the third transistor is controlled by a second control signal and electrically connected between the reset potential line and the second electrode of the second capacitive element, the fifth transistor is controlled by a third control signal and is electrically connected between a first electrode of the light-emitting element and a second electrode of the second transistor, the sixth transistor is controlled by a fourth control signal and is electrically connected between the reference potential line and a first electrode of the second capacitive element, the seventh transistor is controlled by the fifth control signal and is electrically connected between the standard potential line and a first electrode of the second transistor, the eighth transistor is controlled by the fourth control signal and is electrically connected between the constant potential line and the first electrode of the fifth transistor, the first capacitive element is electrically connected between the first electrode of the second capacitive element and the first electrode of the second transistor, the second capacitive element is electrically connected between a second electrode of the first capacitive element and the gate electrode, the light-emitting element is electrically connected between the constant potential line and the first electrode of the fifth transistor, and the control circuit is configured to be capable of controlling to hold a potential difference corresponding to a threshold voltage of the second transistor in the first capacitive element, and then to hold a potential difference corresponding to the data potential in the second capacitive element.

2. The display device according to claim 1, wherein the control circuit is configured to be capable of controlling, before the potential difference corresponding to the threshold voltage of the second transistor is held in the first capacitive element, turning the first transistor to an off state using the first control signal, turning the third transistor to an off state using the second control signal turning the fifth transistor to an off state using the third control signal, turning the sixth transistor and the eighth transistor to an on state using the fourth control signal, turning the seventh transistor to an on state using the fifth control signal, and supplying the reference potential to the first electrode of the second capacitive element, and before the potential difference corresponding to the threshold voltage of the second transistor is held in the first capacitive element and after the reference potential is supplied to the first electrode of the second capacitive element, turning the seventh transistor to an off state using the fifth control signal, turning the third transistor to an on state using the second control signal, and supplying the reset potential to the second electrode of the second capacitive element.

3. The display device according to claim 2, wherein the control circuit is configured to be capable of controlling, after supplying the reset potential to the second electrode of the second capacitive element, turning the fifth transistor to an on state using the third control signal, and holding the potential difference corresponding to the threshold voltage of the second transistor in the first capacitive element.

4. The display device according to claim 3, wherein the control circuit is configured to be capable of controlling, after holding the potential difference corresponding to the threshold voltage of the second transistor in the first capacitive element, turning the third transistor to an off state using the second control signal, turning the first transistor to an on state using the first control signal, supplying the data potential to the second electrode of the second capacitive element, and holding the potential difference corresponding to the data potential in the second capacitive element.

5. A display device according to claim 4, further comprising:

a plurality of pixels arranged in a matrix in a first direction and a second direction intersecting the first direction;

a control circuit that outputs a first control signal to a sixth control signal;

an image data signal line to which a data potential is supplied;

a reset potential line to which a reset potential is supplied;

a reference potential line to which a reference potential is supplied;

a standard potential line to which a standard potential is supplied; and a constant potential line to which a constant potential is supplied, wherein each of the plurality of pixels includes a first transistor, a second transistor, a third transistor, a fourth transistor, a fifth transistor, a sixth transistor, a seventh transistor, an eighth transistor, a first capacitive element, a second capacitive element, and a light-emitting element, wherein the first transistor is controlled by the first control signal and is electrically connected between the image data signal line and a second electrode of the second capacitive element, the second transistor includes a gate electrode electrically connected to the second electrode of the second capacitive element and is electrically connected between a first electrode of the first capacitive element and a first electrode of the fifth transistor, the third transistor is controlled by a second control signal and electrically connected between the reset potential line and the second electrode of the second capacitive element, the fourth transistor is controlled by the sixth control signal and is electrically connected between an initialization potential line to which an initialization potential is supplied and the first electrode of the first capacitive element, the fifth transistor is controlled by a third control signal and is electrically connected between a first electrode of the light-emitting element and a second electrode of the second transistor, the sixth transistor is controlled by a fourth control signal and is electrically connected between the reference potential line and a first electrode of the second capacitive element, the seventh transistor is controlled by a fifth control signal and is electrically connected between the standard potential line and a first electrode of the second transistor, the eighth transistor is controlled by the fourth control signal and is electrically connected between the constant potential line and the first electrode of the fifth transistor, the first capacitive element is electrically connected between the first electrode of the second capacitive element and the first electrode of the second transistor, the second capacitive element is electrically connected between a second electrode of the first capacitive element and the gate electrode, the light-emitting element is electrically connected between the constant potential line and the first electrode of the fifth transistor, and wherein, the control circuit is configured to be capable of controlling to hold a potential difference corresponding to a threshold voltage of the second transistor in the first capacitive element, and then to hold a potential difference corresponding to the data potential in the second capacitive element.

6. The display device according to claim 5, wherein the control circuit is configured to be capable of controlling, before holding the potential difference corresponding to the threshold voltage of the second transistor in the first capacitive element, turning the first transistor to an off state using the first control signal, turning the third transistor to an off state using the second control signal, turning the fifth transistor to an off state using the third control signal, turning the seventh transistor to an off state using the fifth control signal, turning the fourth transistor to an off state using the sixth control signal, turning the sixth transistor and the eighth transistor to an on state using the fourth control signal, and supplying the reference potential to the first electrode of the second capacitive element, before the potential difference corresponding to the threshold voltage of the second transistor is held and after the reference potential is supplied to the first electrode of the second capacitive element, turning the fourth transistor to an on state using the sixth control signal, and supplying the initialization potential to the first electrode of the first capacitive element, and before the potential difference corresponding to the threshold voltage of the second transistor is held in the first capacitive element and after the initialization potential is supplied to the first electrode of the first capacitive element, turning the fourth transistor to an off state using the sixth control signal, turning the third transistor to an on state using the second control signal, and supplying the reset potential to the second electrode of the second capacitive element.

7. The display device according to claim 6, wherein the control circuit is configured to be capable of controlling, after supplying the reset potential to the second electrode of the second capacitive element, turning the fifth transistor to an on state using the third control signal, and holding the potential difference corresponding to the threshold voltage of the second transistor in the first capacitive element.

* * * * *